United States Patent
Barton et al.

(10) Patent No.: US 8,806,570 B2
(45) Date of Patent: Aug. 12, 2014

(54) POLICY-BASED APPLICATION MANAGEMENT

(71) Applicant: Citrix Systems, Inc., Fort Lauderdale, FL (US)

(72) Inventors: Gary Barton, Boca Raton, FL (US); James Robert Walker, Deerfield Beach, FL (US); Nitin Desai, Coral Springs, FL (US); Zhongmin Lang, Parkland, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 14/044,901

(22) Filed: Oct. 3, 2013

(65) Prior Publication Data

US 2014/0040977 A1 Feb. 6, 2014

Related U.S. Application Data

(63) Continuation of application No. 14/043,902, filed on Oct. 2, 2013, and a continuation-in-part of application No. 13/886,889, filed on May 3, 2013, and a continuation-in-part of application No. 13/886,765, filed on May 3, 2013.

(60) Provisional application No. 61/861,736, filed on Aug. 2, 2013, provisional application No. 61/806,577, filed on Mar. 29, 2013, provisional application No. 61/714,469, filed on Oct. 16, 2012, provisional application No. 61/713,762, filed on Oct. 15, 2012, provisional application No. 61/713,718, filed on Oct. 15, 2012, provisional application No. 61/713,763, filed on Oct. 15, 2012, provisional application No. 61/714,293, filed on Oct. 16, 2012.

(51) Int. Cl.
| | | |
|---|---|---|
| *H04L 29/06* | (2006.01) | |
| *H04W 12/08* | (2009.01) | |
| *G06F 21/72* | (2013.01) | |
| *G06F 21/60* | (2013.01) | |

(52) U.S. Cl.
CPC .............. *H04L 63/20* (2013.01); *H04W 12/08* (2013.01); *G06F 21/72* (2013.01); *G06F 21/604* (2013.01)
USPC ........................................................... 726/1

(58) Field of Classification Search
CPC ................................ H04L 63/20; G06F 21/53
USPC ............................................................... 726/1
See application file for complete search history.

(56) References Cited

U.S. PATENT DOCUMENTS

| | | |
|---|---|---|
| 5,805,803 A | 9/1998 | Birrell et al. |
| 6,151,606 A | 11/2000 | Mendez |
| 6,154,172 A | 11/2000 | Piccionelli et al. |
| 6,609,198 B1 | 8/2003 | Wood et al. |
| 6,621,766 B2 | 9/2003 | Brewer et al. |
| 6,751,738 B2 | 6/2004 | Wesinger, Jr. et al. |
| 6,859,879 B2 | 2/2005 | Henn et al. |
| 6,883,098 B1 | 4/2005 | Roman et al. |
| 7,043,453 B2 | 5/2006 | Stefik et al. |
| 7,159,120 B2 | 1/2007 | Muratov et al. |
| 7,240,015 B1 | 7/2007 | Karmouch et al. |
| 7,254,831 B2 | 8/2007 | Saunders et al. |
| 7,269,605 B1 | 9/2007 | Nguyen et al. |
| 7,340,772 B2 | 3/2008 | Panasyuk et al. |
| 7,415,498 B2 | 8/2008 | Russo et al. |
| 7,490,073 B1 | 2/2009 | Qureshi et al. |
| 7,496,954 B1 | 2/2009 | Himawan et al. |
| 7,509,672 B1 | 3/2009 | Horwitz et al. |
| 7,526,800 B2 | 4/2009 | Wright et al. |
| 7,529,923 B2 | 5/2009 | Chartrand et al. |
| 7,596,593 B2 | 9/2009 | Mitchell et al. |
| 7,599,991 B2 | 10/2009 | Vargas et al. |
| 7,697,737 B2 | 4/2010 | Aull et al. |
| 7,761,523 B2 | 7/2010 | May et al. |
| 7,779,458 B1 | 8/2010 | Heiderscheit et al. |
| 7,788,535 B2 | 8/2010 | Bussa et al. |
| 7,788,536 B1 | 8/2010 | Qureshi et al. |
| 7,865,888 B1 | 1/2011 | Qureshi et al. |
| 7,904,468 B2 | 3/2011 | Neil et al. |
| 7,950,066 B1 | 5/2011 | Zuili |

| | | |
|---|---|---|
| 7,966,323 B2 | 6/2011 | Bocking et al. |
| 7,966,652 B2 | 6/2011 | Ganesan |
| 7,970,386 B2 | 6/2011 | Bhat et al. |
| 8,001,278 B2 | 8/2011 | Huggahalli et al. |
| 8,012,219 B2 | 9/2011 | Mendez et al. |
| 8,037,421 B2 | 10/2011 | Scott et al. |
| 8,051,180 B2 | 11/2011 | Mazzaferri et al. |
| 8,060,074 B2 | 11/2011 | Danford et al. |
| 8,085,891 B2 | 12/2011 | Owen |
| 8,095,786 B1 | 1/2012 | Kshirsagar et al. |
| 8,126,128 B1 | 2/2012 | Hicks, III et al. |
| 8,126,506 B2 | 2/2012 | Roundtree |
| 8,181,010 B1 | 5/2012 | Uchil et al. |
| 8,200,626 B1 | 6/2012 | Katzer et al. |
| 8,214,887 B2 | 7/2012 | Clark et al. |
| 8,238,256 B2 | 8/2012 | Nugent |
| 8,239,918 B1 | 8/2012 | Cohen |
| 8,272,030 B1 | 9/2012 | Annan et al. |
| 8,296,239 B2 | 10/2012 | Nonaka |
| 8,332,464 B2 | 12/2012 | Dispensa et al. |
| 8,359,016 B2 | 1/2013 | Lindeman et al. |
| 8,365,258 B2 | 1/2013 | Dispensa |
| 8,365,266 B2 | 1/2013 | Bogner |
| 8,402,011 B1 | 3/2013 | Bodenhamer |
| 8,418,238 B2 | 4/2013 | Platt et al. |
| 8,463,946 B2 | 6/2013 | Ferguson et al. |
| 8,468,090 B2 | 6/2013 | Lesandro et al. |
| 8,468,455 B2 | 6/2013 | Jorgensen et al. |
| 8,528,059 B1 | 9/2013 | Labana et al. |
| 8,560,709 B1 | 10/2013 | Shokhor et al. |
| 8,578,443 B2 | 11/2013 | Narain et al. |
| 8,601,562 B2 | 12/2013 | Milas |
| 8,613,070 B1 | 12/2013 | Borzycki et al. |
| 8,650,620 B2 | 2/2014 | Chawla et al. |
| 2002/0112047 A1 | 8/2002 | Kushwaha et al. |
| 2003/0031319 A1 | 2/2003 | Abe et al. |
| 2003/0037103 A1 | 2/2003 | Salmi et al. |
| 2003/0046366 A1 | 3/2003 | Pardikar et al. |
| 2003/0065947 A1 | 4/2003 | Song et al. |
| 2003/0131245 A1 | 7/2003 | Linderman |
| 2004/0006706 A1 | 1/2004 | Erlingsson |
| 2004/0010579 A1 | 1/2004 | Freese |
| 2004/0083273 A1 | 4/2004 | Madison et al. |
| 2004/0111640 A1 | 6/2004 | Baum |
| 2004/0205233 A1 | 10/2004 | Dunk |
| 2004/0230807 A1 | 11/2004 | Baird et al. |
| 2005/0055578 A1* | 3/2005 | Wright et al. ............... 713/201 |
| 2005/0076085 A1 | 4/2005 | Budd et al. |
| 2005/0097608 A1 | 5/2005 | Penke et al. |
| 2005/0172241 A1 | 8/2005 | Daniels et al. |
| 2005/0255838 A1 | 11/2005 | Adams et al. |
| 2005/0273592 A1 | 12/2005 | Pryor et al. |
| 2006/0075123 A1 | 4/2006 | Burr et al. |
| 2006/0085826 A1 | 4/2006 | Funk et al. |
| 2006/0094400 A1 | 5/2006 | Beachem et al. |
| 2006/0117104 A1 | 6/2006 | Taniguchi et al. |
| 2006/0120526 A1* | 6/2006 | Boucher et al. ............... 380/247 |
| 2006/0141985 A1 | 6/2006 | Patel et al. |
| 2006/0147043 A1 | 7/2006 | Mann et al. |
| 2006/0161635 A1 | 7/2006 | Lamkin et al. |
| 2006/0224742 A1 | 10/2006 | Shahbazi |
| 2006/0225142 A1 | 10/2006 | Moon |
| 2006/0242685 A1 | 10/2006 | Heard et al. |
| 2007/0005713 A1 | 1/2007 | LeVasseur et al. |
| 2007/0011749 A1 | 1/2007 | Allison et al. |
| 2007/0038764 A1 | 2/2007 | Maillard |
| 2007/0049297 A1 | 3/2007 | Gopalan et al. |
| 2007/0054627 A1 | 3/2007 | Wormald |
| 2007/0056043 A1 | 3/2007 | Onyon et al. |
| 2007/0074033 A1* | 3/2007 | Adams et al. ............... 713/176 |
| 2007/0109983 A1 | 5/2007 | Shankar et al. |
| 2007/0156897 A1 | 7/2007 | Lim |
| 2007/0180447 A1 | 8/2007 | Mazzaferri et al. |
| 2007/0186106 A1 | 8/2007 | Ting et al. |
| 2007/0198656 A1 | 8/2007 | Mazzaferri et al. |
| 2007/0199051 A1 | 8/2007 | Parikh et al. |
| 2007/0204153 A1 | 8/2007 | Tome et al. |
| 2007/0204166 A1 | 8/2007 | Tome et al. |
| 2007/0214272 A1 | 9/2007 | Isaacson |
| 2007/0226225 A1 | 9/2007 | Yiu et al. |
| 2007/0226773 A1 | 9/2007 | Pouliot |
| 2007/0248085 A1 | 10/2007 | Volpano |
| 2008/0027982 A1 | 1/2008 | Subramanian et al. |
| 2008/0047015 A1 | 2/2008 | Cornwall et al. |
| 2008/0052395 A1 | 2/2008 | Wright et al. |
| 2008/0066020 A1 | 3/2008 | Boss et al. |
| 2008/0066177 A1 | 3/2008 | Bender |
| 2008/0070495 A1 | 3/2008 | Stricklen et al. |
| 2008/0127292 A1 | 5/2008 | Cooper et al. |
| 2008/0133729 A1 | 6/2008 | Fridman et al. |
| 2008/0134292 A1 | 6/2008 | Ariel et al. |
| 2008/0141335 A1 | 6/2008 | Thomas |
| 2008/0163286 A1 | 7/2008 | Rudolph et al. |
| 2008/0196038 A1 | 8/2008 | Antonio et al. |
| 2008/0209506 A1 | 8/2008 | Ghai et al. |
| 2008/0214300 A1 | 9/2008 | Williams et al. |
| 2008/0235760 A1 | 9/2008 | Broussard et al. |
| 2008/0313648 A1 | 12/2008 | Wang et al. |
| 2008/0318616 A1 | 12/2008 | Chipalkatti et al. |
| 2009/0006232 A1 | 1/2009 | Gallagher et al. |
| 2009/0028049 A1 | 1/2009 | Boudreau et al. |
| 2009/0030968 A1 | 1/2009 | Boudreau et al. |
| 2009/0037686 A1 | 2/2009 | Mendonca |
| 2009/0037976 A1 | 2/2009 | Teo et al. |
| 2009/0077638 A1 | 3/2009 | Norman et al. |
| 2009/0119773 A1 | 5/2009 | D'Amore et al. |
| 2009/0170532 A1 | 7/2009 | Lee et al. |
| 2009/0172789 A1 | 7/2009 | Band et al. |
| 2009/0178111 A1 | 7/2009 | Moriconi et al. |
| 2009/0199277 A1 | 8/2009 | Norman et al. |
| 2009/0221278 A1 | 9/2009 | Spelta et al. |
| 2009/0222880 A1 | 9/2009 | Mayer et al. |
| 2009/0228714 A1 | 9/2009 | Fiske et al. |
| 2009/0228954 A1 | 9/2009 | Hu et al. |
| 2009/0228963 A1 | 9/2009 | Pearce et al. |
| 2009/0249359 A1 | 10/2009 | Caunter et al. |
| 2009/0325615 A1 | 12/2009 | McKay et al. |
| 2010/0077469 A1 | 3/2010 | Furman et al. |
| 2010/0100825 A1 | 4/2010 | Sharoni |
| 2010/0100925 A1 | 4/2010 | Hinton |
| 2010/0124196 A1 | 5/2010 | Bonar et al. |
| 2010/0146523 A1 | 6/2010 | Brigaut et al. |
| 2010/0146582 A1 | 6/2010 | Jaber et al. |
| 2010/0150341 A1 | 6/2010 | Dodgson et al. |
| 2010/0154025 A1 | 6/2010 | Esteve Balducci et al. |
| 2010/0192212 A1 | 7/2010 | Raleigh |
| 2010/0229197 A1 | 9/2010 | Yi et al. |
| 2010/0248699 A1 | 9/2010 | Dumais |
| 2010/0287619 A1 | 11/2010 | Chase |
| 2010/0299152 A1 | 11/2010 | Batchu et al. |
| 2010/0299376 A1 | 11/2010 | Batchu et al. |
| 2010/0317336 A1 | 12/2010 | Ferren et al. |
| 2010/0319053 A1 | 12/2010 | Gharabally |
| 2010/0325097 A1 | 12/2010 | Er et al. |
| 2010/0333165 A1 | 12/2010 | Basak et al. |
| 2011/0145833 A1 | 6/2011 | De Los Reyes et al. |
| 2011/0154477 A1 | 6/2011 | Parla et al. |
| 2011/0179484 A1 | 7/2011 | Tuvell et al. |
| 2011/0208838 A1 | 8/2011 | Thomas et al. |
| 2011/0209064 A1 | 8/2011 | Jorgensen et al. |
| 2011/0219124 A1 | 9/2011 | Allen et al. |
| 2011/0225417 A1 | 9/2011 | Maharajh et al. |
| 2011/0239125 A1 | 9/2011 | Kristensen et al. |
| 2011/0252232 A1 | 10/2011 | De Atley et al. |
| 2011/0258301 A1 | 10/2011 | McCormick et al. |
| 2011/0271279 A1 | 11/2011 | Pate |
| 2011/0276683 A1 | 11/2011 | Goldschlag et al. |
| 2011/0276699 A1 | 11/2011 | Pedersen |
| 2011/0295970 A1 | 12/2011 | Miyazawa |
| 2011/0314534 A1 | 12/2011 | James |
| 2012/0005476 A1 | 1/2012 | Wei et al. |
| 2012/0005724 A1 | 1/2012 | Lee |
| 2012/0005745 A1 | 1/2012 | Wei et al. |
| 2012/0005746 A1 | 1/2012 | Wei et al. |
| 2012/0023506 A1 | 1/2012 | Maeckel et al. |
| 2012/0036347 A1 | 2/2012 | Swanson et al. |
| 2012/0036370 A1 | 2/2012 | Lim et al. |
| 2012/0052954 A1 | 3/2012 | Zhu et al. |

| | | | | | | |
|---|---|---|---|---|---|---|
| 2012/0054853 A1 | 3/2012 | Gupta et al. | | 2013/0212212 A1 | 8/2013 | Addepalli et al. |
| 2012/0066691 A1 | 3/2012 | Branton | | 2013/0219176 A1 | 8/2013 | Akella et al. |
| 2012/0079475 A1 | 3/2012 | Hicks, III et al. | | 2013/0219211 A1 | 8/2013 | Gopinath et al. |
| 2012/0084184 A1 | 4/2012 | Raleigh et al. | | 2013/0219456 A1 | 8/2013 | Sharma et al. |
| 2012/0088540 A1 | 4/2012 | Smith et al. | | 2013/0227659 A1 | 8/2013 | Raleigh |
| 2012/0096533 A1 | 4/2012 | Boulos et al. | | 2013/0232541 A1 | 9/2013 | Kapadia et al. |
| 2012/0109384 A1 | 5/2012 | Stepanian | | 2013/0254262 A1 | 9/2013 | Udall |
| 2012/0117622 A1 | 5/2012 | Gronholm et al. | | 2013/0254660 A1 | 9/2013 | Fujioka |
| 2012/0129503 A1 | 5/2012 | Lindeman et al. | | 2013/0254831 A1 | 9/2013 | Roach et al. |
| 2012/0131116 A1 | 5/2012 | Tu et al. | | 2013/0263208 A1 | 10/2013 | Challa |
| 2012/0131685 A1 | 5/2012 | Broch et al. | | 2013/0263209 A1 | 10/2013 | Panuganty |
| 2012/0154413 A1 | 6/2012 | Kim et al. | | 2013/0291052 A1 | 10/2013 | Hadar et al. |
| 2012/0157165 A1 | 6/2012 | Kim et al. | | 2013/0297604 A1 | 11/2013 | Sutedja et al. |
| 2012/0157166 A1 | 6/2012 | Kim et al. | | 2013/0297662 A1 | 11/2013 | Sharama et al. |
| 2012/0159139 A1 | 6/2012 | Kim et al. | | 2013/0298185 A1 | 11/2013 | Koneru et al. |
| 2012/0165075 A1 | 6/2012 | Kim et al. | | 2013/0298201 A1 | 11/2013 | Aravindakshan et al. |
| 2012/0166524 A1 | 6/2012 | Watakabe et al. | | 2013/0298242 A1 | 11/2013 | Kumar et al. |
| 2012/0166997 A1 | 6/2012 | Cho et al. | | 2013/0303194 A1 | 11/2013 | Rowles |
| 2012/0167118 A1 | 6/2012 | Pingili et al. | | 2013/0311597 A1 | 11/2013 | Arrouye et al. |
| 2012/0179802 A1 | 7/2012 | Narasimhan et al. | | 2013/0318345 A1 | 11/2013 | Hengeveld |
| 2012/0179909 A1 | 7/2012 | Sagi et al. | | 2013/0333005 A1 | 12/2013 | Kim et al. |
| 2012/0185910 A1 | 7/2012 | Miettinen et al. | | 2013/0346268 A1 | 12/2013 | Pereira et al. |
| 2012/0185913 A1 | 7/2012 | Martinez et al. | | 2014/0006347 A1 | 1/2014 | Qureshi et al. |
| 2012/0198570 A1 | 8/2012 | Joa et al. | | 2014/0007183 A1* | 1/2014 | Qureshi et al. ................... 726/1 |
| 2012/0204220 A1 | 8/2012 | Lavi | | 2014/0020062 A1 | 1/2014 | Tumula et al. |
| 2012/0214472 A1 | 8/2012 | Tadayon et al. | | 2014/0020073 A1 | 1/2014 | Ronda et al. |
| 2012/0222120 A1 | 8/2012 | Rim et al. | | 2014/0032691 A1 | 1/2014 | Barton et al. |
| 2012/0233130 A1 | 9/2012 | Vedachalam et al. | | 2014/0032733 A1 | 1/2014 | Barton et al. |
| 2012/0238257 A1* | 9/2012 | Anson ......................... 455/418 | | 2014/0032758 A1 | 1/2014 | Barton et al. |
| 2012/0240183 A1 | 9/2012 | Sinha | | 2014/0032759 A1 | 1/2014 | Barton et al. |
| 2012/0254768 A1 | 10/2012 | Aggarwal et al. | | 2014/0033271 A1 | 1/2014 | Barton et al. |
| 2012/0272221 A1 | 10/2012 | Pessoa et al. | | 2014/0040638 A1 | 2/2014 | Barton et al. |
| 2012/0278454 A1 | 11/2012 | Stewart et al. | | 2014/0040656 A1 | 2/2014 | Ho et al. |
| 2012/0284325 A1 | 11/2012 | Erb | | 2014/0040978 A1 | 2/2014 | Barton et al. |
| 2012/0284779 A1 | 11/2012 | Ingrassia, Jr. et al. | | 2014/0040979 A1 | 2/2014 | Barton et al. |
| 2012/0290694 A9 | 11/2012 | Marl et al. | | 2014/0059640 A9 | 2/2014 | Raleigh et al. |
| 2012/0303476 A1 | 11/2012 | Krzyzanowski et al. | | 2014/0059642 A1 | 2/2014 | Deasy et al. |
| 2012/0303778 A1 | 11/2012 | Ahiska et al. | | 2014/0130174 A1 | 5/2014 | Celi, Jr. et al. |
| 2012/0304310 A1 | 11/2012 | Blaisdell | | | | |
| 2012/0311154 A1 | 12/2012 | Morgan | | | | |
| 2012/0311659 A1* | 12/2012 | Narain et al. .................. 726/1 | | | | |
| 2012/0324568 A1 | 12/2012 | Wyatt et al. | | | | |
| 2012/0331088 A1 | 12/2012 | O'Hare et al. | | | | |
| 2012/0331527 A1 | 12/2012 | Walters et al. | | | | |
| 2012/0331528 A1 | 12/2012 | Fu et al. | | | | |
| 2013/0002725 A1 | 1/2013 | Kim et al. | | | | |
| 2013/0007842 A1 | 1/2013 | Park et al. | | | | |
| 2013/0013653 A1 | 1/2013 | Thompson | | | | |
| 2013/0013688 A1 | 1/2013 | Wang et al. | | | | |
| 2013/0014239 A1 | 1/2013 | Pieczul et al. | | | | |
| 2013/0024424 A1 | 1/2013 | Prahlad et al. | | | | |
| 2013/0024928 A1 | 1/2013 | Burke et al. | | | | |
| 2013/0042294 A1 | 2/2013 | Colvin et al. | | | | |
| 2013/0054922 A1 | 2/2013 | Tuch et al. | | | | |
| 2013/0054962 A1 | 2/2013 | Chawla et al. | | | | |
| 2013/0055378 A1 | 2/2013 | Chang et al. | | | | |
| 2013/0059284 A1 | 3/2013 | Giedgowd, Jr. et al. | | | | |
| 2013/0066960 A1 | 3/2013 | Fieremans et al. | | | | |
| 2013/0074142 A1 | 3/2013 | Brennan et al. | | | | |
| 2013/0084847 A1 | 4/2013 | Tibbitts et al. | | | | |
| 2013/0086684 A1 | 4/2013 | Mohler | | | | |
| 2013/0091543 A1 | 4/2013 | Wade et al. | | | | |
| 2013/0097421 A1 | 4/2013 | Lim | | | | |
| 2013/0111540 A1 | 5/2013 | Sabin | | | | |
| 2013/0117240 A1 | 5/2013 | Taylor et al. | | | | |
| 2013/0117805 A1 | 5/2013 | Kent et al. | | | | |
| 2013/0130651 A1 | 5/2013 | Deasy et al. | | | | |
| 2013/0130652 A1 | 5/2013 | Deasy et al. | | | | |
| 2013/0132457 A1 | 5/2013 | Diwakar | | | | |
| 2013/0132941 A1 | 5/2013 | Lindeman et al. | | | | |
| 2013/0133061 A1 | 5/2013 | Fainkichen et al. | | | | |
| 2013/0138766 A1 | 5/2013 | Draluk et al. | | | | |
| 2013/0138810 A1 | 5/2013 | Binyamin et al. | | | | |
| 2013/0139241 A1 | 5/2013 | Leeder | | | | |
| 2013/0142043 A1 | 6/2013 | Tapia et al. | | | | |
| 2013/0145448 A1 | 6/2013 | Newell | | | | |
| 2013/0151598 A1 | 6/2013 | Fu et al. | | | | |
| 2013/0167247 A1 | 6/2013 | Brown et al. | | | | |
| 2013/0171967 A1 | 7/2013 | Ashour et al. | | | | |

FOREIGN PATENT DOCUMENTS

| | | | |
|---|---|---|---|
| EP | 1465039 A1 | 10/2004 |
| EP | 2428894 A1 | 3/2012 |
| GB | 2411320 A | 8/2005 |
| GB | 2462442 A | 2/2010 |
| WO | 9914652 A1 | 3/1999 |
| WO | 02084460 A2 | 10/2002 |
| WO | 2004107646 A1 | 12/2004 |
| WO | 2007113709 A1 | 10/2007 |
| WO | 2008086611 A1 | 7/2008 |
| WO | 2010115289 A1 | 10/2010 |

OTHER PUBLICATIONS

Notice of Allowance issued in U.S. Appl. No. 14/022,845 mailed Dec. 6, 2013.

Lowe, "Application-Specific VPNs," Dec. 13, 2005.

International Search Report and Written Opinion mailed Nov. 26, 2013 in Internation Application No. PCT/US2013/060388.

Xuetao Wei, et al., "Malicious Android Applications in the Enterprise: What Do They Do and How Do We Fix It?,"• ICDE Workshop on Secure Data Management on Smartphones and Mobiles, Apr. 2012, 4 pages.

Ranjan et al., "Programming Cloud Resource Orchestration Framework: Operations and Research Challenges", arvix.org, 2012, pp. 1-19.

Na et al., "Personal Cloud Computing Security Framework," 2010 IEEE Asia-Pacific Computing Conference, 2010, pp. 671-675.

Wilson et al., "Unified Security Framework", In proceedings of the 1st International Symposium on Information and Communication Technologies, pp. 500-505. Trinity College Dublin, 2003.

Mysore et al., "The Liquid Media System—a Multi-Device Streaming Media Orchestration Framework", Ubicomp 2003 Workshop, pp. 1-4.

Written Opinion and International Search Report, PCT/US2013/062636, Jan. 10, 2014.

International Search Report and Written Opinion dated Feb. 4, 2014 in Application No. PCT/US2013/064349.
International Search Report and Written Opinion mailed Jan. 21, 2014 in International Application No. PCT/US2013/063856.
Apple Inc., iPad User Guide for iOS 6.1 Software, Jan. 2013, Chapter 26, Accessibility, pp. 107-108.
"Citrix XenMobile Technology Overview: White Paper," Citrix White Papers online, Jul. 31, 2012, pp. 1-14; retrieved from http://insight.com/content/aam/insight/en_US/pdfs/citrix/xenmobile-tech-overview.pdf, retrieved Jan. 27, 2014.
Jun. 3, 2014 Search Report and Written Opinion issued in International Application No. PCT/US2013/060047.
Wright et al., "Your Firm's Mobile Devices: How Secure are They?". Journal of Corporate Accounting and Finance. Jul. 1, 2011. Willey Periodicals. pp. 13-21.

\* cited by examiner

*Primary Examiner* — Chau Le
(74) *Attorney, Agent, or Firm* — Banner & Witcoff, Ltd.

(57) ABSTRACT

Improved techniques for managing enterprise applications on mobile devices are described herein. Each enterprise mobile application running on the mobile device has an associated policy through which it interacts with its environment. The policy selectively blocks or allows activities involving the enterprise application in accordance with rules established by the enterprise. Together, the enterprise applications running on the mobile device form a set of managed applications. Managed applications are typically allowed to exchange data with other managed applications, but are blocked from exchanging data with other applications, such as the user's own personal applications. Policies may be defined to manage data sharing, mobile resource management, application specific information, networking and data access solutions, device cloud and transfer, dual mode application software, enterprise app store access, and virtualized application and resources, among other things.

20 Claims, 39 Drawing Sheets

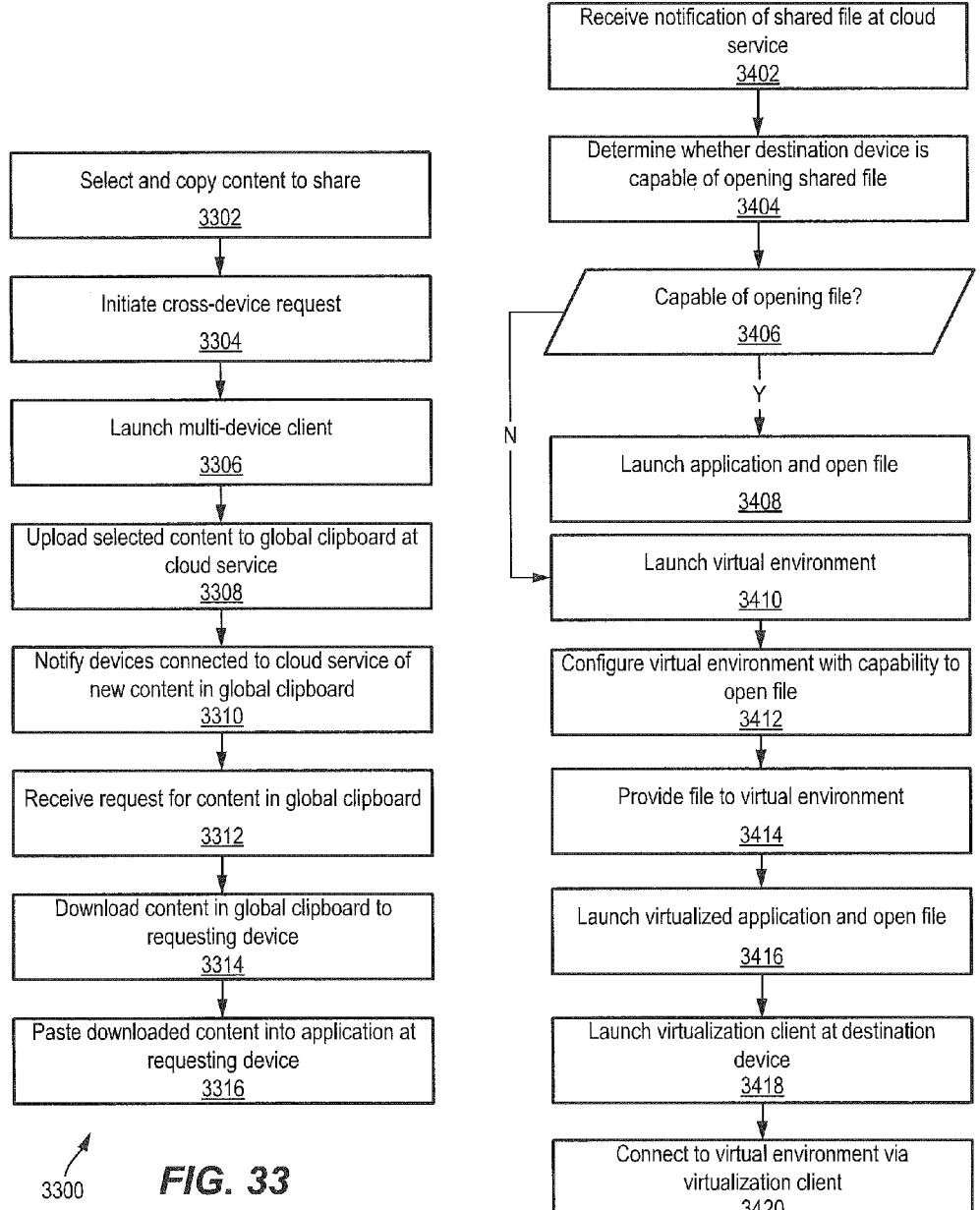

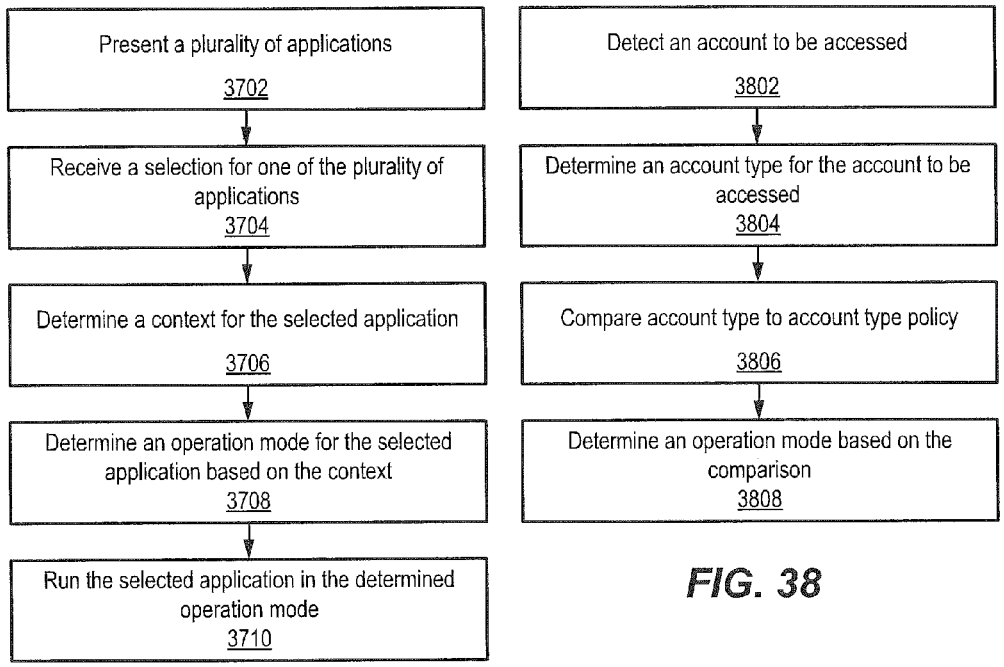
FIG. 37
FIG. 38
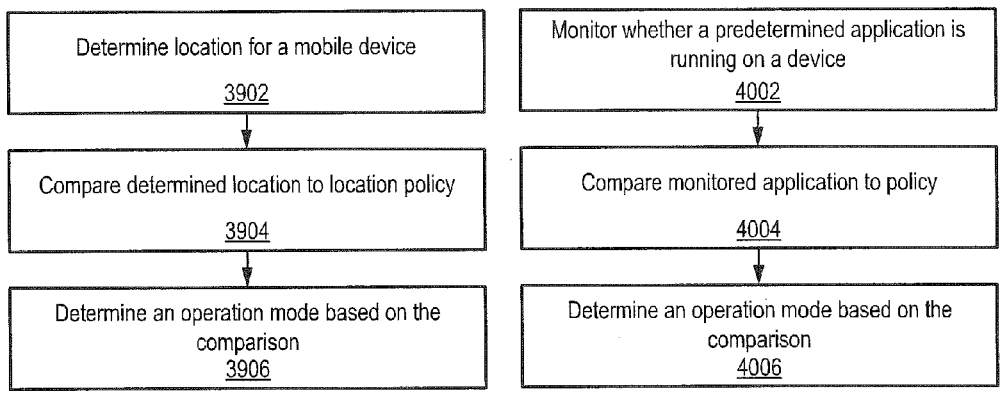
FIG. 39
FIG. 40

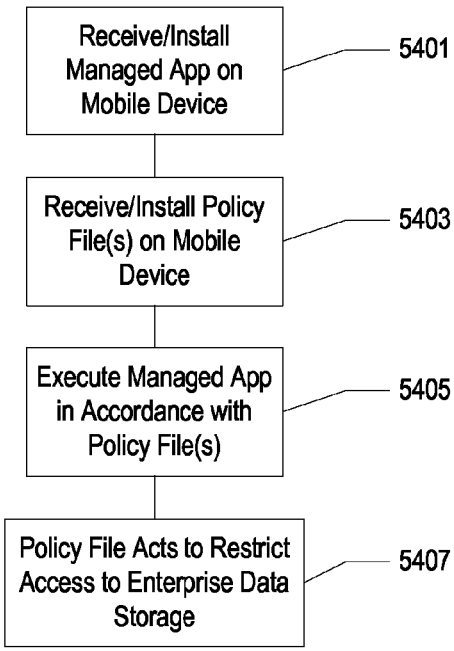
Fig. 54
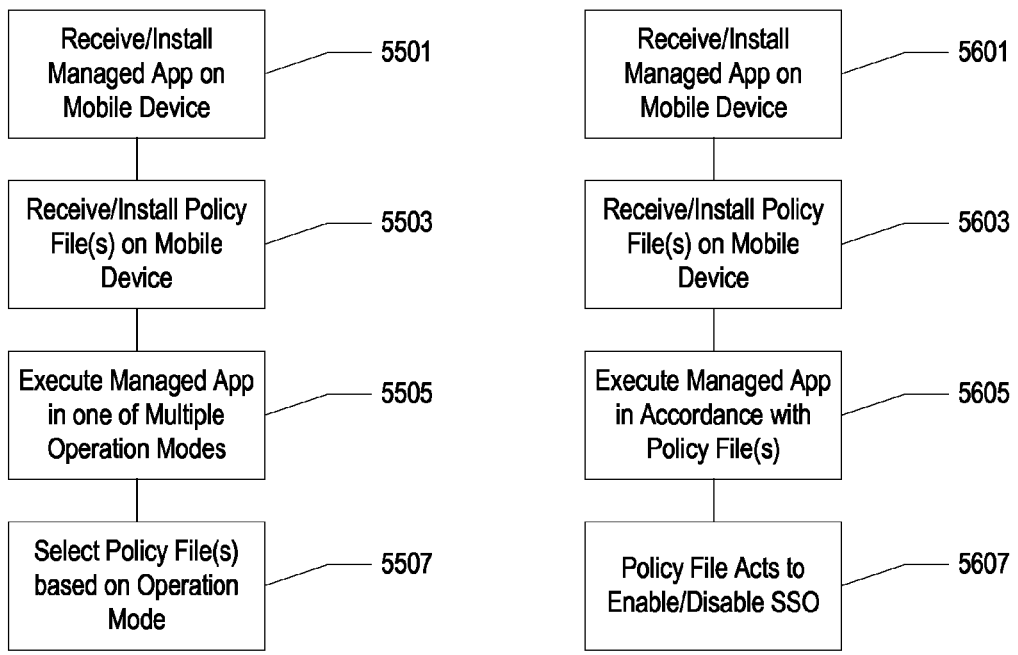
Fig. 55  Fig. 56

POLICY-BASED APPLICATION MANAGEMENT

CROSS-REFERENCE TO RELATED APPLICATIONS

This application is a continuation of Ser. No. 14/043,902, filed Oct. 2, 2013, entitled "Policy Based Application Management," which in turn claims priority to: provisional application 61/861,736, filed Aug. 2, 2013, entitled "Policy-Based Application Management"; provisional application 61/806,577, filed Mar. 29, 2013, and entitled "Systems and Methods for Enterprise Mobility Management"; provisional application 61/714,469, filed Oct. 16, 2012, entitled "Policy-Based Control of a Managed Application Derived from an Unmanaged Application"; provisional application 61/713,762, filed Oct. 15, 2012, entitled "Conveying Data Between Secure Applications Running on an Electronic Mobile Device"; provisional application 61/713,718, filed Oct. 15, 2012, entitled "Secure Data Sharing Among Managed Applications"; provisional application 61/713,763, filed Oct. 15, 2012, entitled "Per-Application Policy Controlled Access to Computerized Resources"; provisional application 61/714,293, filed Oct. 16, 2012, entitled "Managing Encrypted File Vaults for Managed Applications on Unmanaged Mobile Device"; non-provisional application Ser. No. 13/886,889, filed May 3, 2013, entitled "Application with Multiple Operation Modes"; and non-provisional application Ser. No. 13/886,765, filed May 3, 2013, entitled "Mobile Device Locking with Context." Each of the aforementioned application(s) is herein incorporated by reference in its entirety for all purposes. This application is related by subject matter to and incorporates by reference in their entirety non-provisional application Ser. No. 13/649,076, filed Oct. 10, 2012, entitled "Gateway for Controlling Mobile Device Access to Enterprise Resources" (which in turn claims priority to provisional application 61/546,021, filed Oct. 11, 2011, entitled "Systems and Methods for Management of Enterprise Mobile Devices"; provisional application 61/546,922, filed Oct. 13, 2011, entitled "Systems and Methods for Management of Enterprise Mobile Devices"; and provisional application 61/649,134, filed May 18, 2012, entitled "Mobile Device Management and Security"; and provisional application 61/702,671, filed Sep. 18, 2012, entitled "Mobile Device Management and Security"); provisional application 61/713,554, filed Oct. 14, 2012, entitled "Automated Meeting Room"; provisional application 61/712,948, filed Oct. 12, 2012, entitled "Frictionless Distributive Collaborative Work Across Time and Space"; provisional application 61/712,953, filed Oct. 12, 2012, entitled "Mobile Work and Micro Work Using an Activity Interface"; provisional application 61/712,956, filed Oct. 12, 2012, entitled "Multi-Device Interaction"; and provisional application 61/712,962, filed Oct. 12, 2012, entitled "Orchestration Framework for Connected Devices."

FIELD

Aspects described herein generally relate to mobile computing devices. More specifically, aspects described herein relate to techniques for imposing control over managed applications executing on mobile computing devices.

BACKGROUND

Some enterprises (e.g., corporations, partnerships, governments, academic institutions, other organizations, etc.) maintain enterprise computer networks that allow enterprise users, such as employees, access to enterprise resources, such as hardware and software applications for email, customer relationship management (CRM), document management, enterprise resource planning (ERP), and the like, as well as other data controlled by the enterprise. Enterprises sometimes allow remote access, such as when enterprise users are not in the enterprise network. Also, some enterprises allow users to access the enterprise network via mobile devices, such as smartphones, tablet computers, PDAs (personal digital assistant), and the like. Enterprises typically deploy enterprise mobility management (EMM) solutions to assist in the management and control of remote access to enterprise resources. EMM solutions have traditionally taken the approach of managing entire mobile devices through what are known as mobile device management (MDM) approaches. In preexisting EMM solutions, enterprises typically issue mobile devices to employees, which are intended exclusively for business use, and the enterprise maintains control over the mobile devices and all of its applications and data. A recent trend is to allow employees to use their own mobile device(s) for work purposes (a scenario known as BYOD—bring your own device). However, BYOD scenarios pose inherent security risks, because there is neither uniform nor universal control over each device.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards mobile applications operating under the control of one or more independent policy files defining one or more security, feature and/or resource limitations. Each application may execute in accordance with its corresponding set of policy files, optionally received separate from the application and which define one or more security parameters, features, resource restrictions, and/or other access controls that are enforced by a mobile device management system when that application is executing on the device. By operating in accordance with its respective policy file(s), each application may be allowed or restricted from communications with one or more other applications and/or resources. Policy files may define acceptable behavior, e.g., based on user credentials, user role, geographic location, network location, location types, enterprise mobile management (EMM) information, and/or any other information accessible or determinable by the operating device.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 33 depicts a process flow according to illustrative aspects described herein.

FIG. 34 depicts a process flow according to illustrative aspects described herein.

FIG. 37 depicts a process flow according to illustrative aspects described herein.

FIG. 38 depicts a process flow according to illustrative aspects described herein.

FIG. 39 depicts a process flow according to illustrative aspects described herein.

FIG. 40 depicts a process flow according to illustrative aspects described herein.

FIGS. 49-56 depict illustrative methods for performing policy based app management according to illustrative aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

1. Introduction

As a general introduction to the subject matter described in more detail below, aspects described herein are directed towards controlling remote access to resources at an enterprise computing system using managed mobile applications at mobile computing devices. An access manager may perform a validation process that determines whether a mobile application requesting access to enterprise resources has accurately identified itself and has not been subsequently altered after installation at the mobile computing device. In this way, the access manager may ensure the mobile application requesting access to the enterprise resource can be trusted and is not attempting to circumvent the security mechanisms used to protect those enterprise resources. As a result, individuals associated with the enterprise may advantageously utilize enterprise resources at their personal mobile devices.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

2. Computing Architecture

Figure 1:
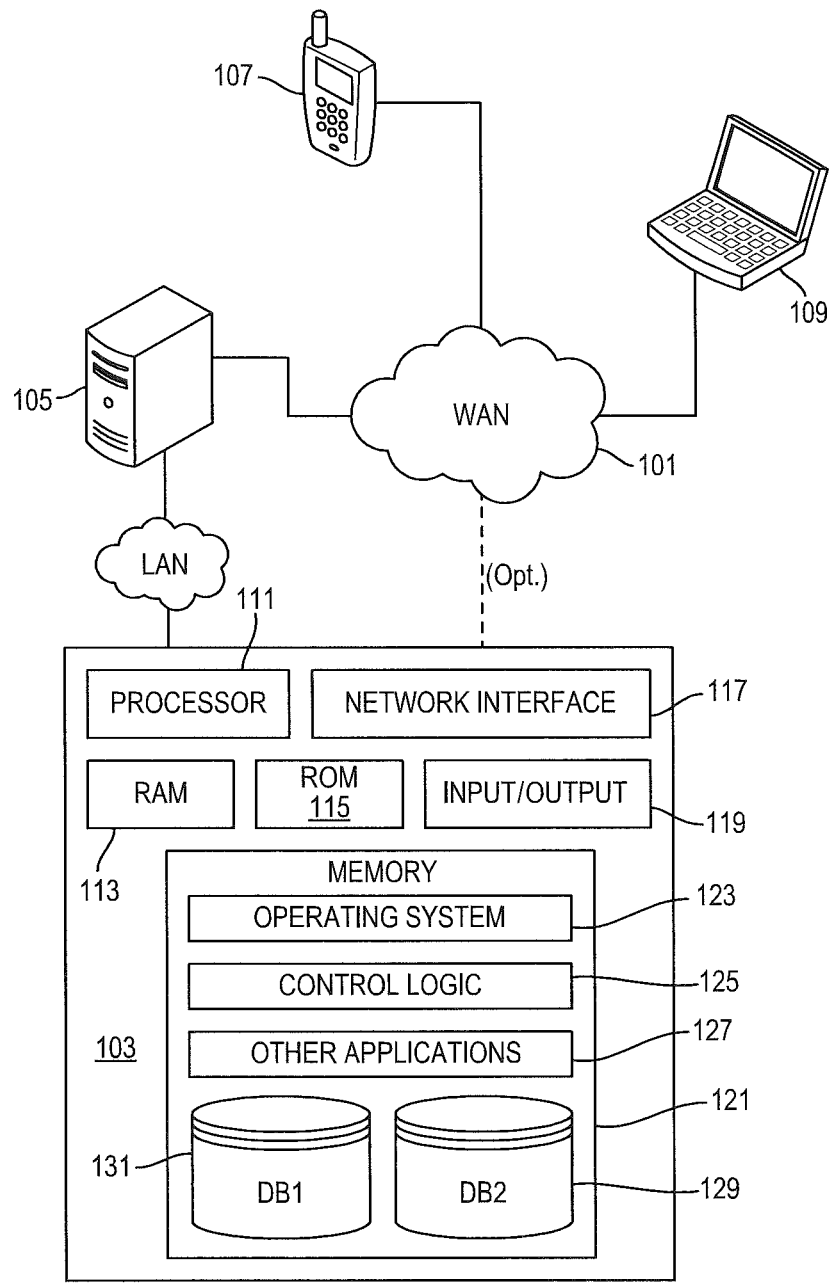
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LANs), metropolitan area networks (MAN), wireless networks, personal networks (PAN), and the like. Network 101 is for illustration purposes and may be replaced with fewer or additional computer networks. A LAN may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Javascript or ActionScript. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
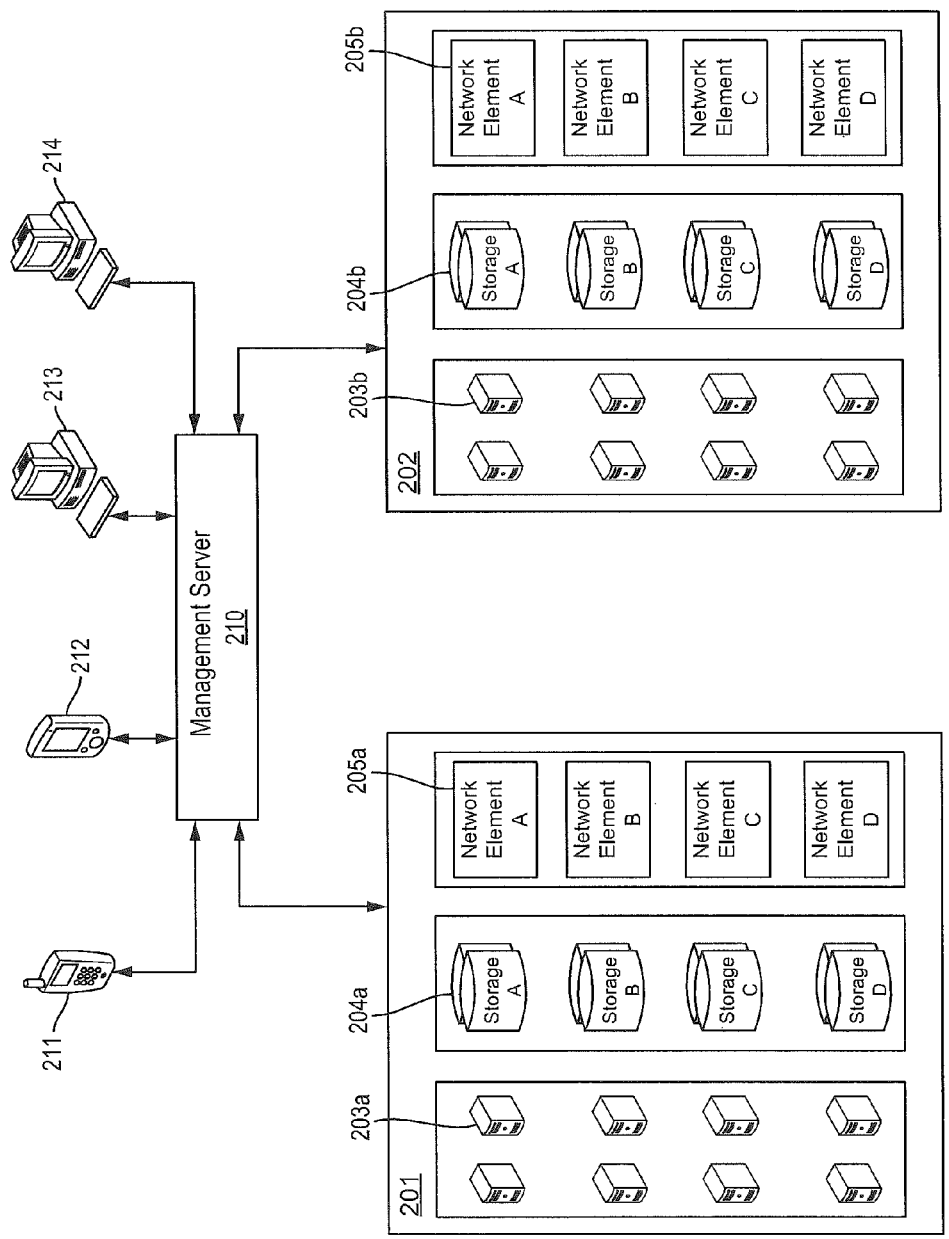
FIG. 2 depicts an illustrative cloud-based system architecture that may be used in accordance with one or more illustrative aspects described herein.

With further reference to FIG. 2, some aspects described herein may be implemented in a cloud-based environment. FIG. 2 illustrates an example of a cloud computing environment (or cloud system) 400. As seen in FIG. 2, client computers 211-214 may communicate with a cloud management server 210 to access the computing resources (e.g., host servers 203, storage resources 204, and network resources 205) of the cloud system.

Management server 210 may be implemented on one or more physical servers. The management server 210 may run, for example, CLOUDSTACK by Citrix Systems, Inc. of Ft. Lauderdale, Fla., or OPENSTACK, among others. Management server 210 may manage various computing resources, including cloud hardware and software resources, for example, host computers 203, data storage devices 204, and networking devices 205. The cloud hardware and software resources may include private and/or public components. For example, a cloud may be configured as a private cloud to be used by one or more particular customers or client computers 211-214 and/or over a private network. In other embodiments, public clouds or hybrid public-private clouds may be used by other customers over an open or hybrid networks.

Management server 210 may be configured to provide user interfaces through which cloud operators and cloud customers may interact with the cloud system. For example, the management server 210 may provide a set of APIs and/or one or more cloud operator console applications (e.g., web-based or standalone applications) with user interfaces to allow cloud operators to manage the cloud resources, configure the virtualization layer, manage customer accounts, and perform other cloud administration tasks. The management server 210 also may include a set of APIs and/or one or more customer console applications with user interfaces configured to receive cloud computing requests from end users via client computers 211-214, for example, requests to create, modify, or destroy virtual machines within the cloud. Client computers 211-214 may connect to management server 210 via the Internet or other communication network, and may request access to one or more of the computing resources managed by management server 210. In response to client requests, the management server 210 may include a resource manager configured to select and provision physical resources in the hardware layer of the cloud system based on the client requests. For example, the management server 210 and additional components of the cloud system may be configured to provision, create, and manage virtual machines and their operating environments (e.g., hypervisors, storage resources, services offered by the network elements, etc.) for customers at client computers 211-214, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 211-214 may be related, for example, different client computers creating virtual machines on behalf of the same end user, or different users affiliated with the same company or organization. In other examples, certain clients 211-214 may be unrelated, such as users affiliated with different companies or organizations. For unrelated clients, information on the virtual machines or storage of any one user may be hidden from other users.

Referring now to the physical hardware layer of a cloud computing environment, availability zones 201-202 (or zones) may refer to a collocated set of physical computing resources. Zones may be geographically separated from other zones in the overall cloud of computing resources. For example, zone 201 may be a first cloud datacenter located in California, and zone 202 may be a second cloud datacenter located in Florida. Management sever 210 may be located at one of the availability zones, or at a separate location. Each zone may include an internal network that interfaces with devices that are outside of the zone, such as the management server 210, through a gateway. End users of the cloud (e.g., clients 211-214) might or might not be aware of the distinctions between zones. For example, an end user may request the creation of a virtual machine having a specified amount of memory, processing power, and network capabilities. The management server 210 may respond to the user's request and may allocate the resources to create the virtual machine without the user knowing whether the virtual machine was created using resources from zone 201 or zone 202. In other examples, the cloud system may allow end users to request that virtual machines (or other cloud resources) are allocated in a specific zone or on specific resources 203-205 within a zone.

In this example, each zone 201-202 may include an arrangement of various physical hardware components (or computing resources) 203-205, for example, physical hosting resources (or processing resources), physical network resources, physical storage resources, switches, and additional hardware resources that may be used to provide cloud computing services to customers. The physical hosting resources in a cloud zone 201-202 may include one or more computer servers 203, such as virtualization servers, which may be configured to create and host virtual machine instances. The physical network resources in a cloud zone 201 or 202 may include one or more network elements 205 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 201-202 may include storage disks (e.g., solid state drives (SSDs), magnetic hard disks, etc.) and other storage devices.

The example cloud computing environment shown in FIG. 2 also may include a virtualization layer with additional hardware and/or software resources configured to create and manage virtual machines and provide other services to customers using the physical resources in the cloud. The virtualization layer may include one or more hypervisors, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 203 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

3. Enterprise Mobility Management Architecture

Figure 3:
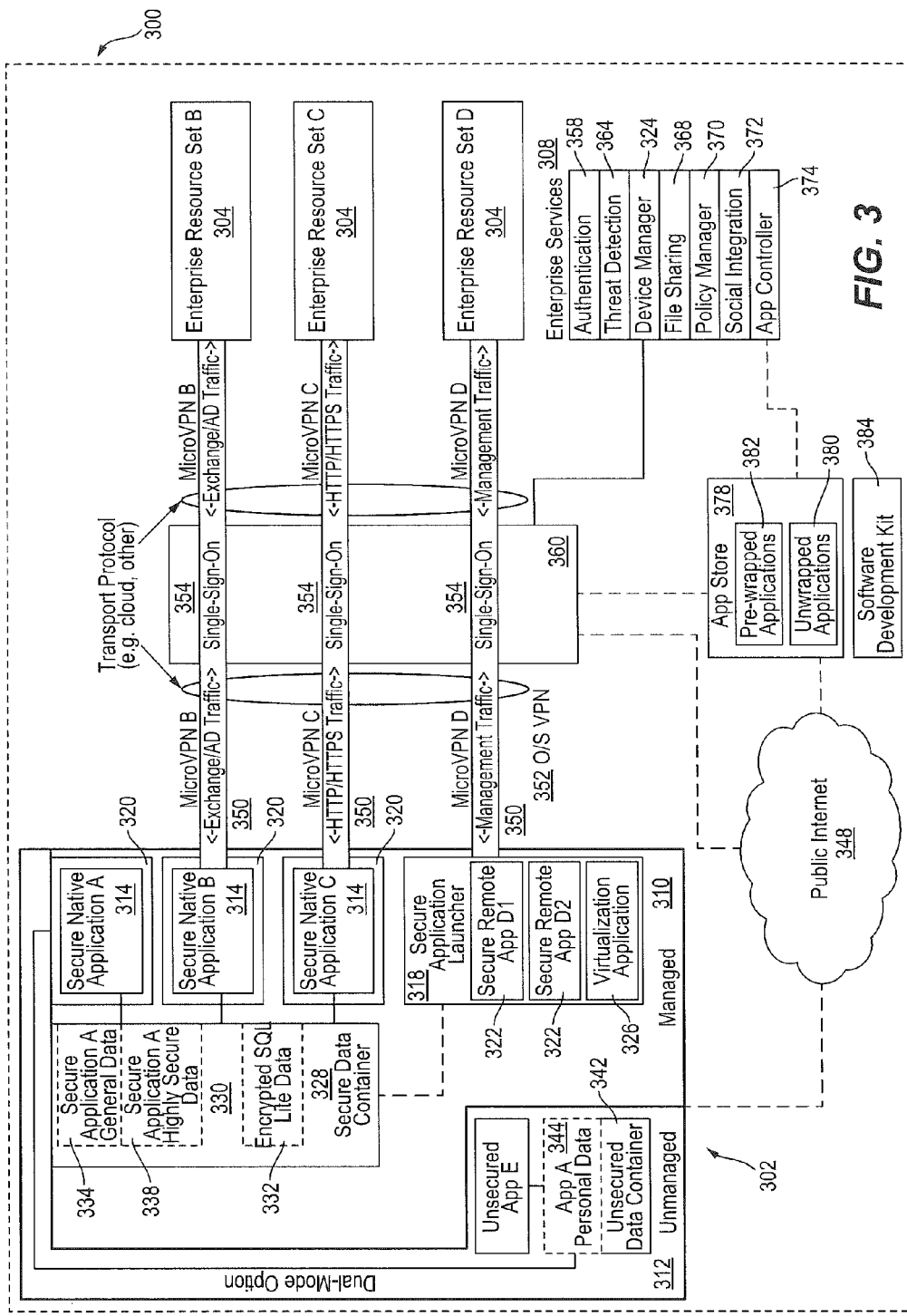
FIG. 3 depicts an illustrative enterprise mobility management system.

FIG. 3 represents an enterprise mobility technical architecture 300 for use in an enterprise environment, a BYOD environment, or other mobile environments. The architecture enables a user of a mobile device 302 (e.g., as client 107, 211, or otherwise) to both access enterprise or personal resources from a mobile device 302 and use the mobile device 302 for personal use. The user may access such enterprise resources 304 or enterprise services 308 using a mobile device 302 that is purchased by the user or a mobile device 302 that is provided by the enterprise to the user. The user may utilize the mobile device 302 for business use only or for business and personal use. The mobile device may run an iOS operating system, Android operating system, and/or the like. The enterprise may choose to implement policies to manage the mobile device 304. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 304 that is managed through the application of mobile device management policies may be referred to as an enrolled device or managed device.

In some embodiments, the operating system of the mobile device may be separated into a managed partition 310 and an unmanaged partition 312. The managed partition 310 may have policies applied to it to secure the applications running on and data stored in the managed partition. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The applications running on the managed partition may be secure applications. The secure applications may be email applications, web browsing applications, software-as-a-service (SaaS) access applications, Windows Application access applications, and the like. The secure applications may be secure native applications 314, secure remote applications 322 executed by a secure application launcher 318, virtualization applications 326 executed by a secure application launcher 318, and the like. The secure native applications 314 may be wrapped by a secure application wrapper 320. The secure application wrapper 320 may include integrated policies that are executed on the mobile device 302 when the secure native application is executed on the device. The secure application wrapper 320 may include meta-data that points the secure native application 314 running on the mobile device 302 to the resources hosted at the enterprise that the secure native application 314 may require to complete the task requested upon execution of the secure native application 314. The secure remote applications 322 executed by a secure application launcher 318 may be executed within the secure application launcher application 318. The virtualization applications 326 executed by a secure application launcher 318 may utilize resources on the mobile device 302, at the enterprise resources 304, and the like. The resources used on the mobile device 302 by the virtualization applications 326 executed by a secure application launcher 318 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 304, and the like. The resources used at the enterprise resources 304 by the virtualization applications 326 executed by a secure application launcher 318 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a GUI and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others may not be prepared or appropriate for deployment on the mobile device so the enterprise may elect to provide the mobile user access to the unprepared applications through virtualization techniques. As another example, the enterprise may have large complex applications with large and complex data sets (e.g. material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g. human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUI's and then record/pass-through user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 328 in the managed partition 310 of the mobile device. The data secured in the secure data container may be accessed by the secure wrapped applications 314, applications executed by a secure application launcher 318, virtualization applications 326 executed by a secure application launcher 318, and the like. The data stored in the secure data container 328 may include files, databases, and the like. The data stored in the secure data container 328 may include data restricted to a specific secure application 330, shared among secure applications 332, and the like. Data restricted to a secure application may include secure general data 334 and highly secure data 338. Secure general data may use a strong form of encryption such as AES 128-bit encryption or the like, while highly secure data 338 may use a very strong form of encryption such as AES 256-bit encryption. Data stored in the secure data container 328 may be deleted from the device upon receipt of a command from the device manager 324. The secure applications may have a dual-mode option 340. The dual mode option 340 may present the user with an option to operate the secured application in an unsecured mode. In an unsecured mode, the secure applications may access data stored in an unsecured data container 342 on the unmanaged partition 312 of the mobile device 302. The data stored in an unsecured data container may be personal data 344. The data stored in an unsecured data container 342 may also be accessed by unsecured applications 348 that are running on the unmanaged partition 312 of the mobile device 302. The data stored in an unsecured data container 342 may remain on the mobile device 302 when the data stored in the secure data container 328 is deleted from the mobile device 302. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 304 and enterprise services 308 at an enterprise, to the public Internet 348, and the like. The mobile device may connect to enterprise resources 304 and enterprise services 308 through virtual private network connections. The virtual private network connections (also referred to as microVPN or application-specific VPN) may be specific to particular applications 350, particular devices, particular secured areas on the mobile device, and the like (e.g., 352). For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HTTP traffic, HTTPS traffic, application management traffic, and the like. The virtual private network connections may support and enable single-sign-on authentication processes 354. The single-sign-on processes may allow a user to provide a single set of authentication credentials, which are then verified by an authentication service 358. The authentication service 358 may then grant to the user access to multiple enterprise resources 304, without requiring the user to provide authentication credentials to each individual enterprise resource 304.

The virtual private network connections may be established and managed by an access gateway 360. The access gateway 360 may include performance enhancement features that manage, accelerate, and improve the delivery of enterprise resources 304 to the mobile device 302. The access gateway may also re-route traffic from the mobile device 302 to the public Internet 348, enabling the mobile device 302 to access publicly available and unsecured applications that run on the public Internet 348. The mobile device may connect to the access gateway via a transport network 362. The transport network 362 may be a wired network, wireless network, cloud network, local area network, metropolitan area network, wide area network, public network, private network, and the like.

The enterprise resources 304 may include email servers, file sharing servers, SaaS applications, Web application servers, Windows application servers, and the like. Email servers may include Exchange servers, Lotus Notes servers, and the like. File sharing servers may include SHAREFILE servers, other file sharing services, and the like. SaaS applications may include Salesforce, and the like. Windows application servers may include any application server that is built to provide applications that are intended to run on a local Windows operating system, and the like. The enterprise resources 304 may be premise-based resources, cloud based resources, and the like. The enterprise resources 304 may be accessed by the mobile device 302 directly or through the access gateway 360. The enterprise resources 304 may be accessed by the mobile device 302 via a transport network 362. The transport network 362 may be a wired network, wireless network, cloud network, local area network, metropolitan area network, wide area network, public network, private network, and the like.

The enterprise services 308 may include authentication services 358, threat detection services 364, device manager services 324, file sharing services 368, policy manager services 370, social integration services 372, application controller services 374, and the like. Authentication services 358 may include user authentication services, device authentication services, application authentication services, data authentication services and the like. Authentication services 358 may use certificates. The certificates may be stored on the mobile device 302, by the enterprise resources 304, and the like. The certificates stored on the mobile device 302 may be stored in an encrypted location on the mobile device, the certificate may be temporarily stored on the mobile device 302 for use at the time of authentication, and the like. Threat detection services 364 may include intrusion detection services, unauthorized access attempt detection services, and the like. Unauthorized access attempt detection services may include unauthorized attempts to access devices, applications, data, and the like. Device management services 324 may include configuration, provisioning, security, support, monitoring, reporting, and decommissioning services. File sharing services 368 may include file management services, file storage services, file collaboration services, and the like. Policy manager services 370 may include device policy manager services, application policy manager services, data policy manager services, and the like. Social integration services 372 may include contact integration services, collaboration services, integration with social networks such as Facebook, Twitter, and LinkedIn, and the like. Application controller services 374 may include management services, provisioning services, deployment services, assignment services, revocation services, wrapping services, and the like.

The enterprise mobility technical architecture 300 may include an application store/distribution portal 378. The application store 378 may include unwrapped applications 380, pre-wrapped applications 382, and the like. Applications may be populated in the application store 378 from the application controller 374, e.g., by an administrator responsible for app prep, app publishing, app updates, role assignment, and/or policy definition and selection, among other functions. The application store 378 may be accessed by the mobile device 302 through the access gateway 360, through the public Internet 348 (optionally through a secure firewall), or the like. The application store may be provided with an intuitive and easy to use user interface. The application store 378 may provide access to a software development kit/self-installation kit 384. The software development kit 384 may provide a user the capability to secure unmanaged applications selected by the user by wrapping the application as described herein. An application that has been wrapped using the software development kit 384 may then be made available to the mobile device 302, e.g., by installing the wrapped version of the app, by sending the application store 378 for approval, and/or by directly populating it in the application store 378 using the application controller 374.

The enterprise mobility technical architecture 300 may include a management and analytics capability. The management and analytics capability may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 4:
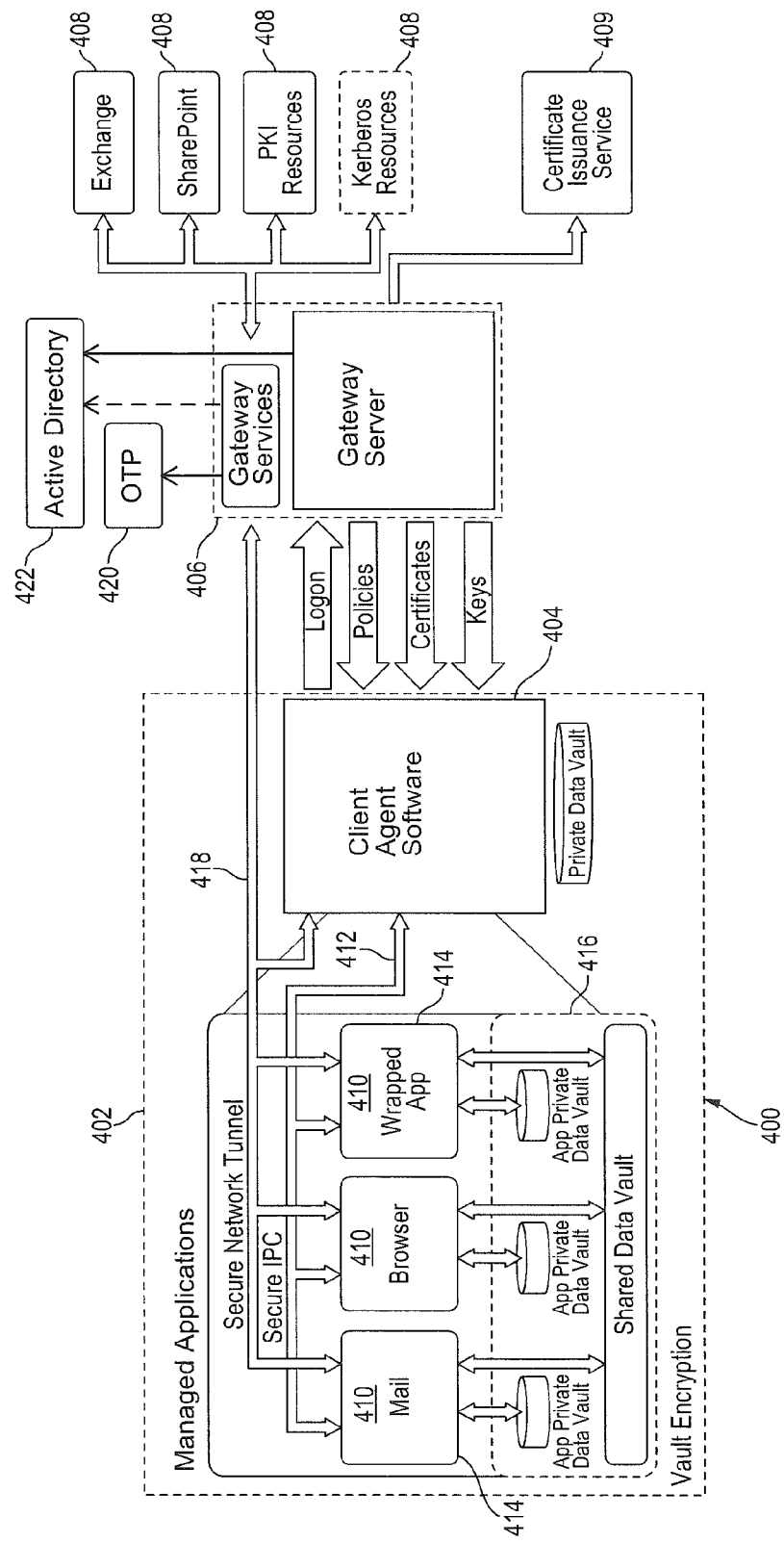
FIG. 4 depicts another illustrative enterprise mobility management system.

FIG. 4 is another illustrative enterprise mobility management system 400. Some of the components of the mobility management system 300 described above with reference to FIG. 3 have been omitted for the sake of simplicity. The architecture of the system 400 depicted in FIG. 4 is similar in many respects to the architecture of the system 300 described above with reference to FIG. 3 and may include additional features not mentioned above.

In this case, the left hand side represents an enrolled/managed mobile device 402 (e.g., client 107, 212, 302, etc.) with a client agent 404, which interacts with gateway server 406 (which includes access gateway and application controller functionality) to access various enterprise resources 408 and services 409 such as Exchange, Sharepoint, PKI Resources, Kerberos Resources, and Certificate Issuance Service, as shown on the right hand side above. Although not specifically shown, the mobile device 402 may also interact with an enterprise application store (e.g., an app store, storefront, or the like) for the selection and downloading of applications.

The client agent 404 acts as the UI (user interface) intermediary for Windows apps/desktops hosted in an Enterprise data center, which are accessed using the HDX/ICA display remoting protocol, or any other remoting protocol. The client agent 404 also supports the installation and management of native applications on the mobile device 402, such as native iOS or Android applications. For example, the managed applications 410 (mail, browser, wrapped application) shown in the figure above are all native applications that execute locally on the device. Client agent 404 and an application management framework, such as MDX (mobile experience technology) by Citrix Systems Inc. of Fort Lauderdale, Fla. (other application management frameworks may also be used), act to provide policy driven management capabilities and features such as connectivity and SSO (single sign on) to enterprise resources/services 408. The client agent 404 handles primary user authentication to the enterprise, normally to the access gateway (AG) with SSO to other gateway server components. The client agent 404 obtains policies from gateway server 406 to control the behavior of the managed applications 410 on the mobile device 402. As used herein, a managed application is one that is capable of being controlled based on and operated in accordance with independently defined and communicated policy files.

The secure IPC links 412 between the native applications 410 and client agent 404 represent a management channel, which allows client agent to supply policies to be enforced by the application management framework 414 "wrapping" each application. The IPC channel 412 also allows client agent 404 to supply credential and authentication information that enables connectivity and SSO to enterprise resources 408. Finally the IPC channel 412 allows the application management framework 414 to invoke user interface functions implemented by client agent 404, such as online and offline authentication.

Communications between the client agent 404 and gateway server 406 are essentially an extension of the management channel from the application management framework 414 wrapping each native managed application 410. The application management framework 414 requests policy information from client agent 404, which in turn requests it from gateway server 406. The application management framework 414 requests authentication, and client agent 404 logs into the gateway services part of gateway server 406 (also known as NetScaler Access Gateway). Client agent 404 may also call supporting services on gateway server 406, which may produce input material to derive encryption keys for the local data vaults 416, or provide client certificates which may enable direct authentication to PKI protected resources, as more fully explained below.

In more detail, the application management framework 414 "wraps" each managed application 410. This may be incorporated via an explicit build step, or via a post-build processing step. The application management framework 414 may "pair" with client agent 614 on first launch of an application 410 to initialize the secure IPC channel and obtain the policy for that application. The application management framework 414 may enforce relevant portions of the policy that apply locally, such as the client agent login dependencies and some of the containment policies that restrict how local OS services may be used, or how they may interact with the application 410.

The application management framework 414 may use services provided by client agent 404 over the secure IPC channel 412 to facilitate authentication and internal network access. Key management for the private and shared data vaults 416 (containers) may be also managed by appropriate interactions between the managed applications 410 and client agent 404. Vaults 416 may be available only after online authentication, or may be made available after offline authentication if allowed by policy. First use of vaults 416 may require online authentication, and offline access may be limited to at most the policy refresh period before online authentication is again required.

Network access to internal resources may occur directly from individual managed applications 410 through access gateway 406. The application management framework 414 is responsible for orchestrating the network access on behalf of each application 410. Client agent 404 may facilitate these network connections by providing suitable time limited secondary credentials obtained following online authentication. Multiple modes of network connection may be used, such as reverse web proxy connections and end-to-end VPN-style tunnels 418.

The mail and browser managed applications 410 have special status and may make use of facilities that might not be generally available to arbitrary wrapped applications. For example, the mail application may use a special background network access mechanism that allows it to access Exchange over an extended period of time without requiring a full AD logon. The browser application may use multiple private data vaults to segregate different kinds of data.

This architecture supports the incorporation of various other security features. For example, gateway server 406 (including its gateway services) in some cases will not need to validate AD passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 406 may identify managed native applications 410 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 416 (containers) on the mobile device 402. The vaults 416 may be encrypted so that all on-device data including files, databases, and configurations are protected. For on-line vaults, the keys may be stored on the server (gateway server 406), and for off-line vaults, a local copy of the keys may be protected by a user password (or other security key, e.g., biometric, etc.). When data is stored locally on the device 402 in the secure container 416, it is preferred that a minimum of AES 256 encryption algorithm be utilized.

Other secure container features may also be implemented. For example, a logging feature may be included, wherein all security events happening inside an application 410 are logged and reported to the backend. Data wiping may be supported, such as if the application 410 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key derivation functions may operate such that keys generated from the user password use KDFs (key derivation functions, notably PBKDF2) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from application management framework 414 may be prevented in other ways. For example, when an application 410 is put in the background, the memory may be cleared after a predetermined (configurable) time period. When backgrounded, a snapshot may be taken of the last displayed screen of the application to expedite the foregrounding process. The screenshot may contain confidential data and hence should be cleared.

Another security feature relates to the use of an OTP (one time password) 420 without the use of an AD (active directory) 422 password for access to one or more applications. In some cases, some users do not know (or are not permitted to know) their AD password, so these users may authenticate using an OTP 420 such as by using a hardware OTP system like SecurID (OTPs may be provided by different vendors also, such as Entrust or Gemalto). In some cases, after a user authenticates with a user ID, a text is sent to the user with an OTP 420. In some cases, this may be implemented only for online use, with a prompt being a single field.

An offline password (or biometric authentication) may be implemented for offline authentication for those applications 410 for which offline use is permitted via enterprise policy. For example, an enterprise may want the enterprise application store to be accessed in this manner. In this case, the client agent 404 may require the user to set a custom offline password and the AD password is not used. Gateway server 406 may provide policies to control and enforce password standards with respect to the minimum length, character class composition, and age of passwords, such as described by the standard Windows Server password complexity requirements, although these requirements may be modified. Biometric authentication may also or alternatively be used for one or both of offline authentication as well as a source of entropy for key derivation functions.

Another feature relates to the enablement of a client side certificate for certain applications 410 as secondary credentials (for the purpose of accessing PKI protected web resources via the application management framework micro VPN feature). For example, an application such as a corporate email application may utilize such a certificate. In this case, certificate-based authentication using ActiveSync protocol may be supported, wherein a certificate from the client agent 404 may be retrieved by gateway server 406 and used in a keychain. Each managed application may have one associated client certificate, identified by a label that is defined in gateway server 406.

Gateway server 406 may interact with an enterprise special purpose web service to support the issuance of client certificates to allow relevant managed applications to authenticate to internal PKI protected resources. Alternatively, client certificates may be issued by access gateway 360. In another example, client certificates may be provided by an EMM/MRM server (e.g., at the device level), and/or by an app controller that provisions certificates based on application-level policies.

The client agent 404 and application management framework 414 may be enhanced to support obtaining and using client certificates for authentication to internal PKI protected network resources. More than one certificate may be supported, such as to match various levels of security and/or separation requirements. The certificates may be used by the mail and browser managed applications, and ultimately by arbitrary wrapped applications (provided those applications use web service style communication patterns where it is reasonable for application management framework to mediate HTTPS requests).

Application management framework client certificate support on iOS may rely on importing a PKCS 12 BLOB (Binary Large Object) into the iOS keychain (or other container managed secrets vault protected by password, biometric validation, or other credentials) in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 402 is authenticated to the enterprise, and vice versa. Virtual smart cards for authentication to gateway server 406 may also be implemented.

Both limited and full Kerberos support may be additional features. The full support feature relates to an ability to do full Kerberos login to AD 422, using an AD password or trusted client certificate, and obtain Kerberos service tickets to respond to HTTP negotiate authentication challenges. The limited support feature relates to constrained delegation in the access gateway software, where the software supports invoking Kerberos protocol transition so it can obtain and use Kerberos service tickets (subject to constrained delegation) in response to HTTP negotiate authentication challenges. This mechanism works in reverse web proxy mode, and when HTTP (but not HTTPS) connections are proxied in VPN and MicroVPN mode.

Another feature relates to application container locking and wiping, which may automatically occur upon jail-break or rooting detections, and occur as a pushed command from administration console, and may include a remote wipe functionality even when an application 410 is not running.

A multi-site architecture or configuration of the enterprise application store and application controller may be supported that allows users to be service from one of several different locations in case of failure.

In some cases, managed applications 410 may be allowed to access a certificate and private key via an API (example OpenSSL). Trusted managed applications 410 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Other features may also be controlled, managed, enabled, disabled, locked, unlocked, blocked, unblocked, or otherwise modified based on policy, user information, or other security information. A non-exhaustive list of features includes printing, data backup, location services, camera access, microphone access, data port access, access to removable storage, URL and other inter-app dispatching, access to other mobile device hardware such as biometric devices, accelerometers, proximity sensors, NFC, etc., and access to other system services such as sending SMS messages, sending email messages, network access, and the like.

4. Policy-Based Application Management

Improved techniques involve imposing control over managed applications using one or more policy files. A managed application may be a natively managed application, or may be derived from an unmanaged application. Once a managed application has been installed on electronic equipment such as an electronic mobile device, the managed application may operates based on one or more policies which may be updated locally on the mobile device in a routine manner, by an administrator, enterprise, etc.

For example, an application source such as an app store, a software developer, etc. may operate as a repository of unmanaged apps (applications which are not under local policy control). An unmanaged app from the application source may then be decompiled, augmented with a set of instructions that impose control based on a set of one or more administrative policies, and then recompiled to form a managed application. The managed application is then offered through an application source (e.g., the same app store, a different app store, an enterprise application server, etc.) for use by mobile devices.

Once the managed application is installed on a mobile device, the managed application accesses, and operates in accordance with, a set of one or more policies (further described herein) which are separately maintained on the mobile device. Additionally, the managed application may request an updated set of policies from the application source and operate in accordance with the updated set of policies over time and in a routine manner.

Figure 5:
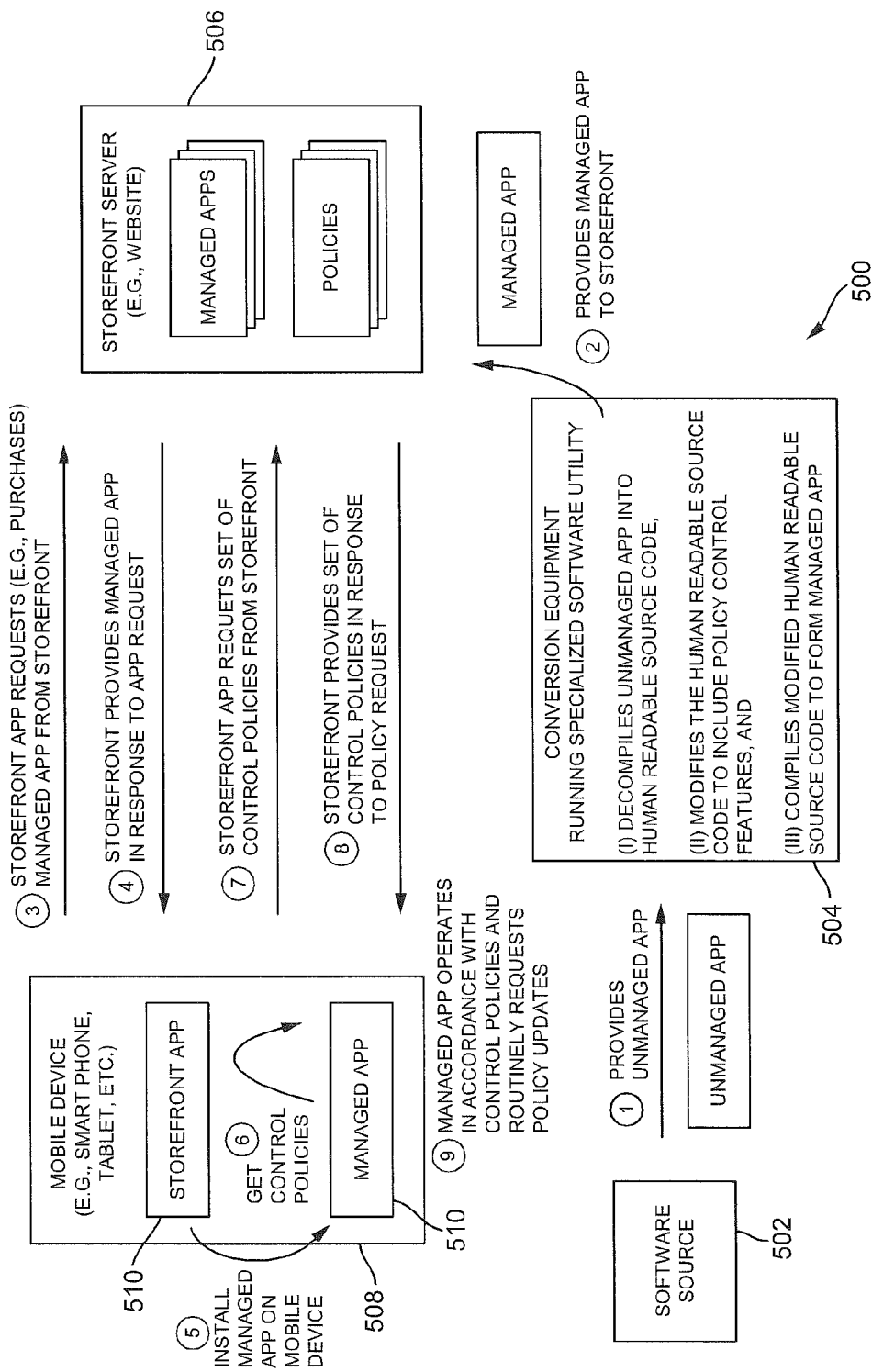
FIG. 5 depicts a process flow according to illustrative aspects described herein.

FIG. 5 shows an illustrative environment 500 which may be used to deploy and manage/administer managed apps. The electronic environment may include an application source 502, a software converting equipment 504 running a specialized software utility, a app store server 506, and a mobile device 508 (e.g., a smart phone, a tablet, client 107, 211, etc.).

It should be understood that application source 502 and app store server 506 are shown as separate apparatus although, in some arrangements, they may be the same apparatus. In some arrangements, users of mobile devices purchase managed applications from app store server 506, and the app store server operates as both a vehicle for distributing the managed applications as well as a policy server for distributing policies which control how the managed applications operate on the mobile devices.

It should be understood that the various apparatus of the electronic environment are computerized and communicate via electronic signals. For example, each computerized apparatus may include a communications interface to connect to a communications medium such as a network, memory to cache and/or persistently store information, and processing circuitry to execute an operating system and local applications.

During operation, conversion equipment 504 may run a specialized software utility which receives an unmanaged app from a software source (see step 1). The conversion equipment, when running in accordance with the specialized software utility, decompiles the unmanaged app, e.g., into DEX file(s) (Android), human readable source code, or some other editable format. The conversion equipment may then modify the human readable source code or DEX file(s) to include policy control features. In particular, the conversion equipment is constructed and arranged to analyze (e.g., scan and identify) activities and appropriate locations to inject policy based control instructions into the human readable source code or DEX file(s). The policy based control instructions act to limit how the app operates based on one or more received policy files. The conversion equipment then recompiles the human readable source code or DEX file(s) to form a managed app. Alternatively, where code is not capable of decompilation (e.g., iOS), symbol table manipulation of the application binary may be used to inject managed code by adding new library references. Run-time hooks may also be added to intercept managed functions within the application.

App store server 506 may then load the managed apps from the conversion equipment (see step 2) thus making the managed app available for distribution. Additionally, an administrator may provide policies which control the operation of the managed apps, and such policies may also be made available on the app store server for distribution.

Users of mobile devices 508 are able to browse apps offered by the app store server via app store apps installed on the mobile devices. When a user of a mobile device wishes to acquire a managed app (e.g., via a purchase), the user directs the app store app on the mobile device to request the managed app (see step 3). The app store server response to the app request by providing the managed app to the mobile device (see step 4).

The user then installs the managed app on mobile device 508 (see step 5). Such installation may be automatically triggered by the app store app (e.g., the app store app automatically directs the operating system to install the managed app), or manually coordinated by the user.

When the user initially invokes the managed app 510, the managed app may communicate with the app store app 512 to obtain a set of policies (see step 6). Such a set of policies may have been provided to the app store app from the app store server during purchase. However, if the set of policies is not present, the app store app sends a policy request to the app store server for a set of policies (see step 7). In response to the policy request, the app store server provides the set of policies to the mobile device (see step 8). It should be understood that the set of policies and the managed app are separate software constructs.

At this point, the managed app is able to run in accordance with the set of policies and thus enable the user to perform useful work (see step 9). Optionally, the set of policies may dictate times in which the managed app is to request an updated set of policies. For example, the set of policies may direct the managed app to obtain a new set of policies daily, every two or three days, and so on.

When the managed app requires a new set of policies, the managed app signals or queries the app store app to retrieve the new set of policies from the app store server (see step 6 again). That is, the app store app operates as a proxy and obtains the new set of policies from the app store server on behalf of the managed app. In some arrangements, the mobile device runs multiple managed apps, and the same app store app communicates with the app store server on behalf of each managed app.

One embodiment is directed to a method of generating a managed application from an unmanaged application. The method includes receiving, by processing circuitry, an unmanaged application from an application source, the unmanaged application being constructed and arranged to execute on a mobile device. The method further includes decompiling or otherwise deconstructing, by the processing circuitry, the unmanaged application into unmanaged editable form. The method further includes adding, by the processing circuitry, a set of policy based control instructions to the unmanaged editable code to form managed source code, the set of policy based control instructions being constructed and arranged to provide policy based control. The method further includes compiling, by the processing circuitry, the managed source code to form a managed application which, when executed on a mobile device, is constructed and arranged to access and operate in accordance with a set of policies which is separately stored on the mobile device.

Examples of suitable processing circuitry includes particular hardware of various software development platforms such as servers, general purpose computers, client workstations, any hardware and/or software described herein, and so on. Such platforms may be equipped with various software development tools including compilers, linkers, libraries, editors, debuggers, other runtime environment and test utilities, and so on.

Another embodiment is directed to a method of operating an electronic mobile device. The method includes receiving, by a processor of the electronic mobile device, a managed application from an application server during a first communication, the managed application being constructed and arranged to access and operate in accordance with a set of policies. The method further includes receiving, by the processor, the set of policies from the application server during a second communication which is different than the first communication, the set of policies being stored on the electronic mobile device separately from the managed application. The method further includes running, by the processor, the managed application on the mobile device, the managed application accessing and operating in accordance with the set of policies which is stored on the electronic mobile device separately from the managed application.

Other embodiments are directed to electronic systems and apparatus, processing circuits, computer program products, and so on. Some embodiments are directed to various processes, electronic components and circuitry which are involved in generating, deploying and operating managed apps derived from unmanaged apps.

Mobile devices allow users to purchase and download applications for their device from an external Web Site or Service commonly referred to as an app store or the like. The application that browses these app store services is known as a app store-Application (a web browser may alternatively be used). Once the app store Application has downloaded and installed an application, typically management of that application may cease. For example, loss of entitlement to the application, or changes to the allowed uses of the application, may not be maintained or enforced. Once the application is installed on a device, the enterprise or corporation that distributed it may lose the ability to control access to the application.

Many vendors offer conventional solutions that manage the entire device. For example, a user wishing to install managed applications must first enroll their device into a corporate Enterprise Mobile Management system (EMM), which manages resources such as applications, (mobile application management, or MAM), devices (mobile device management, or MDM), enterprise services to which a device may communicate (mobile enterprise management), software, settings, features, remote tools, virtualized apps, etc., and/or other features of a device and/or application. These EMM services typically require strict adherence to corporate security policies, forcing the user to comply if they want to install the applications, use a device in a particular manner, or connect with an enterprise service. In addition, by enrolling their device in an EMM system, often times the user must relinquish his/her control over certain aspects of the device, such as the ability to not have a passcode or password set. Secure management and technical support of mobile devices associated with an enterprise is referred to herein as Enterprise Mobility Management or Enterprise Mobile Management (EMM). Management of any device, application, or accessible tool is also referred to herein as Mobile Resource Management (MRM). EMM and MRM may include one or both of MDM and/or MAM, as discussed further herein.

Many employees would prefer to use their own devices but without enrolling their device in some EMM service. Accordingly, aspects herein provide a way for corporations to manage applications on unmanaged devices, e.g., in a Bring Your Own Device (BYOD) environment.

Improved techniques discussed above and herein provide various ways by which a corporation can add management to applications and devices, and distribute those applications to unmanaged devices.

Some techniques are directed to a system and method for adding management to applications that are to be distributed to unmanaged devices. The system includes an application running on a mobile device that acts as a app store application for downloading and installing other applications from one or more sites or services acting as a app store. The system further includes a software utility that takes as input an unmanaged application and outputs the same application with additional management software added. The system further includes a set of security policies or rules that control how the managed application is expected to operate.

Some techniques are directed to methods which involve an administrator generating a managed application by submitting an unmanaged application to the software utility. The method includes the software utility decompiling the original application into byte code. The method further includes modification of the byte code to inject the management software and components. The method further includes recompiling the modified application into a new and managed version of the application. The method further includes the managed application being posted to a app store and made available for download and install by the app store application. The method further includes the managed application periodically contacting the app store application to confirm entitlement and to refresh the security policies.

Some improved techniques provide ways for an enterprise to provide managed applications to unmanaged devices, alleviating the need to enroll the device into EMM systems. Some improved techniques provide ways by which an enterprise can distribute and control access to specific applications and data on devices that are not in its direct control, even if those applications were originally written with no management software included.

Some techniques are directed to a software utility (and associated methods) which dynamically injects management code into existing unmanaged applications. In this way, even applications that were originally developer without any management software can be added to the list of enterprise managed applications.

Furthermore, the app store application now acts as an authentication and security policy management application. This extends the intent and use for a conventional app store application in an improved way, allowing for management of specific applications on unmanaged devices.

Alternative conventional approaches usually involve either device management (where the entire device is enrolled into a management system) or rewriting applications with specific management components added as part of the core design of the application. However, with the above-described improved techniques, control may be imposed and dynamically updated via policies which are routinely deployed locally to the mobile devices to direct the operation of the managed apps.

It should be understood that the above-provided description may discuss particular operations of the applications figuratively (i.e., as the applications performing the operations). However, it should be further understood that is actually processing circuitry (e.g., a set of processors, other hardware, etc.) that actually performs operations while executing the applications.

Managed apps, i.e., apps that operate according to an enterprise-defined policy, may be configured to operate in countless ways. The managed configuration of the app is limited only by what is included in the one or more policy files that apply to that app. In addition, managed apps may run in a mobile device sandbox, or managed apps may run generally on a computing device and not within a formal sandbox generated by the operating system of that device. The following sections provides various illustrative examples of policies that may be used in combination with other technologies and aspects, but are in no way meant to be limiting of the types or numbers of policies that may be used.

5. Data Sharing

According to an illustrative aspect, one or more policies used with managed applications, as described in section 4, above, may define how the managed application operates to share data between applications executing on a mobile device.

Figure 14:
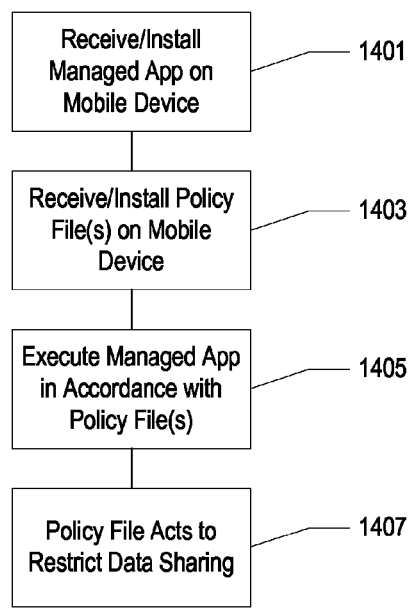
FIG. 14 depicts an illustrative method for performing policy based app management according to illustrative aspects described herein.

FIG. 14 illustrates an example of such a process. Initially, a managed application may be received and/or installed in step 1401 on a mobile electronic device, such as a smartphone, tablet, laptop or the like. In step 1403 the device may separately and/or distinctly receive one or more policy files defining one or more operational and/or behavioral limitations of the managed app, e.g., based on enterprise security policy. While the policy files may be optionally received as separate files, the policy files may be received as part of a same communication or installation process as the managed app.

In step 1405 the mobile device executes the managed app in accordance with the policy files. That is, the mobile device security manager (or equivalent process) restricts operations of the managed app as defined by the one or more policy files. In step 1407, during operation of the managed app and based on one or the policy files, a data sharing feature of the managed app may be restricted, that might otherwise have been allowed had the policy file(s) not been enforced. Various examples of such data sharing restriction are provided in more detail below, as may be used in accordance with FIG. 14 and/or other processes described herein.

5.a. Secure Cut & Paste

On modern operating systems such as iOS, Android and Windows, there is a mechanism typically called the "pasteboard" or "clipboard" that is used to share data between applications. The user can "copy" data from one application into the clipboard, and then "paste" it from the clipboard into a second application. One problem is that the data put into the clipboard is not secured in any way, and sometimes there is a need to secure it such that only a defined set of managed applications can share this data, hiding it from other non-managed applications. Aspects described herein provide a mechanism for redirecting copy and paste operations to the parallel encrypted clipboard, that only managed applications have access to.

In order to provide secure copy and paste functionality between a set of managed applications, the circuitry redirects copy and paste operations to a parallel secure clipboard. This parallel clipboard is hidden from general view by other applications (any app without the appropriate policy file), and all data written to it is encrypted. Only managed applications know how to access this hidden, encrypted clipboard.

In addition, to allow the user to copy and paste data from insecure application to one of the managed applications, a synchronization method monitors the unsecure clipboard for changes, and writes the changes to the secure clipboard as needed.

Conventional smart phones enable one application (or "app") to copy data to a general clipboard, and then another app to paste that data from the general clipboard into a workspace of the other app. For example, a user may copy text from a webpage of a browser app into the general clipboard, and then paste that text from the general clipboard into an email message of an email app.

It should be understood that there are deficiencies to the method of conventional smart phones and their approaches to handling data via the general clipboard. In particular, the general clipboard provides an easy vehicle for exposing secure data. For example, suppose that a company wishes to restrict data sharing to a managed set of apps. Unfortunately, the user of a conventional smart phone is able to simply copy secure data from one app to the general clipboard and then paste that secure data from the general clipboard to another app and thus allowing the secure data to escape.

In contrast to the above-described conventional smart phone which enables a user to easily expose secure data via the general clipboard, an illustrative policy file may define a secure clipboard that may be used to share data out of a managed app. All managed apps using the same policy (namely, defining the same secure clipboard), would then be able to share data, whereas unmanaged apps would not. Even further, two different managed apps whose policy files defined different secure clipboards also would not be able to share data. Thus, herein described are improved techniques for conveying data between secure applications running on an electronic mobile device via a secure clipboard. As used herein, a secure clipboard may refer to a clipboard whose storage location is hidden, e.g., known only to those applications that are permitted to access the secure clipboard, and/or encrypted, e.g., and only those applications that are permitted to access the secure clipboard know or have access to the encryption/decryption keys. The secure clipboard may be defined only to a set of secure (or "managed") applications running on the mobile device (e.g., via policies). Moreover, all data may be encrypted by the managed app writing the data to the secure clipboard, and then decrypted by another managed app reading the data from the secure clipboard thus preventing exposure of the data even if the location of the hidden clipboard is discovered. The location and/or type of secure clipboard, as well as the encryption used, may be defined in a policy file.

Figure 15:
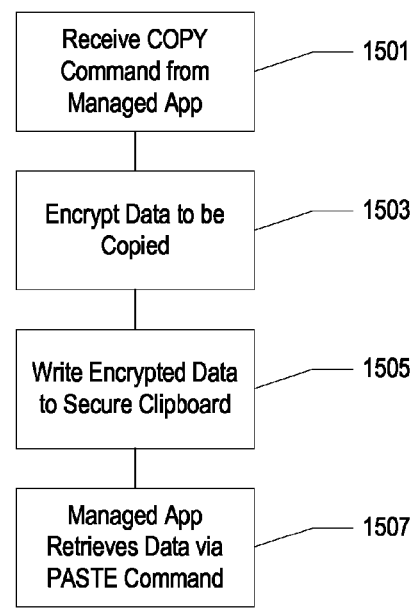
FIG. 15 depicts an illustrative method for performing policy based app management according to illustrative aspects described herein.

With reference to FIG. 15, one illustrative embodiment is directed to a method of conveying data between secure applications running on the electronic mobile device (e.g., as described above) which is performed in an electronic mobile device having (i) processing circuitry and (ii) memory. The method includes receiving in step 1501, by the processing circuitry, a copy command; and encrypting in step 1503, by the processing circuitry and in response to the copy command, original data from a first secure application to form encrypted data. The method further includes writing in step 1507, by the processing circuitry and in response to the copy command, the encrypted data to a secure clipboard residing in the memory to enable a second secure application in step 1509 to subsequently read and decrypt the encrypted data from the secure clipboard, the secure clipboard residing at a location of the memory which is different than that of a general clipboard residing in the memory, the general clipboard being accessible by a set of unsecure applications running on the electronic mobile device. Alternatively, in step 1509, the same managed app may read from the secure clipboard, e.g., to cut and paste from one location to another within the managed app.

Other embodiments are directed to electronic systems and apparatus (e.g., mobile devices), processing circuits, computer program products, and so on. Some embodiments are directed to various processes, electronic components and circuitry which are involved in conveying data between secure applications running on the electronic mobile device which is performed in an electronic mobile device.

Figure 6:
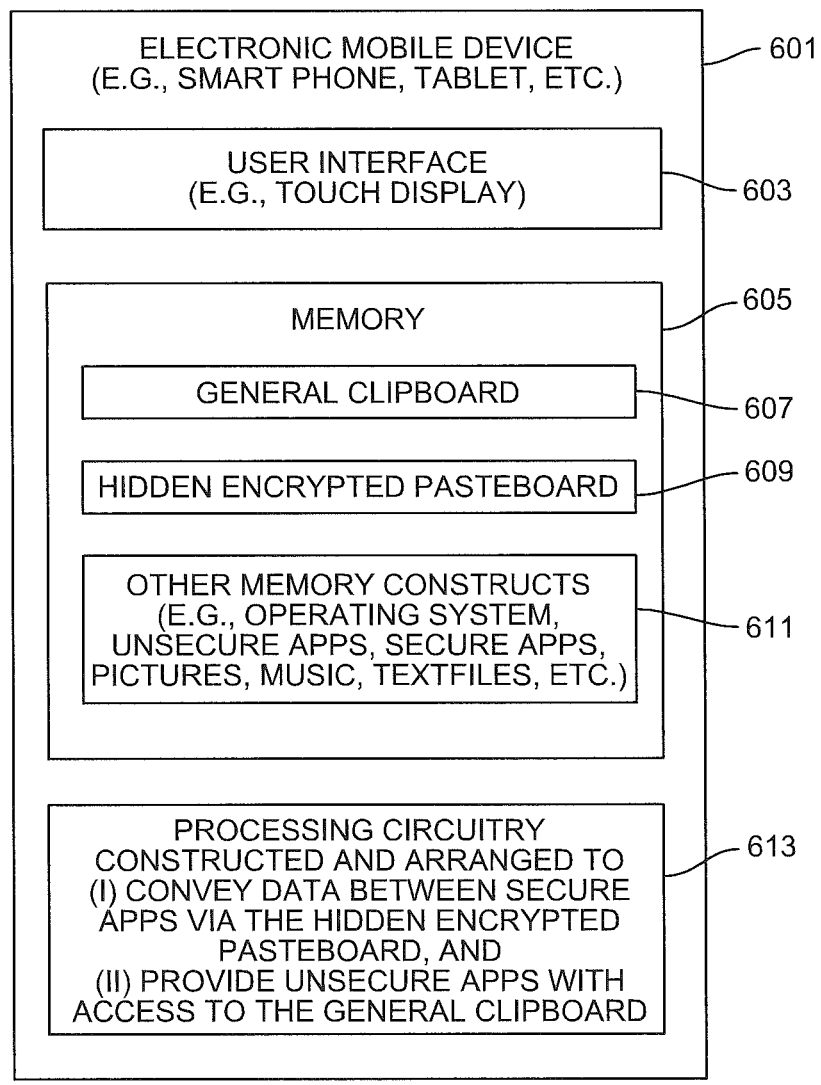
FIG. 6 depicts a device according to illustrative aspects described herein.
Figure 7:
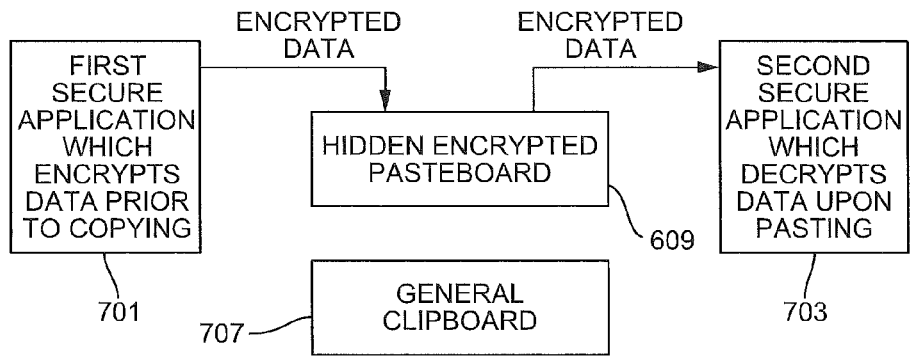
FIG. 7 depicts a data flow according to illustrative aspects described herein.

FIG. 6 shows an illustrative electronic mobile device 601 which is suitable for use in conveying data between secure applications. The electronic mobile device may include, among other things, a user interface 603 for user input/output, memory 605 to store data, and processing circuitry 613. Examples of suitable mobile devices include smart phones, tablet devices, electronic notebooks, or any other mobile device described herein. In the context of smart phones, various specific platforms are suitable for use such as those running iOS provided by Apple Computer, Android provided by Google, and Windows provided by Microsoft, among others.

During operation, the electronic mobile device 601 responds to user commands by performing operations such as launching applications, establishing connections to external devices (e.g., cellular calls, WiFi connections, etc.) to exchange wireless signals, and performing useful work. Along these lines, the processing circuitry of the electronic mobile device runs a set of (i.e., one or more) unsecure applications, and a set of secure applications.

When the processing circuitry 613 runs an unsecure application, the processing circuitry is configured to access the general clipboard 607 for copy and paste operations in a traditional manner. For example, while the processing circuitry runs a first unsecure application, the user is able to copy data from the first unsecure application to the general clipboard 607. Additionally, the while the processing circuitry runs a second unsecure application, the user is able to paste the copied data from the general clipboard 607 into a workspace of the second unsecure application.

However, as illustrated in FIG. 6, the secure applications 701, 703 are configured to access the secure clipboard 609. In particular, to perform a copy operation using a secure application, the processing circuitry encrypts the data and then writes the encrypted data into the secure clipboard 609 (bypassing the general clipboard 607). Furthermore, to perform a paste operation using a secure application, the processing circuitry reads data from the secure clipboard 609, and decrypts the data before placing the decrypted data into the workspace of that secure application. Accordingly, the data is never exposed outside the secure applications.

In some arrangements, the mobile device 601 and/or managed app is configured to synchronize secure clipboard 609 with general clipboard 607 when a copy event occurs in an unmanaged app. Device 601 may therefore be configured to also input data from the general clipboard into the secure applications. According to one aspect, copying of data into the general clipboard by an unsecure (unmanaged) application creates a detectable copy event. When the processing circuitry runs a secure application that receives an indication of the copy event, the processing circuitry may read the data from the general clipboard, encrypt the data to form encrypted data, and write the encrypted data into the secure clipboard. Accordingly, the data within the secure clipboard is now synchronized with the data in the general clipboard and the secure application which has access to the secure clipboard may now access the data from an unmanaged app by reading the data from the secure clipboard.

In some arrangements, mobile device 601 equips different groups of secure applications to use different secure clipboards. For example, the processing circuitry may provide (i) a first memory address of the secure clipboard and a first set of cryptographic keys to a first group of secure applications, (ii) a second memory address to another secure clipboard and a second set of cryptographic keys to a second group of secure applications, and so on. Such deployment and configuration of the secure applications may be effectuated via policies to group applications where the policies dictate a particular group, keys and secure clipboard to each secure application.

Using the above described technology, illustrative aspects are directed to a system to prevent sensitive data from being shared outside of a managed set of applications. A company may wish to restrict data sharing to this managed set of applications, allowing full bidirectional access, but also potentially allowing incoming insecure data, such as text from a webpage, to be copied into one of the managed applications.

Furthermore, in some cases a system administrator may choose to entirely disable copy and paste functionality, either for a single application, a group of applications, or all managed applications. This is achieved by adding appropriate enforcement criteria in the policy file.

Also, there may be a need to have multiple application groups, each with its own secure clipboard. This is achieved by using policies to group applications, and then provide each group with their own separate secure clipboard.

Using aspect described above, in some mobile devices copy and paste between managed applications is totally secured by using a secure clipboard. In addition, synchronization with an unsecure clipboard allows a user to copy and paste data from an unsecure app into a secure app, but not vice versa. Copy and paste functionality can be completely blocked based on policies set by a system administrator.

Figure 44:
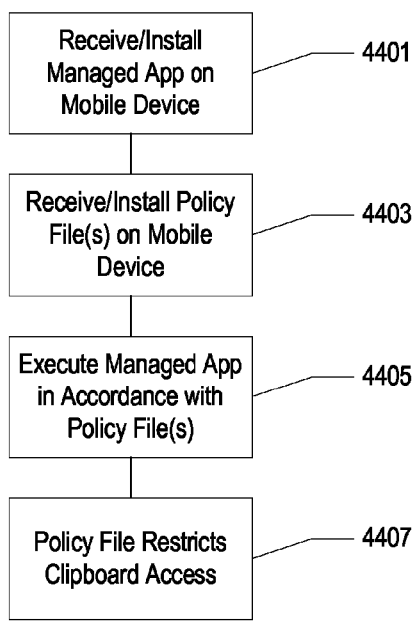
FIG. 44 depicts an illustrative method for performing policy based app management according to illustrative aspects described herein.

FIG. 44 illustrates an example of such a process. Initially, a managed application may be received and/or installed in step 4401 on a mobile electronic device, such as a smartphone, tablet, laptop or the like. In step 4403 the device may separately and/or distinctly receive one or more policy files defining one or more operational and/or behavioral limitations of the managed app, e.g., based on enterprise security policy. While the policy files may be optionally received as separate files, the policy files may be received as part of a same communication or installation process as the managed app.

In step 4405 the mobile device executes the managed app in accordance with the policy file(s). That is, the mobile device security manager (or equivalent process) restricts operations of the managed app as defined by the one or more policy files. In step 4407, during operation of the managed app and based on one or the policy files, a cut and paste feature of the managed app may be restricted as described above, where such cut and paste feature might otherwise have been allowed had the policy file(s) not been enforced. Various examples of such cut and paste restriction as described above may be enforced.

5.b. Sharing Data Between Managed Apps

Additionally, depending on settings of particular policies, applications within a set of managed applications can be constrained to exchange files and/or data only with other managed applications within the set. In some arrangements, API calls from a managed application are intercepted by injected (or wrapped) code which operates to 'contain' the application. A particular policy is read, and the operation specified by the API call is either blocked or allowed depending on the settings in the policy. When the policy file has a record of all applications in the set of similarly managed applications (e.g., based on an application group identifier, an enumerated list of applications, or any other mechanism that identifies a discrete set of applications), the application, by reading the policy file, can test whether the requested operation of the API call involves an application inside or outside the set, and allow or block activity accordingly. Thus, based on policy settings, movement of data can be restricted such that data within the set of managed applications is not comingled with data outside the managed set.

A process of intercepting an API call, consulting an application's policy, and allowing or blocking the operation specified by the API call based on the policy can be carried out in a number of contexts. In one example, the above process can be applied for selecting a set of applications on the mobile device that can be used to open a file or data element identified by a link or icon (e.g., using Open-In). In another example, the above process can be applied for copying data or data objects from one application and pasting the data or data objects into another application (e.g., via a hidden, encrypted paste buffer). In yet another example, the above process can be applied for moving files into and/or out of a protected file vault. Essentially, any operation used to move data into and/or out of an application can make use of the above techniques.

According to another aspect, data sharing may be limited by the fact that a set of applications are included within a same management policy. According to an aspect, by managing enterprise applications on mobile devices using policy files, an enterprise may allow users to access enterprise applications from their own mobile devices. The enterprise applications securely coexist with the users' own personal applications and data, based on the defined policy. Enterprise mobile applications are specially created or adapted in such a way that they are forced to interact with other applications and services on a mobile device through respective application policies. Each enterprise mobile application running on the mobile device has an associated policy through which it interacts with its environment. The policy selectively blocks or allows activities involving the enterprise application in accordance with rules established by the enterprise. Together, the enterprise applications running on the mobile device form a set of managed applications. The policy associated with each of the managed applications may include a record of each of the other managed applications. Typically, policy settings for interacting with managed applications are different from policy settings for interacting with other applications, i.e., applications which are not part of the managed set, such as a user's personal mobile applications. Managed applications are typically allowed to exchange data with other managed applications, but may be blocked from exporting data to unmanaged applications.

In some examples, application policies of managed applications are configured to allow links and/or icons presented in one managed application to be followed or opened in another application only if the other application is also a managed application. For example, a managed email application can be configured, through its policy, to allow an attachment to be opened in a managed PDF annotator. But the same managed email application can be configured to prevent the same attachment from being opened in a PDF annotator that is not part of the managed set.

By constraining managed applications to interact on a mobile device through enterprise-administered policies, the managed set of applications can thus be made to operate with other applications in the managed set of applications, but can be prevented from operating with applications that are not part of the managed set. Leakage of enterprise information out of the managed set of applications can thus be prevented, as can be receipt of personal information into the managed set of applications.

Figure 49:
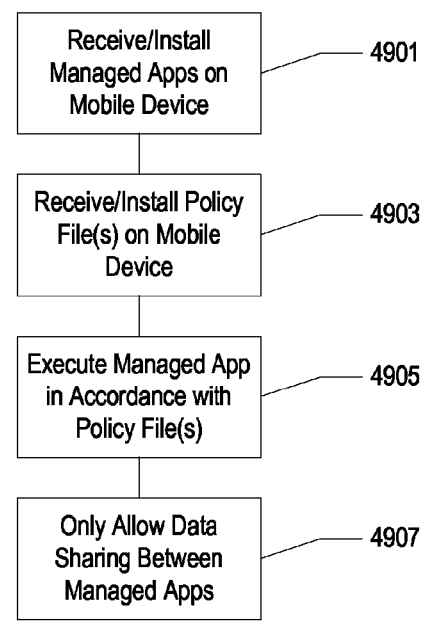

With reference to FIG. 49, illustrative embodiments are directed to a method of managing applications of an enterprise on a mobile device. The method includes in step 4901 installing a set of managed applications of the enterprise on the mobile device, wherein other applications are installed on the mobile device that are not part of the set of managed applications. The method further includes receiving in step 4903 a set of application policies, wherein each of the set of managed applications is associated with a respective policy of the set of application policies. Each managed app is executed in step 4905 by the mobile device in accordance with applicable policy file(s). The method still further includes selectively allowing in step 4907 a first application of the set of managed applications to provide data to a second application installed on the mobile device, responsive to accessing a policy of the first application and reading an indication from the policy of the first application that the second application is a member of the set of managed applications, and selectively blocking the first application from providing data to a third application installed on the mobile device, responsive to accessing the policy of the first application and failing to read an indication from the policy of the first application that the third application is a member of the set of managed applications.

Other embodiments are directed to computerized apparatus and computer program products. Some embodiments involve activity that is performed at a single location, while other embodiments involve activity that is distributed over a computerized environment (e.g., over a network).

One improved technique for managing enterprise applications on mobile devices allows users to access enterprise applications from their own mobile devices, where the enterprise applications securely coexist with the users' own personal applications and data. Secure data sharing is accomplished by creating a managed set of applications that can share files and/or data with one another, but are selectively prohibited from sharing files and/or data with applications that are not part of the managed set. Thus, two objectives are achieved: (1) data are prevented from leaking out of the managed set and (2) data are allowed to be shared among the applications within the managed set.

Figure 8:
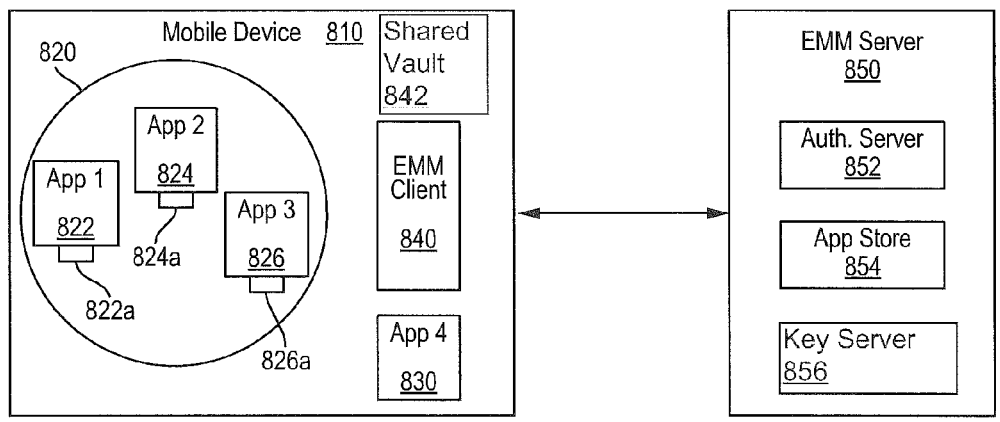
FIG. 8 depicts a system architecture according to illustrative aspects described herein.

FIG. 8 illustrates an environment in which embodiments hereof can be practiced. Here, a mobile device 810, such as a smartphone, tablet, PDA, and the like, has installed upon it various mobile applications. The mobile applications include a set 820 of managed applications 822, 824, and 826, and a personal application 830. In some examples, an enterprise mobility management (EMM) client 840 (e.g., client agent 404) is also installed on the mobile device 810, which provides policy management services. The EMM client 840 is configured to connect, e.g., via a network such as the Internet, with an EMM server 850, which typically includes an authentication server 852 and an application store 854.

Each application in the set 820 of managed applications is associated with a respective policy. For example, application 122 is associated with a policy 822a, application 824 is associated with a policy 824a, and application 826 is associated with a policy 826a. In some examples, the policies 822a, 824a, and 826a are provided in the form of files, such as XML or JSON files, in which the respective policy is expressed as a set of key/value pairs. In an example, each policy 822a, 824a, and 826a includes a record of all applications within the set 820 of managed applications (e.g., an application group identifier, an enumerated list of applications, or any other mechanism to identify a discrete set of applications).

Each of the set 820 of managed applications is specially designed or adapted for use with the enterprise. Some of the set 820 of managed applications may be designed specifically for the enterprise. Others of the set 820 of managed applications are more widely used applications (e.g., available to the public) that have been specifically adapted for use with the enterprise, e.g., as described above. One or more of the set 820 of applications may include injected code that enables the application to conform to a framework of the enterprise. The injected code can be compiled into the application using an SDK. Alternatively, the injected code can be applied as a wrapper around a general-use application, to adapt it for use with the enterprise. In general, the injected code serves to divert API calls from the application to its associated policy, such that the policy can selectively allow or block activities specified by the API calls.

In typical operation, a user of the mobile device 810 starts the EMM client 840, logs on to the EMM server 850 via the authentication server 852, and accesses the application store 854. The user can then peruse enterprise applications available from the application store 854, select desired applications, and download them to the mobile device 810, where the downloaded applications are included in the set 820 of managed applications. For each application downloaded, a corresponding policy is also downloaded to the mobile device, and the policies of all applications in the set 820 are updated to reflect all members of the set 820.

In an example, policies (e.g., 822a, 824a, and 826a) are refreshed periodically and/or in response to particular events, such as each time the respective application is started and/or each time the user logs onto the EMM server 850. Policies can thus be adapted over time and dynamically transferred to the mobile device 810 from the EMM server 850.

Depending on settings of the policies 822, 824, and 826, applications within the set 820 of managed applications can be constrained to exchange files and/or data only with other applications within the set 820. For example, API calls from the application 822 are intercepted by the injected code of the application 822. The policy 822a is read, and the operation specified by the API call is either blocked or allowed depending on the settings in the policy 822a. Because the policy 822a has a record of all applications in the set 820 of managed applications (e.g., an application group identifier, an enumerated list of applications, or any other mechanism to identify a discrete set of applications), the application 822, by reading the policy 822a, can test whether the requested operation of the API call involves an application inside or outside the set

820, and allow or block activity accordingly. Thus, based on policy settings, movement of data can be restricted such that data within the set 820 of managed applications is not comingled with data outside the managed set (e.g., with application 830).

In some examples, applications in the set 820 of managed applications on the mobile device 110 can be assigned to different groups. In such cases, policies (e.g., 822*a*, 824*a*, and 826*a*) are updated to include records of groups and group members. The flow of files and/or data between applications can thus be further restricted to members of particular groups. Providing different groups of mobile applications within the managed set 820 can help to segregate applications handling highly sensitive data from those that handle less sensitive data.

The above-described process of intercepting an API call, consulting an application's policy, and allowing or blocking the operation specified by the API call based on the policy can be carried out in a number of contexts. In one example, the above process can be applied for selecting a set of applications on the mobile device 810 that can be used to open a file or data element identified by a link or icon (e.g., using Open In). In another example, the above process can be applied for copying data or data objects from one application and pasting the data or data objects in another application (e.g., via a hidden, encrypted paste buffer). In yet another example, the above process can be applied for moving files into and/or out of a protected file vault. Essentially, any operation used to move data into and/or out of an application can make use of the above technique.

These techniques can apply not only to movement of data to other applications, but also to recording, pictures, printing, playback of audio, and other functions.

Operating system extensions may be obtained for the mobile device 810. One such operating system extension responds to a user pointing to a link or icon representing a data object, such as a file, by displaying a list of applications on the mobile device 810 that are capable of opening that data object. An example of such an operating system extension is "Open In," which is available on iOS devices. Similar extensions are available for Android and Windows-based devices.

In an example, applications within the set 820 of managed applications support the use of Open In, but the list of applications displayed for opening a selected data object is limited based on the policies of the respective applications. For example, the list of applications displayed when Open In is invoked from the application 822 can be limited, in accordance with the policy 822*a*, only to other applications in the managed set 820. Thus, in this example, Open In lists only applications that are both (1) within the managed set 820 and (2) compatible with the data object.

On mobile operating systems, such as iOS, Android, and Windows 8, each application runs in its own sandbox. These apps use a very high level content sharing mechanism like Open In in iOS, Intents/activities in Android and Charms in Windows 8. On a BYOD (bring your own device) mobile device, it will have a mix of managed and un-managed/personal applications running on the device. Sharing data among the managed set of applications should be carefully managed as described herein.

5.c. Restrictions on Data Sharing

On some mobile operating systems like iOS, the file system is not completely exposed to the end user by design to hide complexity. The focus is rather on the applications and the data they handle. As a result, there are many ways data can move in and out of the device. Thus, according to another aspect, a policy file may allow or disallow use of one or more data export features provided by a mobile device, based on whether or not an app is enrolled in enterprise mobile management (also referred to herein as EMM). Some data export examples include Email, Cloud based file data services, browser, browser-based apps, voice dictation, memory sharing, remote procedure calls, and content provider API access to stored data (contact lists, etc.).

One way to keep data moving only among managed applications, a policy may cause the Open In list provided to the application to be filtered by intercepting the call and presenting to the application only the set of managed applications which can handle that particular file format, as defined in the policy file(s) in use.

The same technique may be extended to the Mail To option where the URL scheme used for Mail To could be intercepted and presented with the option of Mail To with only a managed mail application like Citrix Mobile Mail. This way, even the managed applications can be forced to Save to only the managed data sharing applications, like pre-approved cloud-based file sharing services.

In another example, a policy may cause a device to perform dictation blocking. Some devices provide a voice dictation system and/or a voice-based automated assistant (e.g., Siri on iOS devices), referred to collectively as dictation. However, voice features often perform voice transcription in the cloud, because the mobile device might not have enough processing power to efficiently transcribe voice to text on the device. In a typical scenario, a user speaks a voice command or voice dictation, the device then sends a recording of the voice to an online server or cloud-based transcription service via a network connection, and the transcription service returns a file with text representing the words spoken by the user. The mobile device then takes some action using the text file as input or as a basis for the action.

Because the voice command is sent to a system external to the device, a policy may disallow dictation based on one or more factors. Dictation may be disallowed altogether when a device is enrolled in EMM, or when the device includes policy managed apps. In another example, dictation might be disallowed or allowed only when one or more predefined apps (e.g., managed apps) are active, executing, and/or on-screen. In another example. Dictation might be disallowed or allowed only when the device is in a predefined geographic area, as determined by on-board location services (e.g., GPS, triangulation, wifi tracking, etc.). Other factors may also or alternatively be used by a policy to determine whether or not to allow dictation (or any other feature described herein).

In another example, content provider data access may be blocked based on a policy file. Content providers often provide a standard interface, or API, through which third party apps may gain access to structured data stored by the content provider. Examples may include contact lists, email headers, social graph data, or any other structured data maintained by the service provider. Similar restrictions as described above may be placed on access to such structured data within a managed app, to prevent unmanaged apps from gaining access to data in managed apps.

In another example, creation and/or execution of a received remote procedure call may be allowed or disallowed based on a policy file and/or based on whether an app is a managed app, as described herein. In yet another example, sharing of memory space between two applications may be allowed or disallowed based on a policy file and/or based on whether an app is a managed app, as described herein.

By using above interception and filtering techniques, data flow in and out of the device as well as on the device is limited to the managed secure space. The same techniques can also be used with Android and Windows 8, based on policy definitions.

Figures 45, 46:
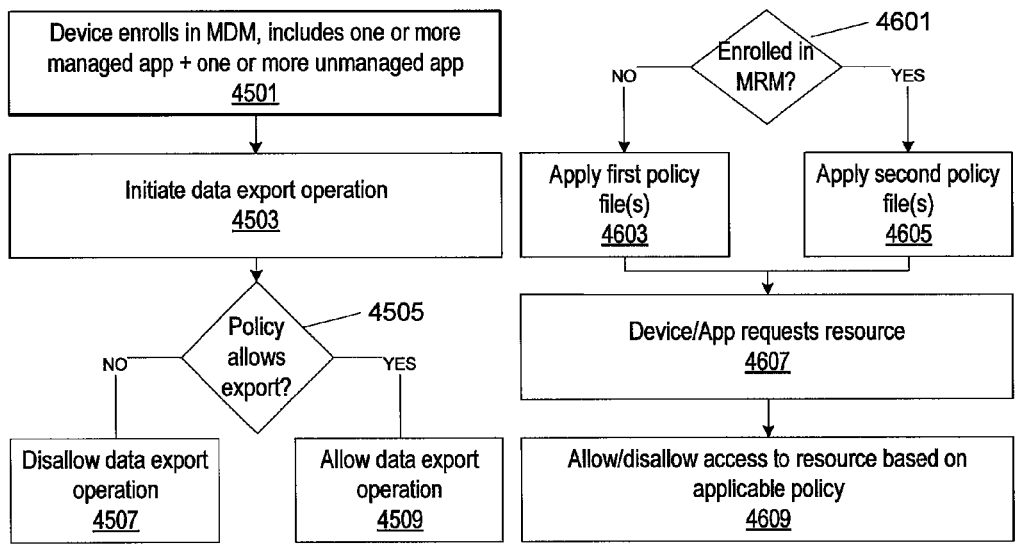
FIG. 45 depicts a process flow according to illustrative aspects described herein.
FIG. 46 depicts a process flow according to illustrative aspects described herein.

With reference to FIG. 45, a method for restricting data sharing is now described. Initially, in step 4501, a mobile device (e.g., device 302, 402, etc.) is set up to have one or more managed apps, and one or more unmanaged apps, e.g., by enrollment in EMM, by downloading apps from a App store, etc., as described herein. As part of step 4501, the mobile device downloads any applicable policy files from server 406 providing enterprise services 308 including policy management services 370, and applies said policy file(s). In step 4503, a user (or the mobile device itself) attempts to initiate a data export operation. In step 4505, the mobile device makes a determination whether that particular data export is allowed based on information in the policy file. If the data operation is not allowed, then in step 4507 the mobile device prevents the data operation from occurring. If the data operation is allowed, then in step 4509 the mobile device allows the user (or app, as applicable), to perform the data export operation.

Variations of the method shown in FIG. 45 may be used. For example, a data export operation may be allowed when data is requested to be exported from a managed app to another managed app, but disallowed when data is requested to be exported from a managed app to an unmanaged app. In addition, steps may be reordered or combined. For example, a mobile device, upon application of a particular policy file, may automatically cut off app or user access to certain types of data export operations. Thus, it may be an impossibility for the user to even request certain types of data export operations after application of a policy file. This scenario is contemplated as being within the scope of FIG. 45. That is step 4503 may be optional insofar as a mobile device may block one or more data export operations based on a policy file before a user or app even requests that an unauthorized export occur.

In one illustrative use-case scenario, a user may wish to get a file from a cloud-based file sharing service, annotate it with an annotator (e.g., a PDF annotator), and pass it to the corporate email service. This may be accomplished by including the necessary apps in the managed set 820. But it is also necessary to prevent the file from going through private email, or to pass for viewing to other apps that are not part of the managed set 820 (and therefore trusted), as described above.

In order to provide enhanced security, it is preferred to avoid comingling of trusted (managed) apps and untrusted (unmanaged) apps, but comingling depends on policy. An admin on the EMM server 850 can set policies for any task of managed application to allow/disallow features. It is possible that a policy could allow a user or app to export a file from a managed PDF annotator to an app outside the managed set 820, but then control over the PDF file would be lost. Other circumventions may also be possible, with the understanding that allowing circumvention decreases security.

An administrator may set the policies of the managed applications, with default settings being to contain data within the managed set 820 of trusted apps as described herein. The policies may be dynamically delivered from the EMM server 850. However, exceptions can be provided, e.g., to allow content to leak out from the managed set 820, when business concerns dictate it. For apps that are not part of the managed set 820, there is no interference with normal activities, i.e., they may be unrestricted.

6. Mobile Resource Management (MRM)

As described above, when a mobile computing device accesses an enterprise computer/IT system, sensitive data associated with the enterprise and/or enterprise-related software applications can become stored onto the mobile device. Enterprise-related data can comprise any data associated with the enterprise, such as, without limitation, product information, sales data, customer lists, business performance data, proprietary know-how, new innovation and research, trade secrets, and the like. Because this information can be very sensitive, an enterprise may wish to safeguard such information.

Further, enterprises may wish to regulate how users use their mobile devices. For example, enterprises may want some control over where the mobile devices are used, which mobile device features can be used, which software applications can be installed and/or run on the devices, and the like. Enterprises also have a need to control and implement remedial actions for users that violate their mobile device usage policies.

When users in the field experience problems with their mobile devices or could benefit from information, data, software, or coaching on how to perform certain operations using the devices, it can be difficult for the enterprise's IT support to provide highly effective assistance. Accordingly, there is a need for improved secure management and technical support of mobile devices associated with an enterprise. This is sometimes referred to as Enterprise Mobile Management (EMM). Enterprises may manage devices, applications, software, settings, features, remote tools, virtualized apps, etc. Management of any device, application, or accessible tool is also referred to herein as Mobile Resource Management (MRM).

Embodiments described herein address these and other concerns. The present application discloses computer systems and methods for automated or semi-automated management of mobile computing devices that access an enterprise computer network, such as access to computer-implemented resources of the enterprise. As used herein, an "enterprise" may comprise substantially any type of organization, including, without limitation, a for-profit business, partnership, corporation, and the like, as well as non-profit businesses, organizations, groups, associations, educational institutions, universities, and any other group of individuals bound by a common purpose or goal. A "mobile computing device" can comprise any of a wide variety of devices, such as, without limitation, a mobile phone, smartphone, personal digital assistant, tablet computer, handheld computing device, and the like. The mobile devices managed by the disclosed system may, for example, include or consist of mobile devices that run the Android™, IOS, or Windows Mobile operating system (or some subset thereof). As will be recognized, however, the architecture disclosed herein may be used with other mobile device operating systems, including operating systems that may be developed in the future.

Individuals, entities, or groups of users that use mobile computing devices to access the enterprise computer network are referred to herein as "users." Users can comprise members of the enterprise, such as employees, partners, officers, etc. Alternatively, users can comprise individuals or entities that are not members of the enterprise, but nevertheless have a need or reason to access the enterprise computer network. For example, users can be enterprise customers, suppliers, etc.

An "enterprise resource" may comprise a machine-accessible resource associated with the enterprise. Enterprise resources can comprise any of a wide variety of different types of resources, including resources that assist or enable users in the performance of the users' roles or duties associated with the enterprise. For example, enterprise resources can comprise raw data stored on non-transitory computer-readable storage, documents stored on non-transitory computer-readable storage, computer hardware (e.g., physical servers), software applications stored on non-transitory computer-readable storage, macros for software applications (e.g., word processor macros) stored on non-transitory computer-readable storage, electronic mail systems, workspaces, customer relationship management (CRM) systems, document management systems, enterprise resource planning (ERP) systems, accounting systems, inventory systems, engineering tools, forms, style sheets, and many other resources. Enterprise resources can be configured to be accessed and used by software applications installed and running on mobile computing devices.

Figure 9:
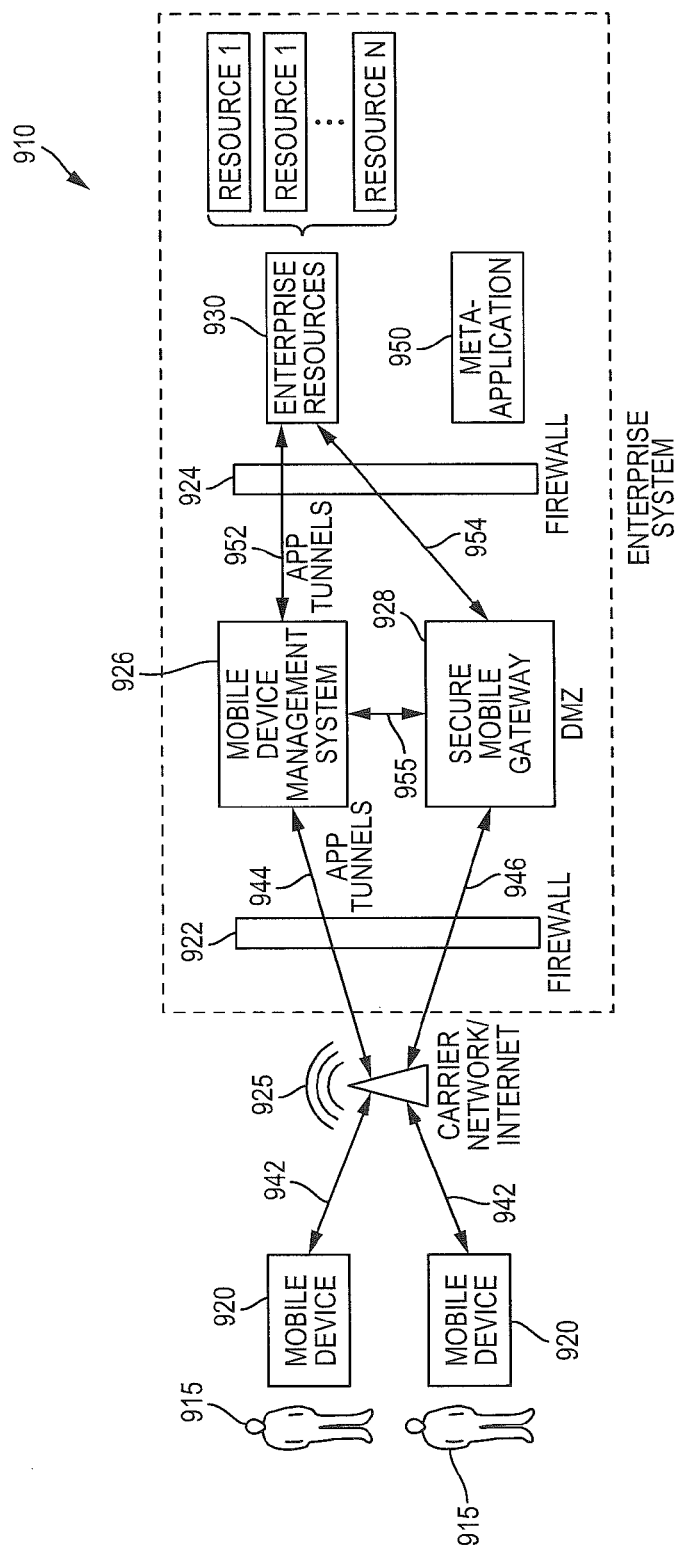
FIG. 9 depicts a system architecture according to illustrative aspects described herein.

FIG. 9 is a schematic illustration of an embodiment of a computer system 910 associated with an enterprise, as well as one or more users 915 and mobile computing devices 920 associated with the enterprise. In this example, each mobile device 920 is assigned to one enterprise user 915, but alternatives are possible (e.g., multiple users 915 assigned to one device, and/or a single user assigned to multiple devices 920). The mobile devices 920 are preferably configured to communicate with the enterprise system 910 (also referred to herein as an "enterprise network") over a communication network 925. The communication network 925 can comprise a wireless carrier network, the Internet, a wide area network, a WIFI network, and the like. Hence, the network 925 can comprise, for example, one or more wireless networks, one or more wired networks, or a combination of wired and wireless networks. Additionally, an enterprise system 910 can be configured to be accessed by non-mobile computing devices, such as desktop computers.

The enterprise system 910 preferably includes an external firewall 922 and an internal firewall 924. Each firewall 922, 924 can comprise a device or set of devices designed to permit or deny network transmissions based upon certain criteria. The firewalls 922 and 924 can comprise software stored on non-transitory computer-readable storage, hardware, firmware, or a combination thereof. The firewalls 922 and 924 can be configured to perform basic routing functions. Embodiments described herein can cooperate with one or both of the firewalls 922 and 924 or other devices of the enterprise system 910 to filter mobile devices' access requests based on a set of gateway rules, in order to protect the enterprise system 910 from unauthorized access while permitting legitimate communications to pass. As will be described in further detail below, such access rules can be used to regulate access based on, e.g., mobile device properties, user properties, the specific enterprise resources 930 for which access is requested, or any combination thereof.

The physical or logical subnetwork between the two illustrated firewalls 922 and 924 can be referred to as the "demilitarized zone" (DMZ), or alternatively as a "perimeter network." Typically, the DMZ contains and exposes the enterprise's external services to a larger untrusted network, usually the Internet. Ordinarily, the purpose of the DMZ is to add an additional layer of security to the enterprise's local area network (LAN); an external attacker only has access to equipment in the DMZ, rather than any other part of the enterprise network.

The illustrated enterprise system 910 includes a mobile device management system 926, a secure mobile gateway 928, and a "meta-application" 950, each of which is described in further detail below. The enterprise system 910 also includes enterprise resources 930 logically positioned behind the internal firewall 924, illustrated as resources 1 to N. At least some of the enterprise resources 930 can be configured to be accessed and/or used by the mobile devices 920, such as by software applications installed and running on the mobile devices.

Referring still to FIG. 9, the mobile devices 920 can communicate with the carrier network 925 via connections 942, such as cellular network connections and/or WIFI connections that ultimately connect to carrier networks. A mobile device's enterprise access request can be sent to the secure mobile gateway 925 via a connection 946, and the gateway 928 can send the request to an enterprise resource 930 via an internal connection 954. Further, the enterprise system 910 can use the connections 942, 946 to send information back to the mobile device 920, such as data responsive to the device's enterprise access request.

In some embodiments, a software application on a mobile device 920 can communicate with an enterprise resource 930 through an application tunnel via connections 942, 944, and 952. Application tunnels are described in further detail below. In the illustrated embodiment, the mobile device management system 926 acts as a "tunneling mediator" within an application tunnel between the mobile device 920 (and typically a specific application running on the mobile device) and the enterprise resource 920.

Figure 10:
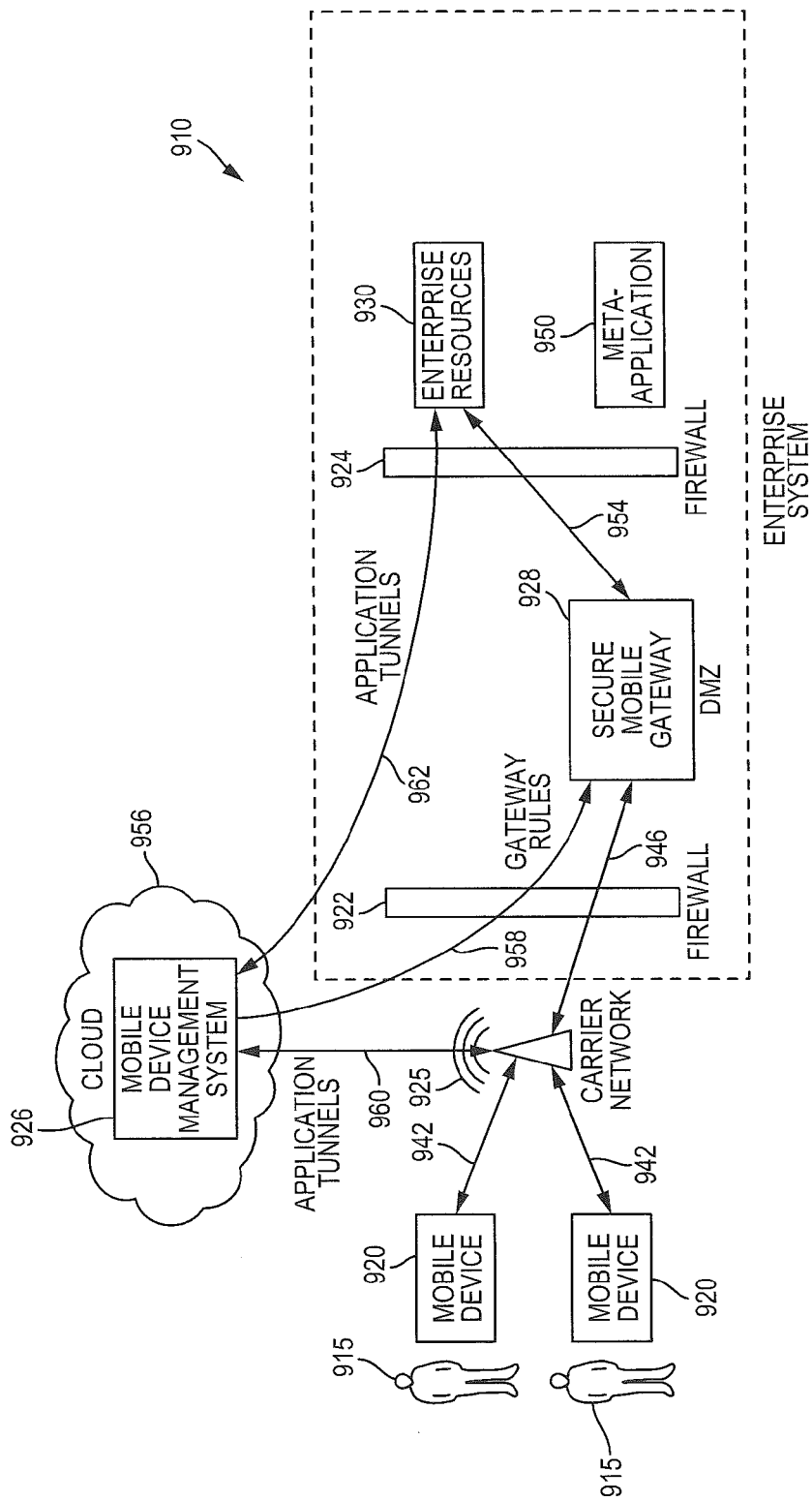
FIG. 10 depicts a system architecture according to illustrative aspects described herein.
Figure 11:
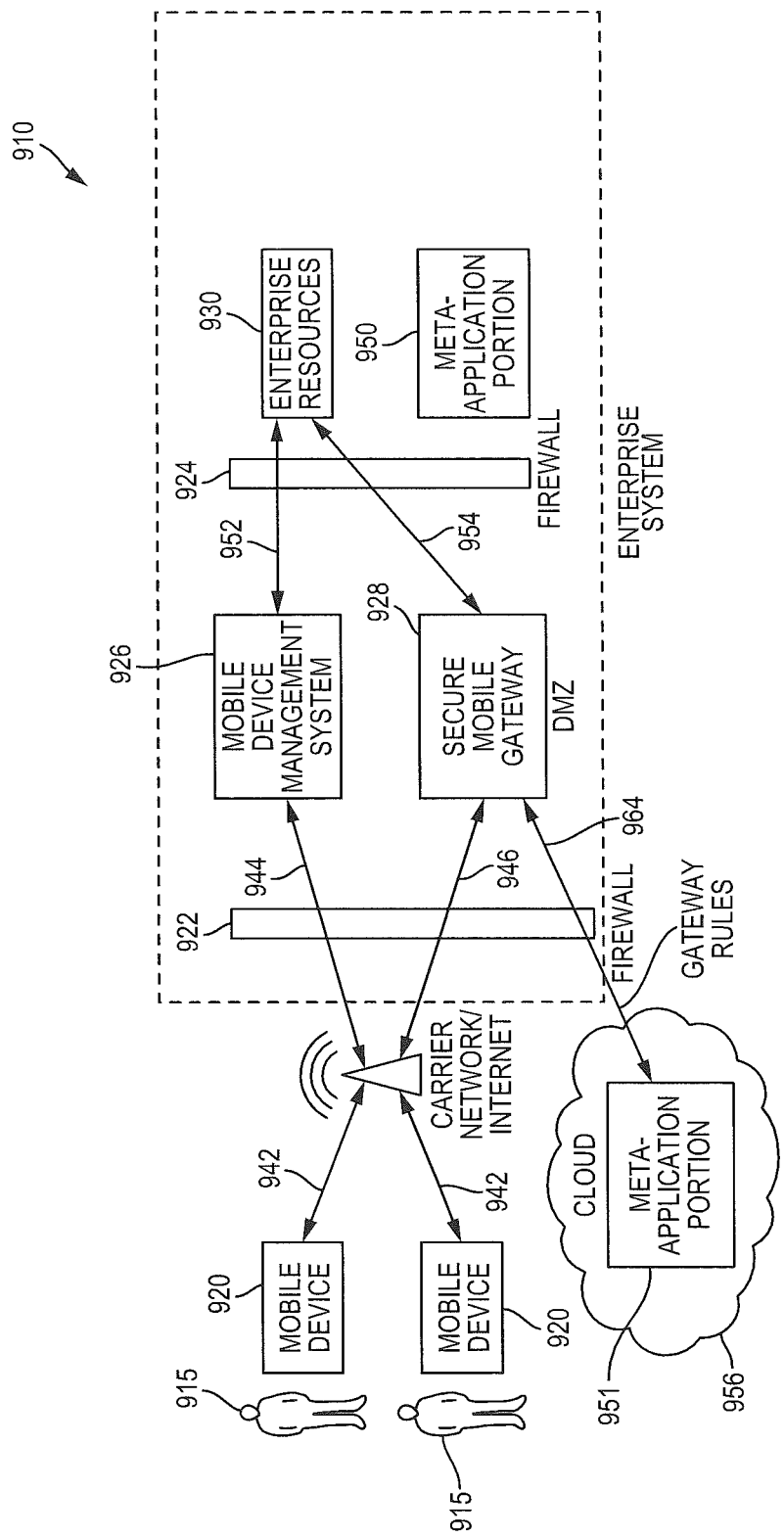
FIG. 11 depicts a system architecture according to illustrative aspects described herein.

FIGS. 10 and 11 illustrate embodiments that are similar to FIG. 9, except that the mobile device management system 926 and meta-application 950 are respectively located (completely or at least partially) in a cloud computing system or environment 956 ("the cloud"). (In a hybrid of these two approaches, both the mobile device management system 926 and meta-application 950 reside in the cloud.) A cloud computing system typically includes computing resources configured to implement a service over a network, such as the Internet. For example, a cloud computing system can include a plurality of distributed computing resources, such as physical servers or other computing devices. With a cloud computing system, computing resources can be located at any suitable location that is accessible via a network. A cloud computing system can store and process data received over a network, while being accessible from a remote location. Typically, a cloud computing system is operated by a service provider that charges the enterprise, and other users of the cloud based computing system, a usage fee for using the system. In certain embodiments, both the mobile device management system 926 and the meta-application 950 are located at least partially in the cloud 956. In the embodiment of FIG. 10, the cloud-based device management system 926 can be configured to provide gateway rules to the secure mobile gateway 928 via a connection 958, as described in further detail below. Further, a software application on a mobile device 920 can communicate with an enterprise resource 930 through an application tunnel via connections 942, 960, and 962, with the mobile device management system 926 acting as a tunneling mediator. In the embodiment of FIG. 11, the meta-application portion 951 located in the cloud 956 can be configured to provide gateway rules to the secure mobile gateway 928 via a connection 964, as described in further detail below. The meta-application 951 (or its rules engine) may alternatively be incorporated into the mobile device management system 926, in which case it may orchestrate the management of the mobile device management system 926.

Figure 12:
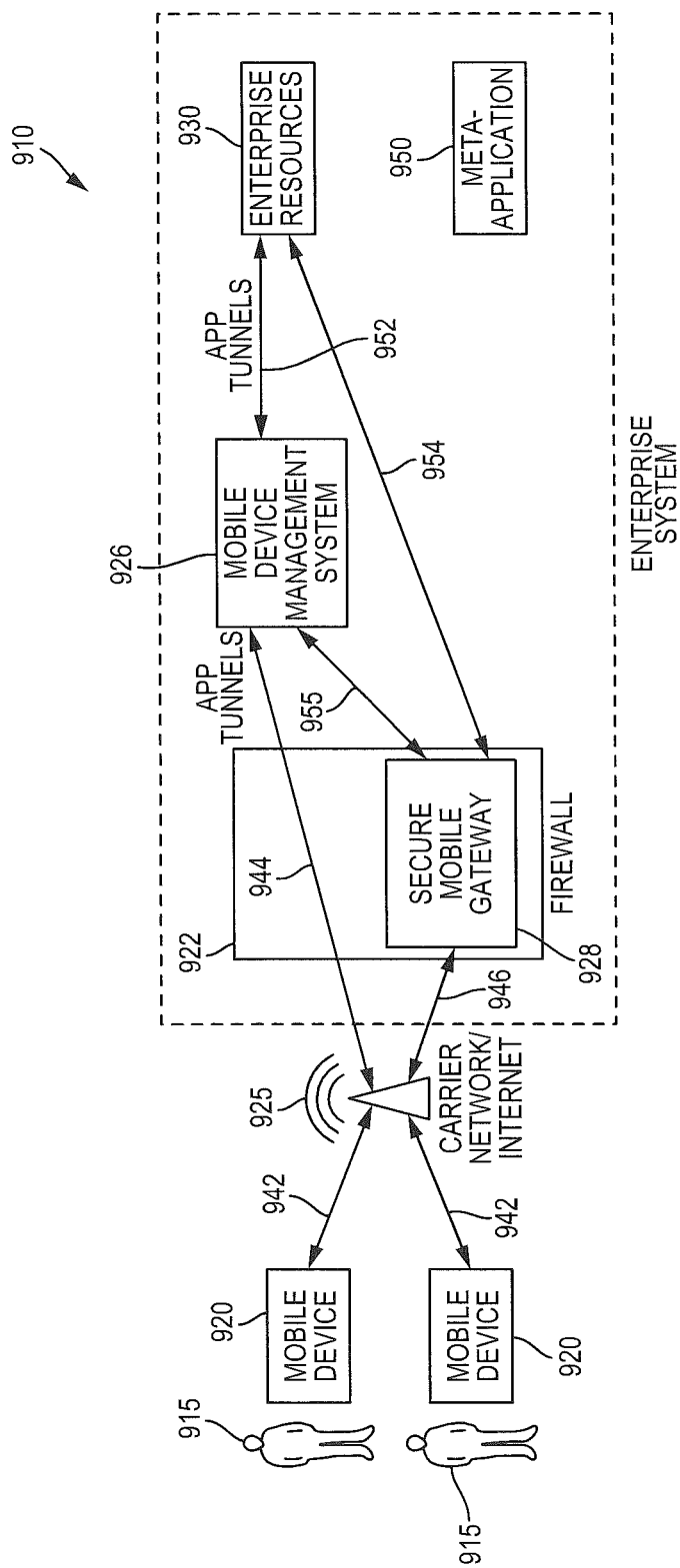
FIG. 12 depicts a system architecture according to illustrative aspects described herein.

FIG. 12 is an embodiment similar to FIG. 9, with the secure mobile gateway 928 implemented in the firewall 922. In the embodiment of FIG. 12, the secure mobile gateway 928 can be implemented in a Threat Management Gateway (TMG) server. As illustrated in FIG. 12, some embodiments of the enterprise system 910 can be implemented without an internal firewall 924.

Figure 13:
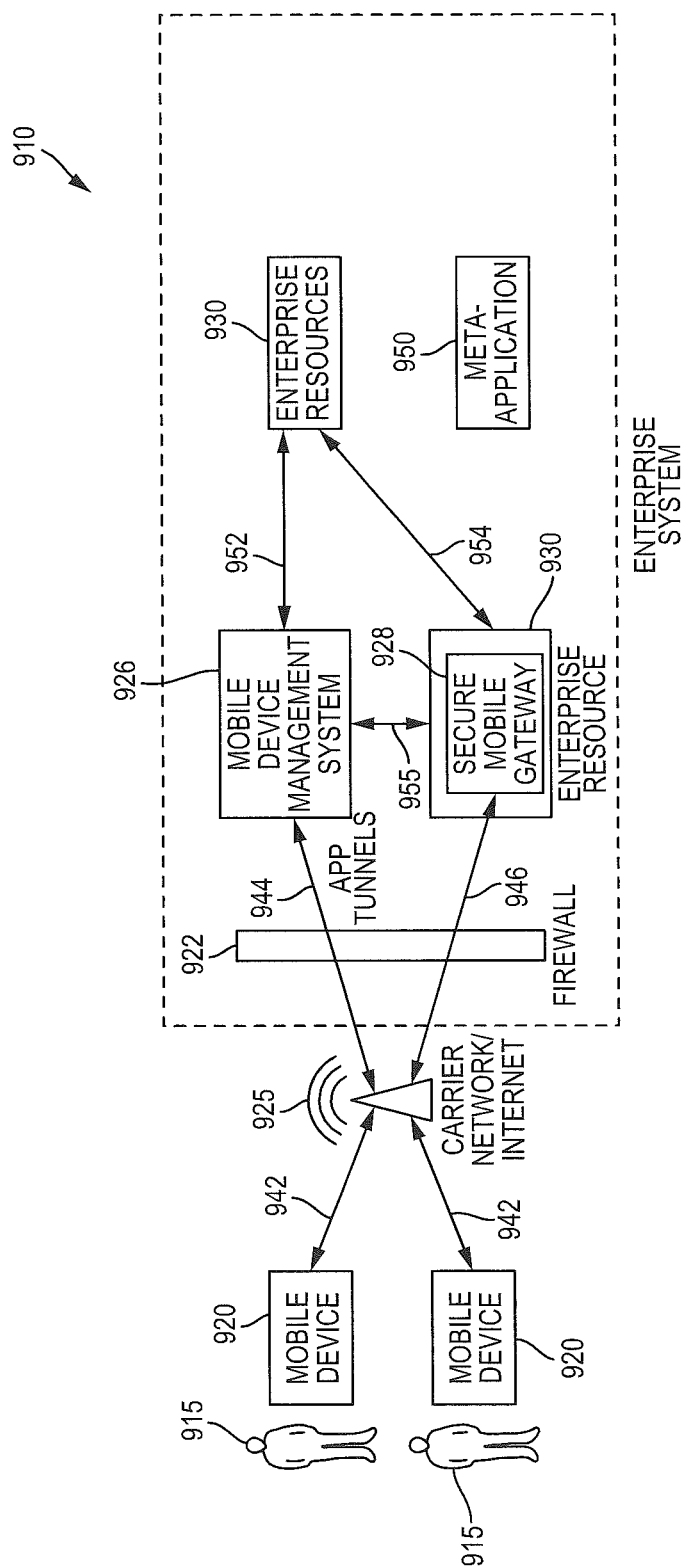
FIG. 13 depicts a system architecture according to illustrative aspects described herein.

FIG. 13 is an embodiment similar to FIG. 9, with the secure mobile gateway 928 implemented in an enterprise resource 930. In the embodiment of FIG. 13, the secure mobile gateway 928 can be implemented in an Internet Information Services (IIS) server. Such an IIS can be configured as an enterprise resource 930 and/or an internal firewall 924.

It will be understood that any of the enterprise systems 910 can be implemented with any of the principles and advantages described herein, as appropriate. Moreover, it will also be understood that the enterprise systems illustrated in FIGS. 9-13 are provided for illustrative purposes, and other suitable systems can be implemented in accordance with the principles and advantages described herein.

Figure 16:
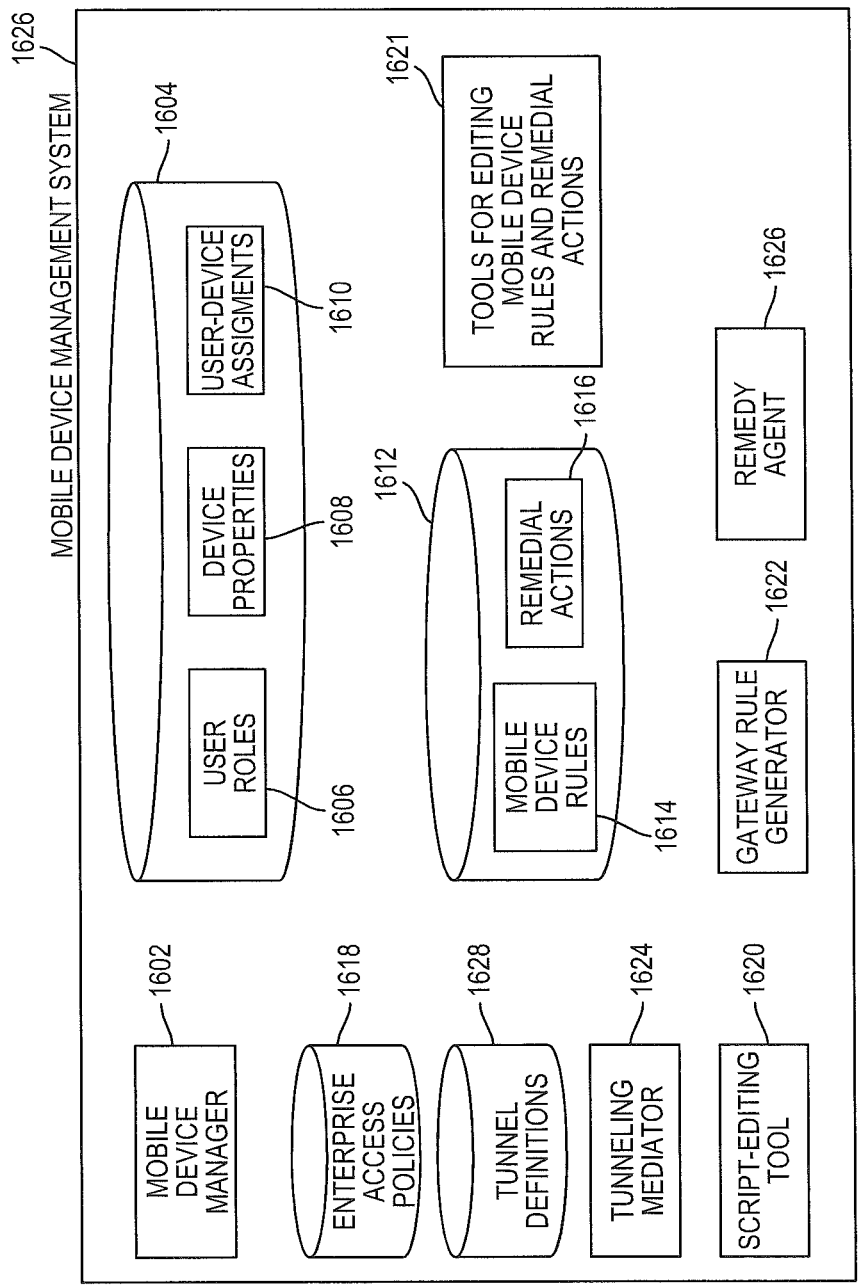
FIG. 16 depicts a device according to illustrative aspects described herein.

FIG. 16 is a schematic illustration of an embodiment of the mobile device management system 926 of FIG. 9. The mobile device management system 926 can comprise a system of one or more computers, computer servers, storage devices, and other components. As explained in greater detail below, the mobile device management system 926 can be configured to manage or co-manage the application of "mobile device rules" 1614 to the mobile computing devices 920, and/or to act as a "tunneling mediator" between the mobile devices 920 and the enterprise resources 930 during use of application tunnels therebetween. The mobile device management system 926 can also be configured to regulate mobile device access to the enterprise system 910, such as during use of such application tunnels. The illustrated components of the system 926 are described below.

Figure 17:
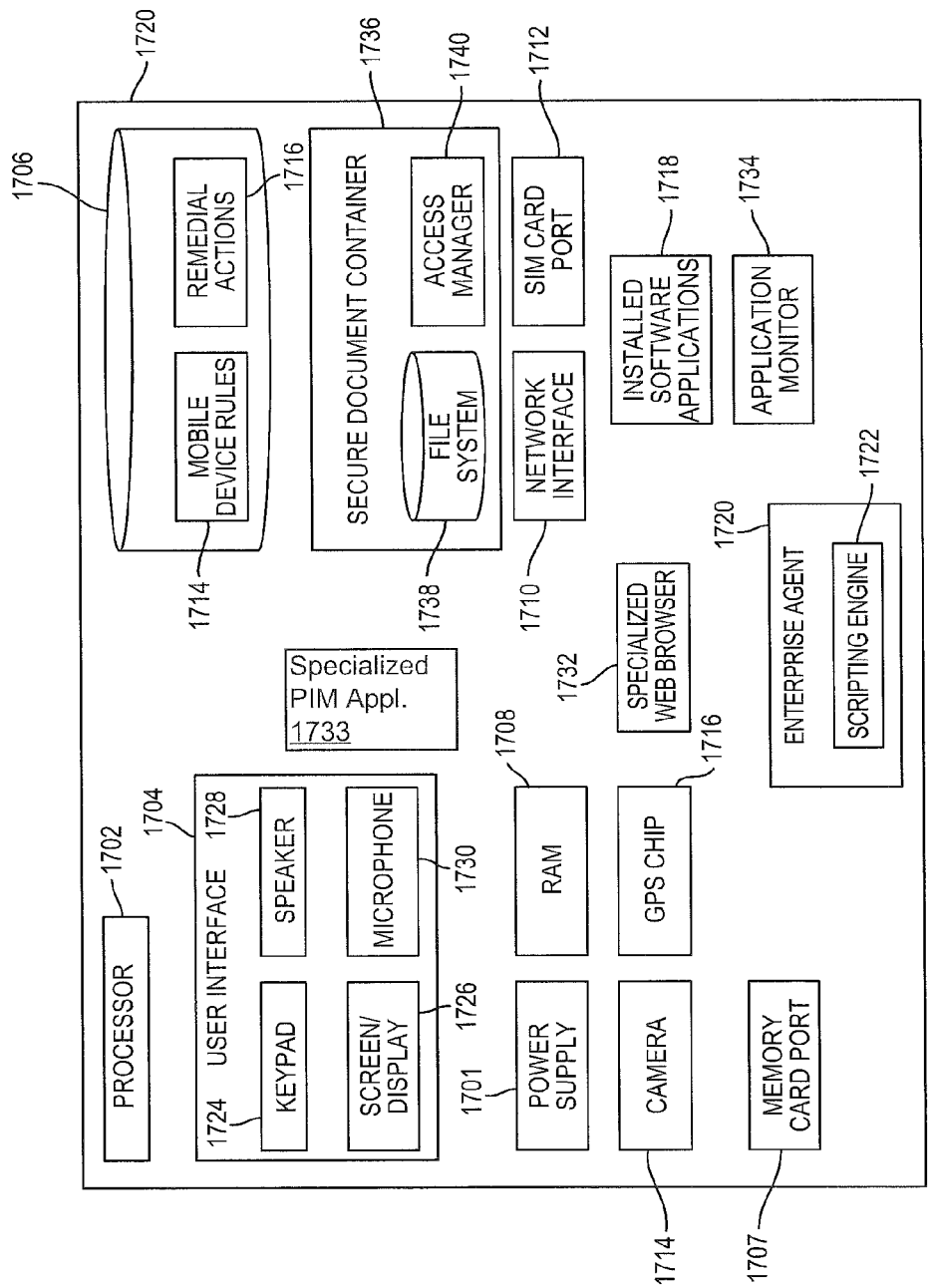
FIG. 17 depicts a device according to illustrative aspects described herein.

FIG. 17 is a schematic illustration of an embodiment of a mobile computing device 920. The mobile device 920 can include a number of ordinary or standard components of a mobile device, such as a power supply 1701, a processor 1702, a user interface 1704, a hard drive memory 1706, a memory card (e.g., Secure Digital (SD) card) port 1707, a random access memory 1708, a network interface 1710, a subscriber identification module (SIM) card port 1712, a camera 1714, and/or a GPS chip 1716. The implementation and use of these components is generally well known and is not discussed herein in significant detail. The power supply 1701 can include a battery port, battery, and/or a port for receiving electrical power from an external source (e.g., a standard electrical outlet). The processor 1702 can be configured to execute software applications and various other executable components. The user interface 1704 can include any of various known components, such as a keypad 1724 (such as a set of physical buttons or, alternatively, a touchscreen keypad) for receiving text input, a screen or display 1726 (which can be a touchscreen) for displaying text, images, and/or video, a speaker 1728 or audio out port for producing audible output, and/or a microphone 1730 for receiving audible input. The hard drive 1706 can comprise any of a variety of different types of nonvolatile and/or non-transitory computer-readable storage. The memory card port 1707 is configured to receive a memory card (e.g., an SD card) on which data can be stored. The random access memory 1708 can be used to store data used during the running of various processes. The network interface 1710 can be used to send and receive data over a network (e.g., the wireless network 925, which can operate in accordance with a number of standards, such as Wi-Fi, 3G, 4G, etc.). The SIM card port 1712 is configured to receive a SIM card, as known in the art. The camera 1714 can be configured to capture images and/or video. The GPS chip 1716 can be configured to process GPS signals. The mobile device 920 can further include one or more installed software applications 1718. The installed software applications 1718 can be stored, for example, on the hard drive 1706 or in non-volatile solid state storage. The installed applications can include both enterprise applications and personal applications. It will be appreciated that the mobile device 920 can include any other computer hardware components in place of or in addition to those illustrated in FIG. 3, such as an accelerometer, transceiver, battery charger, USB controller, baseband processor, audio codec, etc.

In the illustrated embodiment, the mobile device 920 includes an enterprise agent 1720, which is preferably a software application or other executable program installed on the mobile device. The enterprise agent 1720 is preferably separate from the operating system of the mobile device 920. In some embodiments, however, the enterprise agent 1720 can be a component of the operating system of the mobile device or partially/fully embedded into the operating system of the mobile device 920. In various embodiments described in greater detail below, the enterprise agent 1720 executes the mobile device rules 1614 and cooperates with the enterprise system 910 to regulate the mobile device's access to the enterprise system 910, including to the enterprise resources 930. In some embodiments, an enterprise system 910 can prompt an enterprise agent 1720 to connect to the system 910 (e.g., the mobile device management system 926) by sending a text message (e.g., SMS) to the mobile device 920, with a connection command.

The enterprise agent 1720 can be installed onto the mobile device 920 as a condition of the mobile device's enrollment with the mobile device management system 926. The enterprise can employ an automated subsystem for installing enterprise agents 1720 onto the mobile devices 920 associated (e.g., enrolled) with the enterprise. For example, a mobile device manager 1602 can be configured to send the enterprise agents 1720 to the mobile devices 920 for automated installation or manual installation by the users 915. Alternatively, IT personnel can manually install the enterprise agents 1720 onto the mobile devices 920, or end users can download and install the enterprise agent 1720 from commercially available application stores. Different types of enterprise agents 1720 can be provided for different mobile device types, platforms, operating systems, etc. The mobile device manager 1602 or another software component of the enterprise system 910 can be configured to select an appropriate enterprise agent 1720 for each given mobile device 920, based on such properties of the mobile devices 920 (e.g., mobile device properties 1608 of FIG. 16).

The enterprise agent 1720 may implement a variety of security-related features, including features that control (or enable the control of) mobile device accesses to enterprise resources 930. For example, the enterprise agent 1720 installed on a given mobile device 920 may perform (e.g., instruct or cause the mobile device 920 to perform) some or all of the following tasks: (1) maintain a data connection with the enterprise system 910, which connection can be used both for application tunnels and for communications that do not involve application tunnels; (2) provide access to a public or private enterprise app store from which the user can download enterprise applications that have been approved by and configured for the particular enterprise; (3) create application tunnels for enabling enterprise applications installed on the mobile device to securely access certain enterprise resources, (4) collect, and transmit to the mobile device management system 926, "inventory" data regarding the properties and configuration of the mobile device, such as its manufacturer, model, operating system, screen size, memory size, memory availability, GPS coordinates, and which personal and enterprise mobile applications are installed on the device; (5) implement a log-in or other authentication service that requests and verifies the user's authentication information (e.g., passcode) when, for example, the user launches an enterprise mobile application; (6) decrypt encrypted message attachments received from the secure mobile gateway 928, such as encrypted attachments to email messages received from other members of the user's enterprise; (7) maintain a secure key store that is accessible by enterprise applications for obtaining keys for encrypting and decrypting data; (8) check for blacklisted mobile applications installed on the mobile device, and report any such applications to the mobile device management system; (9) perform precautionary actions, such as deleting decryption keys used for decrypting message attachments, when certain conditions are met, such as when a blacklisted mobile application is detected on the mobile device or the device is reported as stolen, (10) kill (terminate execution of) any blacklisted applications or other mobile applications determined to create a security risk, (11) provide one or more additional services for keeping enterprise applications and data on the device separate from personal application and data; (12) ensuring that device-based security measures are activated (e.g., keyboard/screen lock with passcode) and (13) wiping the device of all enterprise application and data (in response to a command received from the mobile device management system) when, for example, the user discontinues employment with the enterprise. As described below, some of these functions may alternatively be implemented in a separate mobile application or component that is distinct from the enterprise agent 1720.

The enterprise agent 1720 collects information about the mobile device's configuration using standard operating system APIs and mechanisms, and/or using its own APIs and mechanisms. For example, in implementations for the Android operating system, the enterprise agent may query the package manager to obtain a list of the applications installed on the device. The enterprise agent can similarly query the operating system for a list of mobile applications that are currently running, and can monitor broadcast messages to identify new applications that are being installed. The device configuration information collected by the enterprise agent through this process may be reported to the mobile device management system 926, which may use the information to generate rules that are applied by the secure mobile gateway 928 to control the mobile device's accesses to enterprise resources 930. The enterprise agent 1720 may itself also use the collected device configuration information to take various precautionary actions, such as killing blacklisted mobile applications as mentioned above.

In one embodiment, the enterprise agent 1720 is (or is part of) a mobile application that can be downloaded from an application store and installed on a mobile device 920. Once the enterprise agent has been installed and launched, the end user supplies configuration information, such as a corporate email address and email password, for enabling the agent to communicate with a particular enterprise system 910. Once configured, the agent 1720 provides the user access to a secure application store from which the user can download and install enterprise mobile applications that have been approved by, and in some cases specifically configured for, the user's enterprise. The functionality for downloading and installing enterprise mobile applications may alternatively be embodied within a separate "secure launcher" mobile application that runs in conjunction with the enterprise agent.

Figure 18:
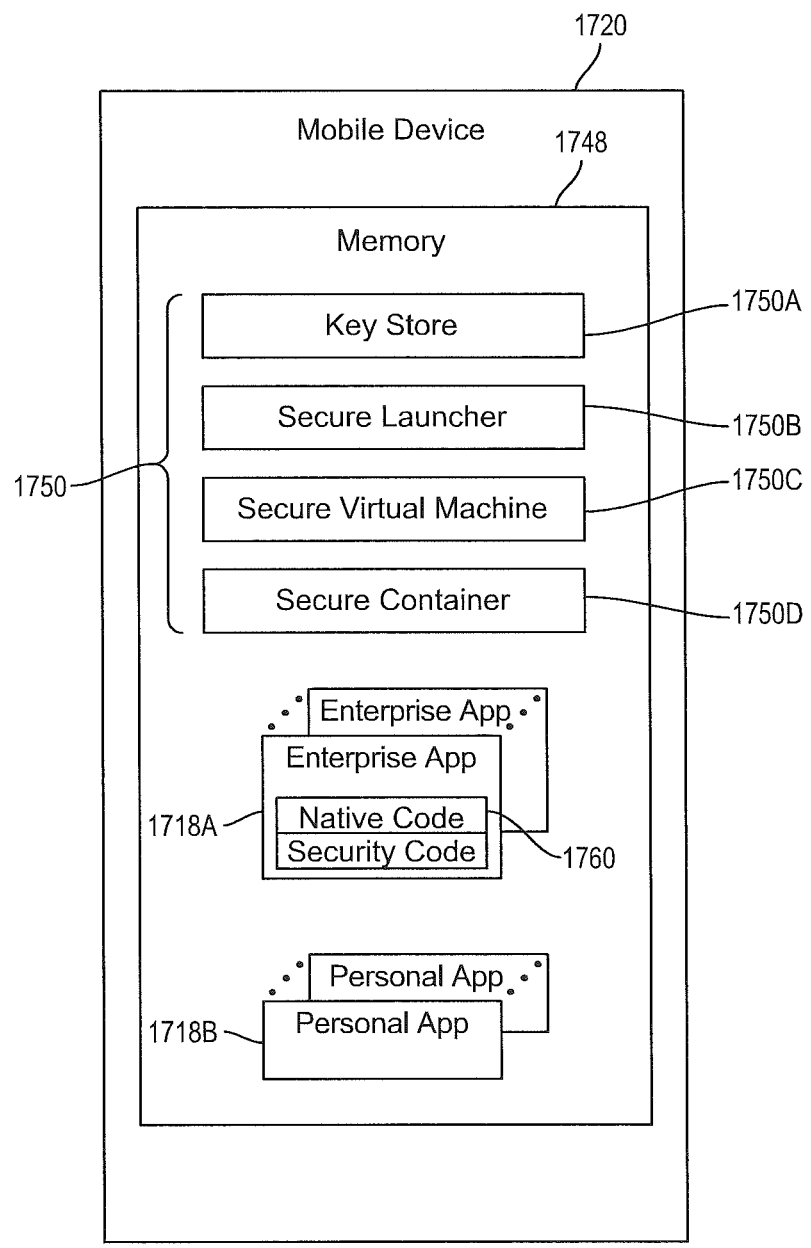
FIG. 18 depicts a device according to illustrative aspects described herein.

FIG. 18 illustrates some of the executable security-related components 1750 that may be installed or implemented on a mobile device 920 with, or as part of, the enterprise agent 1720. As will be recognized, some of these components 1750 can be installed without others, and the illustrated components can be combined in various ways. One component is a key store 1750A that stores one or more encryption keys. In one embodiment, the key store is implemented and managed by the enterprise agent 1720, which enables the enterprise applications to access the key store to obtain encryption keys. A given enterprise application may, for example, use the encryption keys to encrypt files and other data stored to memory 1748.

With further reference to FIG. 18, a secure launcher 1750B may also be installed on the mobile device 920 for launching enterprise applications. The secure launcher may be part of the enterprise agent 1720, or may be a separate mobile application. The secure launcher 1750B may implement or enforce various security policies, such as requiring user entry of a valid passcode when an enterprise application is launched. One embodiment of a user interface implemented by the secure launcher 1750B is shown in FIGS. 14 and 15 and is described below. As described below, enterprise applications may be modified or written to use the secure launcher rather than the general launcher included in the mobile device's operating system. In one embodiment, the secure launcher also includes functionality for wiping the mobile device 920 of all enterprise applications and data in response to a threshold number of consecutive invalid passcode entry attempts, or in response to a remotely issued command from the enterprise's IT department.

As further shown in FIG. 18, a secure virtual machine 1750C may be installed on the mobile device 920 in some embodiments to create or augment a secure execution environment for running some or all of the enterprise applications. This secure virtual machine (VM) supplements, and may run concurrently with, the mobile operating system's default VM. For example, one or more enterprise mobile applications may run within the secure VM while all other mobile applications, including all personal mobile applications, run on the same device in the operating system's default VM. As described below under the heading "Secure Virtual Machine," the secure VM 1750C implements a variety of policies and measures (such as security, management, storage, networking, and/or process execution policies) that are not implemented (or are implemented unsuitably for enterprise applications) in the mobile operating system's default VM. For example, the secure VM may be capable of establishing application tunnels for accessing the enterprise system, and may route requests from enterprise applications over corresponding application tunnels. The secure VM may also prevent an enterprise application from running unless and until the user enters a valid passcode or otherwise successfully authenticates. The secure VM may be installed on a mobile device together with a set of code libraries that are used by the secure VM in place of corresponding code libraries of the operating system.

One benefit of using a secure VM 1750C is that it reduces or eliminates the need for the mobile applications to be specifically written or modified for use with an enterprise system 910. For example, an enterprise may wish to make a particular commercially-available mobile application available to its employees for use in accessing company resources, but may not have permission to modify the application to implement the various security features described herein (such as authentication, secure storage, and secure networking). In such a scenario, the enterprise may configure the mobile application or the mobile device to cause this particular application, when executed, to run only within the secure VM.

The secure VM is preferably implemented as a separate mobile application, but may alternatively be part of another application or component (such as the enterprise agent 1720 or the secure launcher 1750B). The secure VM may be invoked in various ways; for example, the enterprise agent may request that the secure VM run a particular application, or an application may, upon being launched, request or specify the secure VM as it's execution environment. In some embodiments, the secure launcher 1750B and the secure VM 1750C are used in combination to create a secure space for running enterprise applications, although each can be used independently of the other. Additional details of the secure VM are described below in the section titled Secure Virtual Machine.

As further shown in FIG. 18, a secure container component 1750D may also be installed on the mobile device 920, preferably as a separate mobile application or as part of the enterprise agent 1720. This component 1750D is responsible for creating a secure container on the mobile device for the enterprise applications to store documents and other information. One embodiment of this feature is described below under the heading Secure Document Containers. In some embodiments, when a selective wipe operation is performed, some or all of the documents and data stored in the secure container are deleted from the mobile device or are otherwise made inaccessible.

FIG. 18 also shows two types of mobile applications 1718 that may be installed on the mobile device 920: enterprise applications 1718A and personal applications 1718B. As illustrated, an enterprise application 1718 may include executable security code 1760 (code libraries, etc.) for implementing some or all of the disclosed client-side security functions (application tunnels, passcode verification, encryption of data, etc.) This security code 1760 may be added via a special SDK, or may be added post-development via the application wrapping process described below in the section titled Modifying Behaviors of Pre-Existing Mobile Applications. As mentioned above, in some cases a given enterprise application may not include any security code 1760, but may instead run within either a secure VM 1750C or a secure browser that imposes a layer of security on the enterprise application.

In addition to the components shown in FIG. 18, one or more code libraries may be installed on the mobile device for implementing various security functions, such as data encryption and formation of application tunnels. As one example, a custom SSL library may be installed and used in place of the operating system's SSL library to create secure application tunnels, as described below in the section titled Application Tunnels.

With reference to FIG. 46, according to one aspect, devices enrolled in MRM may be subject to different policies than those devices not enrolled in MRM. For example, a policy file may allow or disallow use of one or more resources provided by or to a mobile device based on whether or not the device (or an app) is enrolled in enterprise MRM (also referred to herein as EMM). Policy files may also be configured to restrict features based on information learned from the MRM system. In step 4601a policy manager may determine whether a device is enrolled in MRM. If the device is not enrolled in MRM, then in step 4603 the device's policy manager (e.g., client agent 404) applies a first policy file (or files). If the device is enrolled in MRM, then in step 4605 the policy manager applies a second policy file (or files). The mobile device may subsequently request access to a resource, in step 4607. A resource may be a data export technique described herein or otherwise (e.g., memory sharing, URL dispatching, etc.), an external network service (e.g., fileshare, dictation, network access, etc.), or any other resource within or accessible by the mobile device. In step 4609, the mobile device allows or disallows access to the resource based on the policy file(s) in use.

When a user (e.g., an employee) executes a managed application on the mobile device, the user is typically challenged to authenticate the user's corporate identity along with passwords and other factors as dictated by corporate policy. After having authenticated the user and device, the access manager components of the system verify that the user is entitled to the application in question and downloads the policies that have been established by the enterprise administrator for this user when using this specific application. These application policies are usually cached and periodically refreshed to ensure compliance with administrative settings. These policies may further restrict access to the managed application only during certain times, from certain networks, form certain geo-locations, and only from devices that are in compliance with all organizations security policies.

By basing one or more policies on enrollment in MRM, or on information learned from enrollment in MRM, a policy can be based on information not otherwise known to the client agent 404, but which is known through the MRM service. For example, when enrolled in MRM, the MRM server stores information regarding whether or not a device has a device level PIN enabled, device level encryption, security certificate information, and any other information that the MRM server has access to through enterprise level management of the device. Thus, in the example of FIG. 46, the second policy file, in one embodiment, may base a policy decision on whether or not the mobile device has a device level PIN enabled. In another example, the second policy file may set a policy based on whether or not the mobile device has device level encryption enabled. In another example, the second policy file may set a policy based on whether or not the mobile device has been provisioned with a required certificate to access a particular enterprise resource. For example, an internal enterprise web site might require that the device be provisioned with a certificate from the MRM server. In addition, the converse may also occur. For example, the MRM server may grant a certificate to a mobile device when an applicable policy file allows the device (or app) to access a particular resource that requires a certificate administered by the MRM server.

7. Application Specific Policies

According to some aspects of managed apps, a policy may be based on or tailored to a particular application or type of application. For example, a policy may be based on metadata associated with a particular application (originator, service description, version, etc.), or may be based on information specific to that application, a feature offered by that application, an application ID of the application etc. In such a manner, a policy may be tailored to a specific application or application type, e.g., web browsers, email, social networks, word processing, spreadsheets, presentation, remote access, virtualization, etc. Policies may further be specific to a publisher of a specific application, e.g., INTERNET EXPLORER published by Microsoft may have a first policy, whereas CHROME published by Google may have a second policy. Alternatively, both INTERNET EXPLORER and GOOGLE CHROME might be treated with a same policy that applies to all web browser applications. Still further, a policy may define how other a web browser may execute sub applications within an execution environment within the web browser, e.g., HTML5 applications, or how a remote access application, e.g., Citrix RECEIVER, might execute virtualized apps.

In still further aspects, policies may be industry specific. For example, all applications identified as associated with a financial services industry might be subject to a first set of one or more policies; all applications identified as associated with a healthcare industry might be subject to a second set of one or more policies; and all applications identified as associated with a legal industry might be subject to a third set of one or more policies. Individual policies may overlap, but the entire set to which each is subject may differ, as needed. In still other aspects, policies may be location specific, even within an industry or irrespective of industry. For example, a healthcare app might be subject to a first set of one or more policies when the mobile device on which the app is running is determined to be geographically located within a first hospital (e.g., Massachusetts General Hospital), and the healthcare app might be subject to a second set of one or more policies when the mobile device on which the app is running is determined to be geographically located within a second hospital (e.g., Brigham and Women's Hospital).

Figure 50:
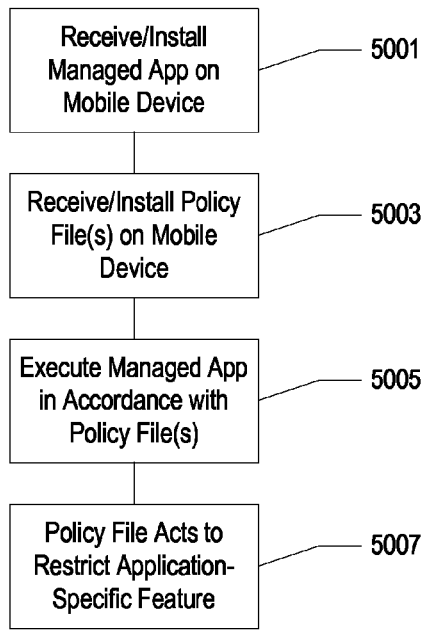

FIG. 50 illustrates an example of a process for managing apps using an application-specific policy file. Initially, a managed application may be received and/or installed in step 5001 on a mobile electronic device, as described herein. In step 5003 the device may separately and/or distinctly receive one or more policy files defining one or more operational and/or behavioral limitations of the managed app, e.g., based on one or more features specific to the managed app. While the policy file(s) may be optionally received as separate files, the policy files may be received as part of a same communication or installation process as the managed app.

In step 5005 the mobile device executes the managed app in accordance with the policy files. That is, the mobile device security manager (or equivalent process) restricts operations of the managed app as defined by the one or more policy files. In step 5007, during operation of the managed app and based on one or the policy files, a feature of the managed app may be restricted, that might otherwise have been allowed had the policy file(s) not been enforced, where such feature is specific to the managed app and not included or possible with other managed apps. Various examples of such application-specific policy files are provided in more detail below, as may be used in accordance with FIG. 50 and/or other processes described herein.

Various aspects are described in more detail below.

7.A. Secure Web Browser Application

Another aspect of certain embodiments involves a web browser within which other mobile device software applications can run. The web browser can be provided with some or all of the enterprise security and other features described herein, and can extend those features for use with the mobile device applications that run within the browser. In this way, the browser can be used to implement BYOD policies while maintaining a desired level of control over applications running on a mobile device 920 of an enterprise user 915. An enterprise can require some or all of its users 915 to install and use this web browser, to reduce enterprise security risks associated with the use of such mobile device applications. Further, in some circumstances, such a web browser can make it unnecessary for application developers to develop different versions of a mobile device application for different mobile device platforms. As mentioned above, the secure browser can also be used to enable mobile device users to access a corporate intranet without the need for a virtual private network (VPN).

Referring to FIG. 17, a mobile device 920 can include a specialized web browser 1732. The web browser 1732 can be configured to perform the functions of conventional web browsers, including surfing Internet sites, displaying and/or playing multimedia content received from web servers, etc. The web browser 1732 can store data accessed via a network in a secure document container 1736 and/or in a secure browser cache. Such data can be deleted at the direction of an enterprise. For instance, a mobile device management system 926 can initiate deletion or otherwise make data stored in the secure document container 1736 and/or the secure browser cache inaccessible. Additionally, the web browser 1732 is preferably configured to act as a container for at least some other software applications 1718 installed on the mobile device 920, to allow those applications 1718 to run within the browser 1732. A software application 1718 can be configured to launch the browser 1732 when the application 1718 is itself launched by a user 915. Moreover, an application 1718 can be configured to launch the browser 1732 and run within the browser 1732 in a manner that is transparent to the user 915. In other words, the user 915 can be given the impression that the application 1718 is running conventionally, without involving the web browser 1732. The web browser 1732 can leverage a protocol that facilitates its usage as a container for other software applications 1718. For example, the web browser 1732 can leverage HTML5 for this purpose.

The web browser 1732 can provide some or all of the functionalities described herein. For example, the web browser 1732 can include some or all of the functionalities provided by the SDK 2404 and/or enterprise agent 1720 described above. Thus, the web browser 1732 can be configured to use application tunnels for communications with network resources (such as enterprise resources 930). The web browser 1732 can receive (or have embedded) mobile device rules 1614 and remedial actions 1616 from the mobile device management system 926 or another component of an enterprise system 910. The web browser 1732 can alternatively have embedded mobile device rules and remedial actions. The web browser 1732 can employ caching and/or compression methods within application tunnels, to improve the user's communication experience as described above. The web browser 1732 can be configured to provide credentials to, read from, write to, and/or provide an editor for displaying and editing documents obtained from a secure document container 1736 of the mobile device 920, as described above. In certain embodiments, the web browser 1732 can implement the secure document container 1736. The web browser 1732 can prompt a user 915 to supply access credentials prior and verify the access credentials prior to exposing functionality of an application 1718 running within the browser 1732 to the user 915. Alternatively or additionally, the web browser 1732 can cause data stored to the mobile device 920 by an application 1718 running in the web browser 1732 to be encrypted. The web browser 1732 can be configured to participate in a remote control session with a helpdesk operator, as described above. The web browser 1732 can be configured to log fault detections, performance measurements, related events, event times, event locations, and other data, and to provide such data to an analytics service as described above in connection with the SDK 2404. The web browser 1732 can be configured to engage in communications with a meta-application, again as described above. By providing at least some of these and/or other functionalities, the web browser 1732 can make it unnecessary for mobile device application developers to embed such functions within the mobile device applications 1718.

In some embodiments, the web browser 1732 is configurable so that one or more of these functionalities can be activated or deactivated under defined conditions that can be configured, e.g., remotely by a remote computer system such as the enterprise system 910. Definable conditions include temporal conditions, location conditions, mobile device properties, user properties (e.g., roles 1606), and others. A temporal condition can be the time of day. For example, the web browser 1732 can be configured to force all mobile traffic (at least for applications 1718 configured to launch the browser 1732) through application tunnels only during working hours (e.g., 8 am to 5 pm on Monday through Friday), and to send the traffic conventionally outside of those hours. A location condition can be the location of the mobile device 920. For example, the browser 1732 can be configured to activate the aforementioned compression and caching features when the device 920 is in a geographical area known to have bad wireless connectivity.

Different web browsers 1732 can be created for different mobile device platforms, with each of the browser versions using a single standard for running mobile device applications. This can advantageously allow mobile device application developers to develop mobile device applications 1718 in just one programming language, as opposed to creating different versions for the various mobile device platforms. This can substantially reduce the application development workload for developers.

An enterprise can require its users 915 to install the web browser 1732 onto their mobile devices 920, and can prohibit the use of other web browsers. The required browser 1732 can be configured to direct at least some of the mobile device traffic through application tunnels to an enterprise-controlled tunneling mediator, such as the mediator 1624 described above. This gives the enterprise greater control over the traffic, reducing security risks. An enterprise can deploy a mobile device rule 1614 that enables a device-resident enterprise agent 1720 or the web browser 1732 itself to detect the installation and/or use of a prohibited web browser on the mobile device 920. An associated remedial action 1616 can prevent the usage of the prohibited web browser according to methods described above, such as by uninstalling it, preventing it from running, etc.

In some embodiments, the secure web browser 1732 can be configured to direct some or all web surfing requests to a content-filtering server as described above.

Other aspects of a browser's operation may also be managed by policy, e.g., including but not limited to, URL filtering (whitelist/blacklist), customization of the presentation layer, bookmarks (preloading/configuration of bookmarks), start/home pages (presetting a page, preventing page changes, preventing page changes except by receipt of an updated policy file, etc.), download behavior (e.g., files in which downloads can be opened or from which a file can be attached into a web page), handling of specific types of URLs (e.g., mailto: to be handled by corporate email rather than gmail, etc.), handling of specific top level domains (e.g., .xxx, .onion, .mil, .us, etc.), and/or control and configuration of runtime platforms such as HTML5, FLASH, Silverlight, .net, etc. (e.g., when embedded apps may be run, under what conditions, storage locations accessible to each of different embedded apps, etc.). Other characteristics may also be managed by policy files.

Figure 51:
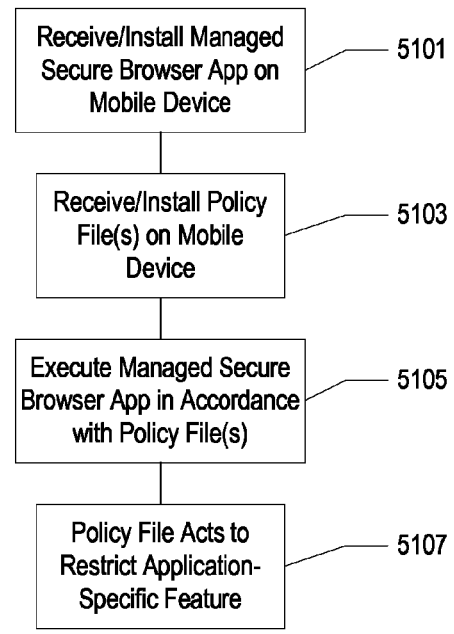

FIG. 51 illustrates an example of a process for managing a secure browser app using an application-specific policy file. Initially, a managed secure browser application may be received and/or installed in step 5101 on a mobile electronic device, as described herein. In step 5103 the device may separately and/or distinctly receive one or more policy files defining one or more operational and/or behavioral limitations of the managed secure browser app, e.g., based on one or more features specific to the managed secure browser app discussed above. While the policy file(s) may be optionally received as separate files, the policy files may be received as part of a same communication or installation process as the managed app.

In step 5105 the mobile device executes the managed secure browser app in accordance with the policy files. That is, the mobile device security manager (or equivalent process) restricts operations of the managed secure browser app as defined by the one or more policy files. In step 5107, during operation of the managed secure browser app and based on one or the policy files, a feature of the managed secure browser app may be restricted, that might otherwise have been allowed had the policy file(s) not been enforced, where such feature is specific to the managed secure browser app and not included or possible with other managed apps. Various examples of such application-specific policy files and features that may be restricted/enforced are discussed above.

7.B. Secure Personal Information Management (PIM) Application

Another aspect of certain embodiments involves a personal information management (PIM) application, e.g., that includes email, calendar, contacts, notes, etc. The PIM app can be provided with some or all of the enterprise security and other features described herein, and can extend those features for use with the individual features of the PIM app. In this way, the PIM app can be used to implement BYOD policies while maintaining a desired level of control over applications running on a mobile device 920 of an enterprise user 915. An enterprise can require some or all of its users 915 to install and use this PIM app, to reduce enterprise security risks associated with the use of such mobile device applications. Further, in some circumstances, such a PIM app can make it unnecessary for application developers to develop different versions of a mobile device application for different mobile device platforms. As mentioned above, the PIM app can also be used to enable mobile device users to access corporate services (e.g., email, calendar, etc.) without the need for a virtual private network (VPN).

Referring again FIG. 17, a mobile device 920 can include a specialized PIM application 1733. PIM app 1733 can be configured to perform the functions of conventional PIM apps, including providing email, calendar, contact, notes, journal, instant messaging, and other communication/collaboration services. PIM app 1733 can store data (e.g., contacts, events, meetings, messages, etc.) accessed via a network in a secure document container 1736 and/or in a secure browser cache. Such data can be deleted at the direction of an enterprise. For instance, a mobile device management system 926 can initiate deletion or otherwise make data stored in the secure document container 1736 and/or the secure browser cache inaccessible. Additionally, PIM app 1733 is preferably configured to act as a container for at least some other software applications 1718 installed on the mobile device 920, to allow those applications 1718 to run within PIM app 1733 (e.g., add-ons, integrations, etc.). A software application 1718 can be configured to launch PIM app 1733 when the application 1718 is itself launched by a user 915.

PIM app 1733 can provide some or all of the functionalities described herein. For example, PIM app 1733 can include some or all of the functionalities provided by the SDK 2404 and/or enterprise agent 1720 described above. Thus, PIM app 1733 can be configured to use application tunnels for communications with network resources (such as enterprise resources 930). PIM app 1733 can receive (or have embedded) mobile device rules 1614 and remedial actions 1616 from the mobile device management system 926 or another component of an enterprise system 910. PIM app 1733 can alternatively have embedded mobile device rules and remedial actions. PIM app 1733 can employ caching and/or compression methods within application tunnels, to improve the user's communication experience as described above. PIM app 1733 can be configured to provide credentials to, read from, write to, and/or provide an editor for displaying and editing documents obtained from a secure document container 1736 of the mobile device 920, as described above. In certain embodiments, PIM app 1733 can implement the secure document container 1736. PIM app 1733 can prompt a user 915 to supply access credentials prior and verify the access credentials prior to exposing functionality as defined by an EMM service or policy. Alternatively or additionally, PIM app 1733 can cause data stored to the mobile device 920 to be encrypted. PIM app 1733 can be configured to log fault detections, performance measurements, related events, event times, event locations, and other data, and to provide such data to an analytics service as described above in connection with the SDK 2404. PIM app 1733 can be configured to engage in communications with a meta-application, again as described above. By providing at least some of these and/or other functionalities, PIM app 1733 can make it unnecessary for mobile device application developers to embed such functions within the mobile device applications 1718.

In some embodiments, PIM app 1733 is configurable so that one or more of these functionalities can be activated or deactivated under defined conditions that can be configured, e.g., remotely by a remote computer system such as the enterprise system 910. Definable conditions include temporal conditions, location conditions, mobile device properties, user properties (e.g., roles 1606), and others. A temporal condition can be the time of day. For example, PIM app 1733 can be configured to force all mobile traffic through application tunnels only during working hours (e.g., 8 am to 5 pm on Monday through Friday), and to send the traffic conventionally outside of those hours. A location condition can be the location of the mobile device 920. For example, PIM app 1733 can be configured to activate the aforementioned compression and caching features when the device 920 is in a geographical area known to have bad wireless connectivity, or in unsecure locations.

Different PIM apps 1733 can be created for different mobile device platforms. An enterprise can require its users 915 to install PIM app 1733 onto their mobile devices 920, and can prohibit the use of other PIM app software. The required PIM app 1733 can be configured to direct at least some of the mobile device traffic through application tunnels to an enterprise-controlled tunneling mediator, such as the mediator 1624 described above. This gives the enterprise greater control over the traffic, reducing security risks. An enterprise can deploy a mobile device rule 1614 that enables a device-resident enterprise agent 1720 or PIM app 1733 itself to detect the installation and/or use of a prohibited PIM app on the mobile device 920. An associated remedial action 1616 can prevent the usage of the prohibited PIM app according to methods described above, such as by uninstalling it, preventing it from running, etc.

In some embodiments, PIM app 1733 can be configured to direct some or all mail send/receive requests and/or events to a content-filtering server as described above.

The above aspects, or other aspects, of a PIM app's operation may also be managed by policy, e.g., including but not limited to, address filtering (whitelist/blacklist autopopulation and/or prepopulation), customization of the presentation layer, address book contents (preloading/configuration of address book, conditions under which contacts may be exported, etc.), calendars to which the user has access, handling of specific types of URLs, files (e.g., URL dispatches), handling message attachments (e.g., defining which applications from which a file can be attached; defining in which applications attached files may be opened, e.g., .PDF to be handled by managed PDF viewer rather than open PDF viewer), control and configuration of add-ons, extensions, and/or runtime platforms such as HTML5, FLASH, Silverlight, .net, etc., control of message retention (duration, conditions, etc., before automatic archive or deletion), and/or control of an automatic installation process for the secure mail/PIM app.

Figure 52:
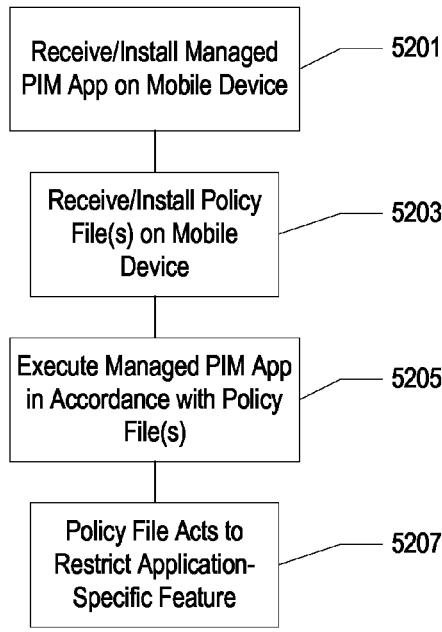

FIG. 52 illustrates an example of a process for managing a PIM app using an application-specific policy file. Initially, a managed PIM application may be received and/or installed in step 5201 on a mobile electronic device, as described herein. In step 5203 the device may separately and/or distinctly receive one or more policy files defining one or more operational and/or behavioral limitations of the managed PIM app, e.g., based on one or more features specific to the managed PIM app discussed above. While the policy file(s) may be optionally received as separate files, the policy files may be received as part of a same communication or installation process as the managed app.

In step 5205 the mobile device executes the managed PIM app in accordance with the policy files. That is, the mobile device security manager (or equivalent process) restricts operations of the managed PIM app as defined by the one or more policy files. In step 5207, during operation of the managed PIM app and based on one or the policy files, a feature of the managed PIM app may be restricted, that might otherwise have been allowed had the policy file(s) not been enforced, where such feature is specific to the managed PIM app and not included or possible with other managed apps. Various examples of such application-specific policy files and features that may be restricted/enforced are discussed above.

7. C. Client Agent/Virtualization Application Policies

Another aspect of certain embodiments involves a virtualization application, e.g., a client agent such as CITRIX RECEIVER, and policies specific to such an application. The client agent can be provided with some or all of the enterprise security and other features described herein, and can extend those features for use with the individual features of the client agent. In this way, the client agent can be used to implement BYOD policies while maintaining a desired level of control over applications running on a mobile device 920 of an enterprise user 915. An enterprise can require some or all of its users 915 to install and use this client agent, to reduce enterprise security risks associated with the use of such mobile device applications. Further, in some circumstances, such a client agent can make it unnecessary for application developers to develop different versions of a mobile device application for different mobile device platforms. As mentioned above, the client agent app can also be used to enable mobile device users to access corporate services (e.g., applications, desktops, servers, email, calendar, etc.) without the need for a virtual private network (VPN).

Referring again FIG. 17, a mobile device 920 can include a specialized client agent 1720. Client agent 1720 can be configured to perform the functions of conventional client agents, e.g., remote access to enterprise resources. Client agent 1720 can store data accessed via a network in a secure document container 1736 and/or in a secure browser cache. Such data can be deleted at the direction of an enterprise. For instance, a mobile device management system 926 can initiate deletion or otherwise make data stored in the secure document container 1736 and/or the secure browser cache inaccessible. Additionally, client agent 1720 is preferably configured to act as a container for at least some other software applications 1718 installed on the mobile device 920, to allow those applications 1718 to run within client agent 1720 (e.g., as a remotely accessed application or virtualized application.). A software application 1718 can be configured to launch client agent 1720 when the application 1718 is itself launched by a user 915.

Client agent 1720 can provide some or all of the functionalities described herein. For example, client agent 1720 can include some or all of the functionalities provided by the SDK 2404. Thus, client agent 1720 can be configured to use application tunnels for communications with network resources (such as enterprise resources 930). Client agent 1720 can receive (or have embedded) mobile device rules 1614 and remedial actions 1616 from the mobile device management system 926 or another component of an enterprise system 910. Client agent 1720 can alternatively have embedded mobile device rules and remedial actions. Client agent 1720 can employ caching and/or compression methods within application tunnels, to improve the user's communication experience as described above. Client agent 1720 can be configured to provide credentials to, read from, write to, and/or provide an editor for displaying and editing documents obtained from a secure document container 1736 of the mobile device 920, as described above. In certain embodiments, client agent 1720 can implement the secure document container 1736. Client agent 1720 can prompt a user 915 to supply access credentials prior and verify the access credentials prior to exposing functionality as defined by an EMM service or policy. Alternatively or additionally, client agent 1720 can cause data stored to the mobile device 920 to be encrypted. Client agent 1720 can be configured to log fault detections, performance measurements, related events, event times, event locations, and other data, and to provide such data to an analytics service as described above in connection with the SDK 2404. Client agent 1720 can be configured to engage in communications with a meta-application, again as described above. By providing at least some of these and/or other functionalities, client agent 1720 can make it unnecessary for mobile device application developers to embed such functions within the mobile device applications 1718.

In some embodiments, client agent 1720 is configurable so that one or more of these functionalities can be activated or deactivated under defined conditions that can be configured, e.g., remotely by a remote computer system such as the enterprise system 910. Definable conditions include temporal conditions, location conditions, mobile device properties, user properties (e.g., roles 1606), and others. A temporal condition can be the time of day. For example, client agent 1720 can be configured to force all mobile traffic through application tunnels only during working hours (e.g., 8 am to 5 pm on Monday through Friday), and to send the traffic conventionally outside of those hours. A location condition can be the location of the mobile device 920. For example, client agent 1720 can be configured to activate the aforementioned compression and caching features when the device 920 is in a geographical area known to have bad wireless connectivity, or in unsecure locations.

Different client agents 1720 can be created for different mobile device platforms. An enterprise can require its users 915 to install client agent 1720 onto their mobile devices 920, and can prohibit the use of other client agent software. The required client agent 1720 can be configured to direct at least some of the mobile device traffic through application tunnels to an enterprise-controlled tunneling mediator, such as the mediator 1624 described above. This gives the enterprise greater control over the traffic, reducing security risks. An enterprise can deploy a mobile device rule 1614 that enables client agent 1720 to detect the installation and/or use of a prohibited application on the mobile device 920. An associated remedial action 1616 can prevent the usage of the prohibited client agent according to methods described above, such as by uninstalling it, preventing it from running, etc.

In some embodiments, client agent 1720 can be configured to direct some or all mail send/receive requests and/or events to a content-filtering server as described above.

Any of the above aspects, or other aspects, of a client agent's operation may be managed by policy, e.g., including but not limited to, application filtering (whitelist/blacklist), differentiation of access/authorizations based on whether an application is running local on a device or through a client agent app, customization of the presentation layer, and/or address book contents (preloading allowable enterprise apps), to name a few.

Using any of the above features, one or more policy files may be adapted to or created for applications running in a virtualization mode on a mobile client device. The virtualization mode may include, for example, when an application is executing remotely from the mobile device (e.g., remote access), but is presented to a user of the mobile device through the client agent software to appear as though the application is executing locally. Other types of virtualization may also be possible. The set of one or more policy files may restrict one or more capabilities of the remotely executing application when the remotely executing application is executing through the client agent than when the same application may be executing directly on the local mobile device. For example, the set of one or more policy files, when applied by the mobile client device mobile device, might cause a managed application to operate using a different set of policy files when the managed application is running in the virtualization mode on the mobile client device, than when the managed application is directly executing on the mobile client device. In some examples, the set of policy files may automatically configure the managed application to run in the virtualization mode. In other examples, the set of policy files may restrict cutting and pasting between applications executing directly on the device with applications executing in the virtualization mode. In some examples, applications running in virtualized mode might be restricted altogether from accessing a device clipboard and/or a secure clipboard (described above), based on one or more policy files. Thus, policy file(s) may be used to restrict one or more capabilities of an application executing remotely from the local (e.g., mobile) device. Such capabilities may include a general capability, such as access to a clipboard, or may include a capability specific to the application program, e.g., access to enterprise-specific modules within the application program. As one non-limiting example, a policy file might restrict user access to a set of enterprise-specific "shapes" in MICROSOFT VISIO when the application is executing through the virtualization mode, whereas the user might have access to the enterprise-specific "shapes" when VISIO is executing locally on a device.

According to an aspect, the set of policy files may apply only to a client agent application capable of executing enterprise approved applications in the virtualization mode on the mobile client device. That is, policy files might apply to a client agent type of application, generically, which may include, e.g., CITRIX RECEIVER and other applications of the same genre. The policy files might then affect any application accessed by or within the client agent application (e.g., using a remote access mode), whereas a different set of policy files might be applied against other types of applications executing on the mobile client device. The client agent application may serve as a sort of application "sandbox", preventing malicious applications from accessing other areas of a mobile device.

In some examples, the policy files might define time-based or geographic location-based restrictions on access to enterprise resources through the client agent application. Different restrictions can be used for each enterprise resource, or common restrictions might apply to multiple enterprise resources.

Figure 53:
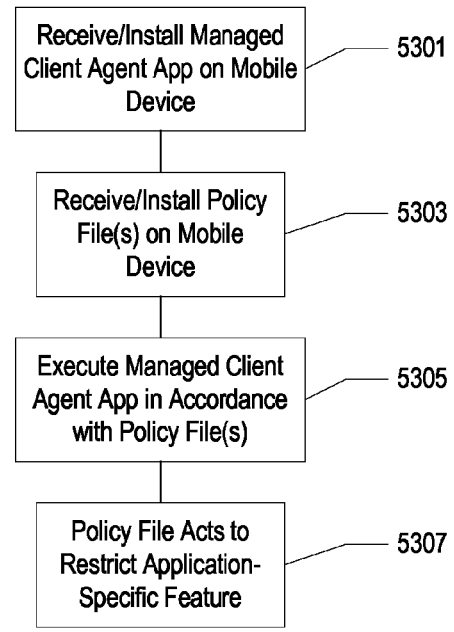

These are but a few examples, and any other type of restriction may be used that is controllable by a policy file as described herein. FIG. 53 illustrates an example of a process for managing a client agent app using an application-specific policy file. Initially, a managed client agent application may be received and/or installed in step 5301 on a mobile electronic device, as described herein. In step 5303 the device may separately and/or distinctly receive one or more policy files defining one or more operational and/or behavioral limitations of the managed client agent app, e.g., based on one or more features specific to the managed client agent app discussed above. While the policy file(s) may be optionally received as separate files, the policy files may be received as part of a same communication or installation process as the managed app.

In step 5305 the mobile device executes the managed client agent app in accordance with the policy files. That is, the mobile device security manager (or equivalent process) restricts operations of the managed client agent app as defined by the one or more policy files. In step 5307, during operation of the managed client agent app and based on one or more of the policy files, a feature of the managed client agent app may be restricted, that might otherwise have been allowed had the policy file(s) not been enforced, where such feature is specific to the managed client agent app and not included or possible with other managed apps. Various examples of such application-specific policy files and features that may be restricted/enforced are discussed above.

7.D. Modification of Unmanaged Applications into Managed Applications

A system and process will now be described for enabling non-developers, such as members of a company's IT department, to add to or otherwise modify the behaviors of an existing mobile application, such as an Android, IOS, or Windows Mobile application, based on the specific application or type of application (e.g., an email application, browser, etc.). The system and process can be used, as one example, to create different versions of a mobile application (with different privileges, access rights, etc.) based on a user's role within the enterprise. For instance, different versions of the mobile application can be created for different job categories (e.g., executive, non-executive employee, intern, etc.) and/or different departments (sales, IT, human resources, etc.). The processes described in this section can be implemented in an application modification or "wrapping" tool or utility that is made available to enterprises that use the disclosed system. This utility may, for example, be hosted on a server (e.g., as a web service) that is accessible to enterprises, or may be provided to the enterprises (e.g., as a PC application).

In a typical use case scenario, the mobile application to be modified is a custom application developed for a particular enterprise. However, this need not be the case. For example, the disclosed system and process are also applicable to commercially available mobile applications available in app stores. The mobile applications can be modified without being specially written to support or enable such modifications. For example, the developer need not include any special code or functionality in the application to enable or facilitate the modifications, and need not be involved in the disclosed process of modifying the application.

The behaviors that are modified typically include or consist of behaviors that involve standard API calls or classes. The following are examples of some of the types of behaviors that can be added or modified via the disclosed process:

1. The cut-and-paste capability commonly provided through mobile device operating systems, such as Android and IOS, can be disabled within a particular mobile application, such as an application that provides access to confidential corporate data. This behavioral change may be desirable to inhibit employees (or a certain class of employees) from accidentally or maliciously sending or moving confidential data to an unauthorized location.

2. A mobile application that stores its output in a non-encrypted format can be modified to store its output in an encrypted format. In one embodiment, this is accomplished in-part by modifying the mobile application's input/output references to cause the application to use an encryption library to encrypt and decrypt the data it write to or reads from memory. Code may also be injected that causes the mobile application to obtain a key from the enterprise agent for use in encrypting and decrypting the data.

3. A mobile application that uses a certain level or type of encryption can be modified to use a different level or type of encryption. For example, if the Federal Government requires the enterprise to begin using a particular encryption library, an existing mobile application can be modified to effectively replace the existing encryption library with the new one.

4. An enterprise can modify a mobile application to cause it to use a special secure connection to the enterprise's network or enterprise system. For example, the mobile application can be configured to use a secure application tunnel as described above.

5. A mobile application can be modified to add a log-in or other authentication prompt or screen.

6. A mobile application can be configured to log and/or report data regarding its usage. This data may include, for example, the time and duration of use, the location (based, e.g., on GPS coordinates) of use, the application features invoked, the access points accessed, etc. (Existing mobile device operating systems such as Android and IOS provide functionality for enabling applications to obtain these and other types of usage parameters). This usage data may be used by an enterprise to, for example, monitor employee compliance with the enterprise's usage restriction policies, to identify and correct problems with particular enterprise mobile applications, or to determine whether to continue paying for application licenses for particular users. The application usage data collected on a mobile device 920 may, for example, be reported by the enterprise agent 1720 to the mobile device management system 926, or some other system, for analysis.

7. A mobile application can be modified to enable an enterprise to remotely initiate deletion of the application's data on a particular mobile device 920 of a particular employee, without affecting other users of the application. As mentioned above, such selective wipe operations may also be executed when, for example, a user fails to enter a valid enterprise passcode a threshold number of times.

8. A mobile application can be modified such that it can only be launched in by a secure launcher 1750B (FIG. 18), and not by the general launcher of the mobile device's operating system. This may be accomplished by, for example, changing one or more references in the mobile application to the mobile operating system's general launcher so that they point instead to the secure launcher. As explained above, the secure launcher may implement one or more security policies, such as requiring entry of a valid passcode before the enterprise application is launched. The secure launcher may also cause the enterprise applications to run in a secure execution environment, such as by causing the enterprise applications to be executed using a secure virtual machine (FIG. 18) that is separate from the mobile operating system's virtual machine. (See section below.)

9. A mobile application can be modified to cause it to launch in a secure virtual machine 1750C (FIG. 18). This may be accomplished by, for example, modifying a reference in the application (e.g., in an Android application's manifest or in any manner in which the application is launched) to cause it to be launched in a secure VM. As explained below in the section titled Secure Virtual Machine, the secure VM may implement some of the client-side security functions described herein (encryption, application tunnels, etc.), reducing or eliminating the need to add such functions to the mobile applications themselves. This can enable enterprise applications to be run in a secure execution environment, while personal applications are run in a default VM.

Other examples include disabling offline access, adding URL filtering, adding API filtering, disabling writes to local storage, and preventing documents from being opened in new applications.

Figure 19:
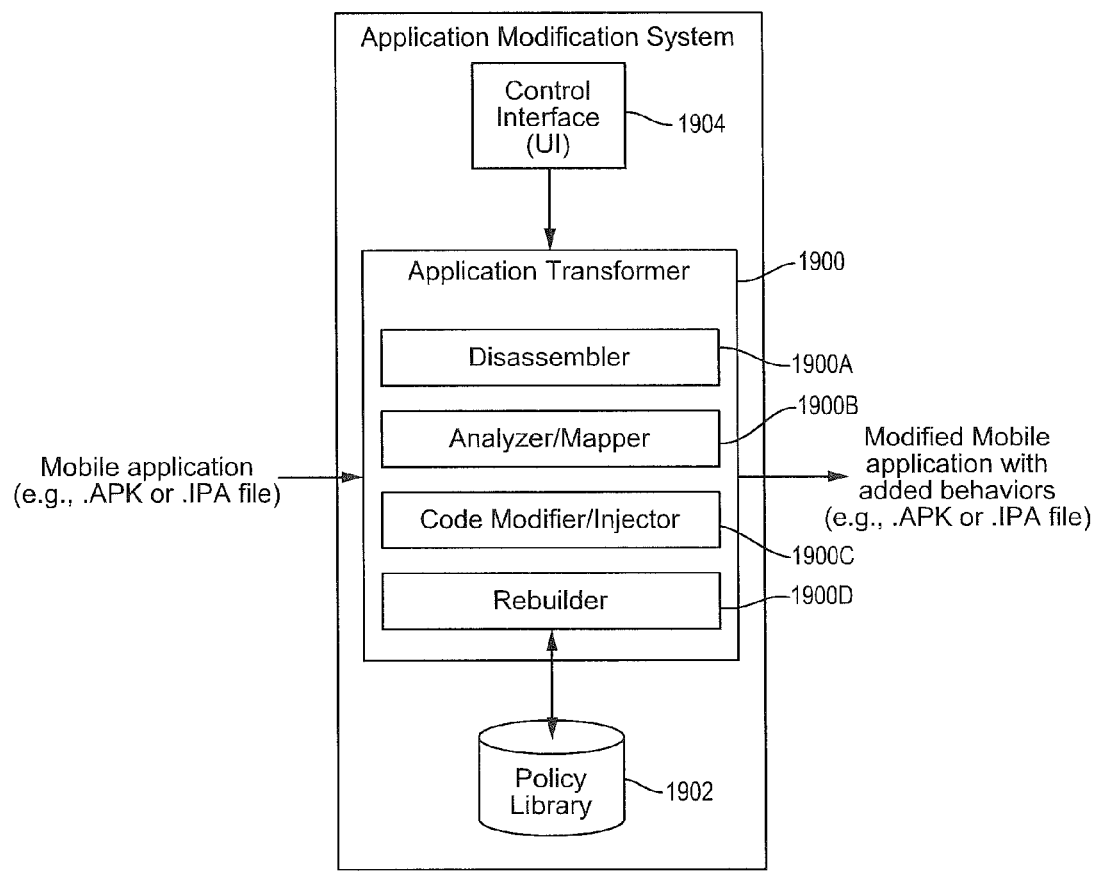
FIG. 19 depicts a process flow according to illustrative aspects described herein.

FIG. 19 illustrates one embodiment of the application modification system. According to this aspect, the system includes an application transformer 1900 that makes the modifications based on operator-selected policies. For example, after completion of the process described below, an application may be modified to operate under the control of one or more policy files provided by an EMM. That is, the modifications do not necessarily implement specific policies, but rather modify an application to be capable of running in accordance with one or more EMM policy files. In other aspects, an application's source code may be modified, e.g., hard-coded, to permanently implement one or more restrictions described above.

For Android applications, the transformer 1900 receives the application's .APK (application package) file, and outputs a new .APK file representing the modified application. For IOS, the transformer 1900 receives a IPA (iPhone application archive) file, and outputs a new .IPA file representing the modified application. Various other file formats and mobile device operating systems may be supported. As shown in FIG. 19, the application transformer 1900 preferably includes a disassembler 1900A (for disassembling the application's executable code), a code analyzer/mapper 1900B, a code modifier/injector 1900C, and an application rebuilder 1900D.

As shown in FIG. 19, the transformer 1900 accesses a policy library 1902 containing policy descriptions for various policies and associated behaviors, such as those listed above. For example, a "disable cut-and-paste" policy may be provided. The policies may be described in any appropriate language and format. For example, the policy descriptions may be stored as DEX or smali files. As further shown in FIG. 19, the system also includes a control interface 1904 or "console" that enables an administrator to select the policy or policies to be applied to a given mobile application. The console 1904 may also include a tool for enabling administrators to define new policies. For example, a new policy could be defined that adds an authentication sequence, disables cut-and-paste, and causes all files to be stored in encrypted form. This policy could then be used as a basis for modifying multiple mobile applications.

In a typical use case scenario, a member of a company's IT department uses the control interface 1904 to: select a mobile application to be modified, select the policy or policies to be applied, and initiate the transformation process. The modified application is then distributed to the relevant employees or other users (e.g., through a special application store that is accessible through the enterprise agent, as described above). This process may be repeated with different policy selections to create different versions of the application for different users. The policy library 1902 may, for example, include policy files for implementing some or all of the types of policies described above (and various others).

Figure 20:
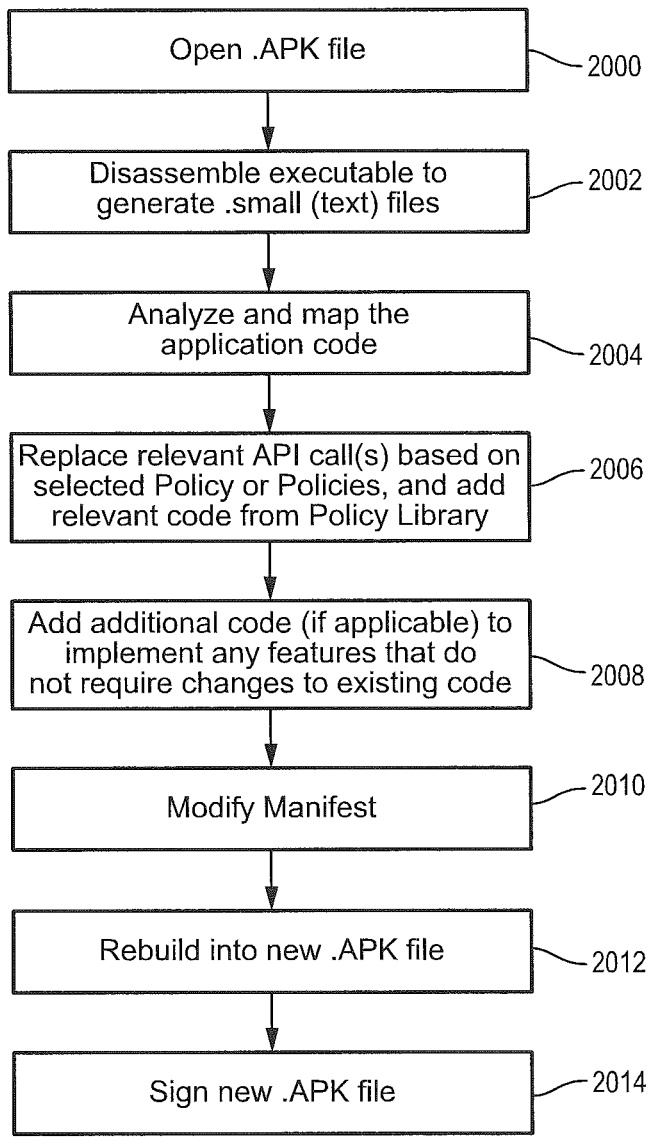
FIG. 20 depicts a process flow according to illustrative aspects described herein.

FIG. 20 illustrates a sequence of steps that may be performed by transformer 1900 to modify an Android application based on a selected set of one or more policies. A similar process may be used to transform applications written for other operating systems, such as IOS and Windows Mobile. The entire process shown in FIG. 20 is preferably fully automated, meaning that no human intervention is required. In block 2000, the .APK file is opened. As in known in the art, this file contains various application components, such as the application's executable code, images, XML files, a manifest, and other resources. In block 2002, the disassembler 1900A disassembles the application's executable code to generate one or more textual smali files. As will be recognized, an intermediate language other than smali can be used to implement the disclosed modification tasks.

In block 2004, the analyzer/mapper 1900B analyzes and maps the application code (in smali format) to generate information regarding API calls that will potentially be replaced. In block 2006, the relevant API calls are replaced with new API calls for implementing the selected policy or policies. In addition, the associated code from the policy library 1902 is added. For example, if the cut-and-paste functionality is being disabled, any API calls that are used by the application to access the operating system's cut-and-paste functionality may be removed or replaced.

As one example, a new version of the Java I/O File Input Stream (Java.io.FileInputStream) class may be generated, and all references to the original class may be modified to point to this new version. The new version may, for example, include code for encrypting and decrypting data on file write and read operations, respectively.

In block 2008 of FIG. 20, additional code may be added, if applicable, to implement one or more features or behaviors that do not require the replacement of any existing API calls. As one example, code may be added for enabling an authorized administrator to remotely trigger the deletion, on a user-specific or mobile device specific basis, of the application's data stored on a particular mobile device. In this example, the code added in block 2008 would add functionality for receiving and processing a message containing a command to perform such a selective wipe or deletion operation.

To provide an additional layer of security, the portions of the code that are modified in the preceding blocks may be obfuscated using obfuscation methods and functions that are known in the art. The use of obfuscation impairs the ability of others to reverse engineer the security functions added to the application. Obfuscation may be applied to the disassembled code (e.g., smali code), or may be applied at a different level.

In block 2010 of FIG. 20, the application's manifest (e.g., AndroidManifest.xml) is modified, if necessary, to reflect the modified behaviors. As one example, if the application is being modified to be launched in a secure shell, the manifest would be modified to instruct the Android operating system to use the secure shell to launch the application. In some embodiments, this involves replacing a reference to the operating system's general launcher with a reference to a secure launcher 1750B (FIG. 18). In block 2012, the modified smali code and manifest, together with the other extracted application components, are compiled into a new .APK file. In block 2014, this new .APK file is signed using a digital certificate.

Mobile applications written for the IOS operating system may be modified in a similar manner. Typically, such an application is distributed as an IPA file that includes an executable in Mach-O format, a P-list, and resources. Once the executable has been disassembled to produce ARM assembly code, it is mapped to identify classes to potentially be replaced, and is then modified by: (1) identifying one or more specific classes to be replaced, (2) adding/modifying the code to replace such class(es), (3) adjusting the class structure to reflect the modifications, so that each new class is a subclass of the original code, and (4) updating the references to point to the new class or classes.

According to an alternative method, an IOS application may be modified using limited external symbol substitution. A dynamically linked library may then be added to the application package before recertifying. Subsequently, when the application is executed (runtime) the dynamically linked library is initialized and API interception is accomplished as a result. When using an SDK approach for delivering iOS framework code, the same library may be statically linked into the application during a build process while a small number of relevant symbols may be overridden by compilation directive. API interception may again occur at run time by hooking and replacing system functions.

In some embodiments, the above-described process may be augmented with one or more tests for verifying that the mobile application to be modified does not contain malware, or does not otherwise present a risk to enterprise security. One such test involves generating a hash of some or all of the application files, and then comparing this hash to library of hashes that are associated with known malware. If a match is found (indicating that the application likely includes malware), the application modification process may be terminated.

Another such test involves inspecting the API calls and URL requests made by the application to check for suspicious activity. Examples of suspicious activity include reading the personal contacts stored on the device, sending an email to a cloud storage service, and sending location information without first requesting user permission. Based on this analysis, a score (e.g., on a scale of 1 to 100) may be generated that represents the level of risk posed by the mobile application. The modification process may be terminated if this score exceeds a threshold. The score may additionally or alternatively be included in a report that details the suspicious activity detected. The application modification tool may, for example, output this report for review, and may prompt the administrator-user to confirm or indicate whether the modification process should proceed.

The application modification system shown in FIG. 19 may, for example, be implemented on a server, personal computer, workstation, or other computer or system of computers within a company's enterprise system. Alternatively, the application modification system may be implemented as a hosted service that is accessible to corporate customers over the Internet. The various components 1900-1904 of the system may be implemented as code modules that are stored on any type(s) of non-transitory computer storage device or system.

The components 1900, 1902, 1904 of the system shown in FIG. 19 may be provided to companies as part of a larger system (such as the system described in other sections of this specification) for enabling the companies to manage mobile devices and to protect data accessed by such devices. For example, these components may be bundled and licensed with various other components described in this disclosure. Alternatively, the application modification system of FIG. 19 may be provided to companies as a standalone product, or as a system that is hosted by a service provider and accessed over a network.

Using one or more aspects described above, a mail/email application may be secured using application-specific policies. That is, one or more policies may apply to the mail app based on features provided by, within, or to the mail app. According to an aspect, a policy may define when to accept and/or deny a URL dispatch including a preformed mail message. According to another aspect, a policy may derive information from a single sign-on server (SSO) (e.g., user ID, handle, etc.) to autoconfigure a mail application with out user interaction. In such a scenario, a mail application may communicate with a client agent 404, create a MicroVPN or tunnel to a network server 406, and then configure itself based on information received via the MicroVPN.

According to some aspects, mail facilities may be enabled and/or disable based on a policy file. In one example, contact sharing may be enabled/disables based on policy. A user may be allowed to export a contact to other managed apps, but not to unmanaged apps. In addition, a user may be able to attach, open, view, access, use, and/or export an attachment only to, from or within other managed apps, and not be allowed to perform similar activities on or with an attachment using an unmanaged app.

Figure 21:
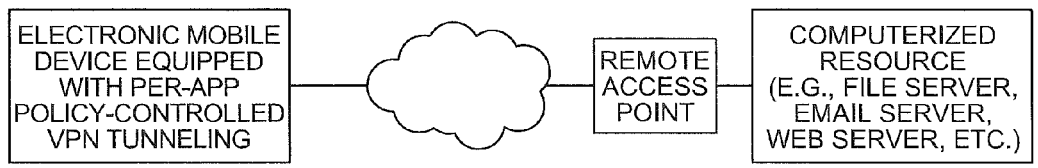
FIG. 21 depicts a system according to illustrative aspects described herein.

According to another aspect, policies may be usable to define how long messages are retained and when messages are deleted (e.g., based on time, size, sender, recipient, etc.). Policies may also be used to define storage 8. Network and Data Access 8.A. MicroVPN/Tunneling FIG. 21 shows an electronic environment which enables an electronic mobile device to securely access a computerized resource via per-app policy-controlled VPN tunneling. The cloud represents a communications medium (e.g., a wireless computer network, the Internet, a cellular network, combinations thereof, and so on) which enables the electronic mobile device to communicate with the remote access point.

Figure 22:
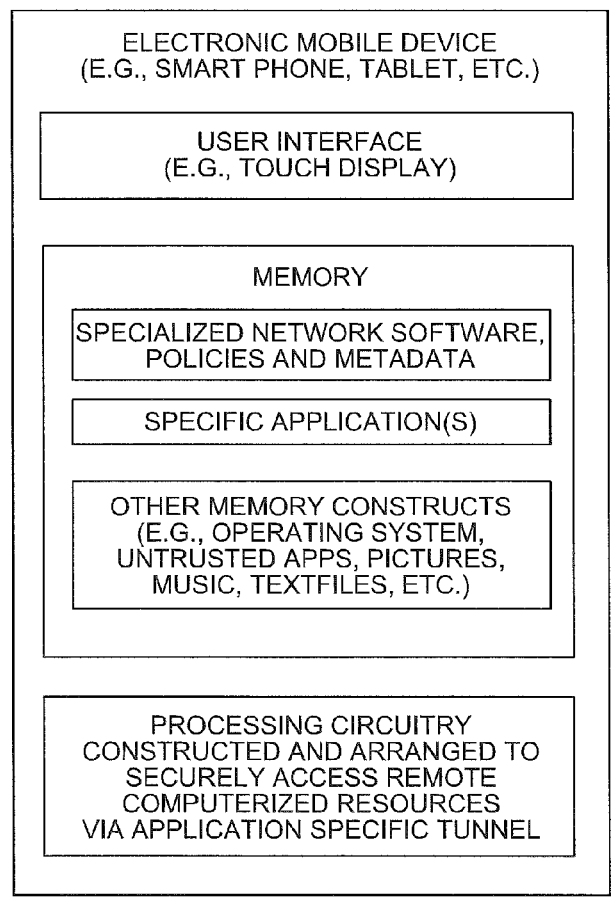
FIG. 22 depicts a device according to illustrative aspects described herein.

FIG. 22 shows particular details of the electronic mobile device of FIG. 21. As shown, the electronic mobile device includes, among other things, a user interface for user input/output, memory to store information, and processing circuitry. Examples of suitable mobile devices include smart phones, tablet devices, electronic notebooks, and so on. Furthermore, various specific platforms are suitable for use such as those running iOS provided by Apple Computer, Android provided by Google, and Windows provided by Microsoft are suitable.

During operation, the mobile device builds per-application policy-controlled VPN-style connections between the specific applications and a remote access point (e.g., a VPN server, a gateway, an individual computer, etc.). In particular, each specific application (i.e., a specially configured trusted application) is capable of coordinating operation with the specialized network software so that an application specific tunnel is constructed between that specific application and the remote access point.

Figure 23:
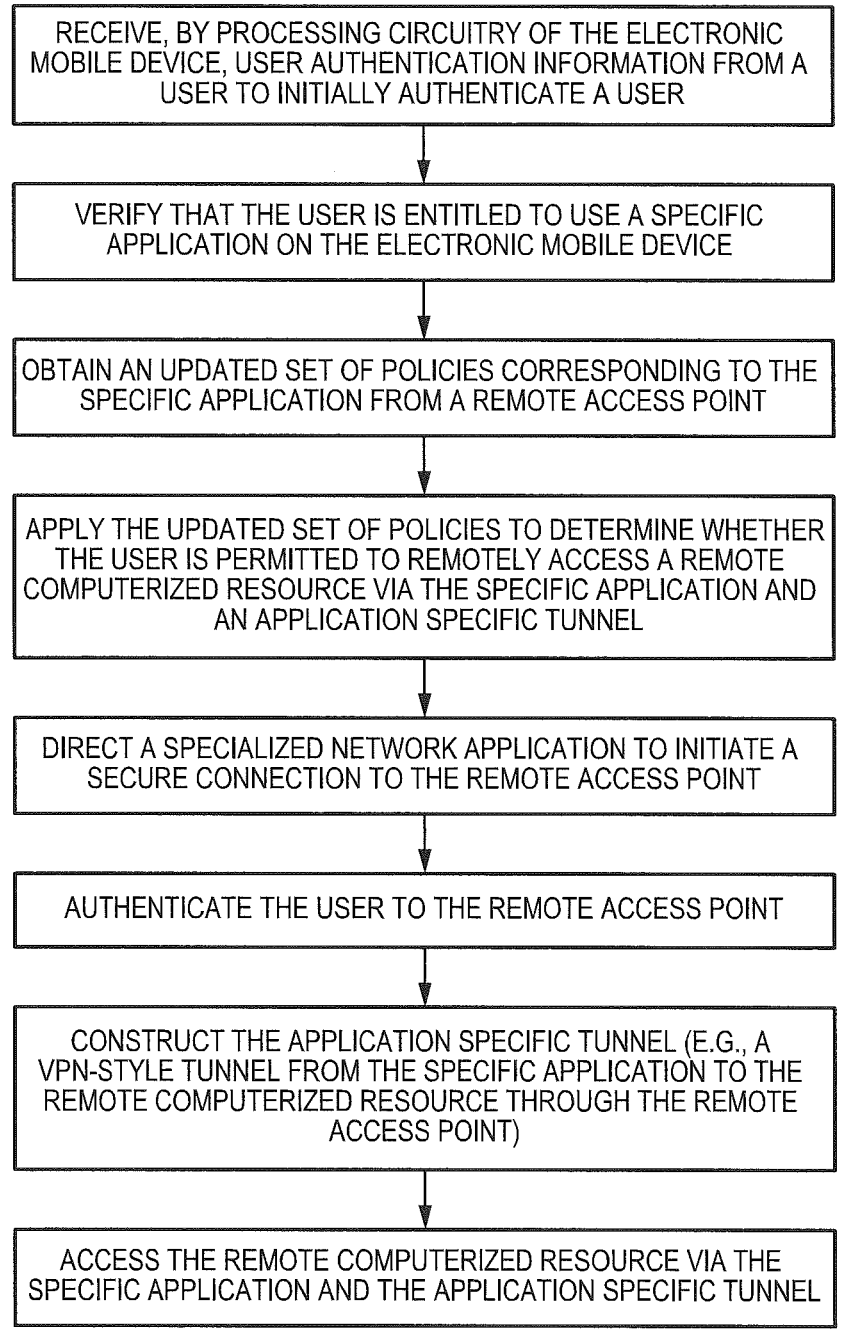
FIG. 23 depicts a process flow according to illustrative aspects described herein.

FIG. 23 shows a flowchart of a procedure which is performed by the processing circuitry of the mobile device when operating in accordance with various software constructs stored in the memory of the mobile device. In particular, the procedure enables the mobile device to access a computerized resource via an application specific tunnel.

A variety of authentication techniques may be employed in the procedure above. For example, in some arrangements, a set of tickets (or tokens) is loaded into the mobile device during initial authentication. Such tickets may be one-time use and/or time-based, and impose constraints to certain applications, resources and/or privileges (e.g., short-lived vs. longer-lived access).

During authentication of the user to the remote access point, such tickets are offered in order to authenticate the user in a transparent manner. That is, one or more tickets are provided from the mobile device to the remote access point in an effort to avoid burdening the user to re-authenticate. Nevertheless, it should be understood that over time, such tickets may expire. If such tickets expire prior to use, operations that required tickets instead now require that the user re-authenticate.

In some arrangements, access control is structured so that the level of security diminishes over time. For instance, some tickets which enable high security may expire first (e.g., after a predefined amount of time such as an hour, 15 minutes, etc.). Other tickets which enable lower security may expire at a later time (e.g., after a later predefined amount of time such as a day, etc.). Other ticket-based techniques for imposing different levels of security based on time are suitable for use as well.

Enterprises may be increasingly interested in developing native applications for popular mobile device platforms such as iOS, Android, and/or Windows phones and tablets. One of the requirements for such applications may be the need for enterprise developed applications to be able to access the corporate intranet from wherever the device and user may be.

Many mobile resource management (MRM) solutions (also referred to herein as EMM) offer a virtual private network (VPN) solution as the mechanism for providing such access. However, traditional VPNs have the downside that all applications running on the mobile device are granted uniform access to the corporate intranet. Increasingly, mobile devices used to access enterprise resources are employee owned and not enrolled with an EMM server, and therefore not tightly controlled or managed by a corporate IT department. As such, there is a real risk of malware and other unauthorized software running on an employee's own mobile device to gain access to the corporate intranet when using traditional VPN software.

Some forms of EMM seek to manage an entire mobile device. This is often referred to as Mobile Device Management (MDM). Unlike MDM, a Mobile Application Management (MAM) solution seeks only to manage the enterprise applications and their associated data which may be installed and running on an employee's mobile device. Such systems generally use role based access to provision specially prepared enterprise apps that are specifically designed to protect corporate assets. Such applications may be policy controlled by an enterprise administrator and often require the employee to logon to corporate servers in order to access the managed applications.

Access to corporate servers is not a problem when the mobile device is connected directly to a private corporate wireless network or LAN. But when the employee's device is connected to a foreign network such as 3G/4G network, home-based WiFi, or other public access point, transparent network access to corporate intranet is problematic without a VPN. However, because a system level VPN gives access to all the mobile device applications uniformly, a better solution for a managed enterprise applications is a per-application VPN technology that can be policy controlled. In this case, VPN access is granted to specific users and their specially prepared enterprise applications only based on each employee's role within the organization. Non-enterprise applications would have no awareness of or access to resources inside of the corporate intranet through this per-application VPN connection.

An object of certain embodiments is to provide a method for specially prepared enterprise applications delivered and managed through an enterprise mobile application management system to utilize VPN technology for access to corporate intranet resources even when the mobile device is connected to a foreign network outside the corporate LAN, and to do so with enterprise assigned policies that limit such access to specifically designated mobile applications for specifically designated users based on their role within the organization.

Enterprises first create (or adapt) their native mobile applications using tools and SDKs associated with the mobile application management solution they have chosen to deploy. Among other things, this step adds some specialized network software to an application such that it will be capable of making VPN-style connection through a corporate gateway device after authenticating the user and application.

These specially prepared enterprise managed applications are then uploaded into an enterprise app store for an organization's employees to peruse and choose to install based on their role within the organization. Alternatively, such applications can be pushed directly to mobile devices for employees who have enrolled their device with a corporate EMM/MRM server, or may be downloaded/installed from an enterprise web site, email, public network storage, removable media, through other apps, etc.

When a user (e.g., an employee) executes a managed application on the mobile device, the user is typically challenged to authenticate the user's corporate identity along with passwords and other factors as dictated by corporate policy. After having authenticated the user and device, the access manager components of the system verify that the user is entitled to the application in question and downloads the policies that have been established by the enterprise administrator for this user when using this specific application. These application policies are usually cached and periodically refreshed to ensure compliance with administrative settings. These policies may further restrict access to the managed application only during certain times, from certain networks, form certain geo-locations, and only from devices that are in compliance with all organizations security policies.

Assuming policy compliance is established and an application is permitted to run, when the managed application actually begins to interact with the network API's, the specialized network software added during the application preparation stage checks the current policy settings to determine if network access should be permitted. Assuming the mobile device is running on a foreign network and the enterprise administrator has permitted VPN access for this application for this user, then the specialized network software initiates a secure connection to the corporate gateway device, authenticates the user using a ticket or token linked to the same credentials that were previously used to logon and confirm entitlement. If such token/ticket has expired, then the user may be asked to authenticate again before allowing VPN access for the mobile application. After authenticating to the gateway, the specialized network software constructs a VPN tunnel through the gateway device to the actual intranet resource that the application seeks to access. However unlike other system level VPN solutions, this VPN tunnel is only available for this specific application to use.

If network access policy dictates no network access, then specialized network software may cause the network APIs to fail to connect. If the network access policy permits network usage but does not permit VPN access, then the network service calls are routed directly to the mobile device platform network services though the local network that the device is attached to rather than being tunneled back to the corporate intranet. Additional network policies can further constrain the range of corporate intranet servers that are accessible by IP address, domain or host names, port/protocol, TCP/UDP, etc.

Traditional system level VPN solutions do not discriminate between trusted and untrusted applications. By building in a per-application policy-controlled VPN solution, enterprises can ensure that only authorized applications for authorized users in specifically configured access scenarios are able to access corporate intranet resources from a foreign network.

In addition, by adjusting policy files, an enterprise can make policy decisions regarding whether to allow a MicroVPN (also sometimes referred to as per app VPN), disallow a MicroVPN, or tunnel data from specific managed applications to and from the enterprise servers. Each MicroVPN and/or tunnel may use single sign-on (SSO) credentials to authenticate a user, and may vector communications through gateway server 406 to enterprise resources. Using the SSO credentials, an enterprise can determine what certificates a user has or is entitled to, and may respond to certificate challenges accordingly. In addition, mobile device 404 and/or gateway server 406 may intercept network traffic based on policy information and/or based on certificates associated with the user/device, and/or may respond to authentication challenges by virtue of seeing network level conversation. In one example, the network traffic may be intercepted at the mobile device end point and the managed app may retrieve proper authentication cert (e.g., based on enterprise policy) and supply to the enterprise resource it tries to access.

The above-provided description may discuss particular operations of the applications figuratively (e.g., as the applications performing the operations). However, it is actually the processing circuitry of the mobile device that may perform operations while executing the applications.

8.B. Using a Secure Container to Control Access to Enterprise Resources

An improved technique for managing encrypted data vaults for storing data on mobile devices includes directing read and write operations from an application running on a mobile device according to an enterprise-generated policy, specific to that application, which designates an encrypted vault for the data specified by the read and write operations.

Referring back to FIG. 8, which shows an illustrative environment in which embodiments hereof can be practiced, a mobile device 810, such as a smartphone, tablet, PDA, and the like, has installed upon it various mobile applications. The mobile applications include a set 820 of managed applications 822, 824, and 826, which are managed by the enterprise, and a personal application 830, which is not managed by the enterprise. In some examples, an enterprise mobility management (EMM) client 840 is also installed on the mobile device 810. The EMM client 840, also referred to herein as a "broker," is configured to connect, e.g., via a network such as the Internet, with an EMM server 850, which typically includes an authentication server 852, an application store 854, and a key server 856. An example of the EMM client 840 is a client agent available for Citrix. An example of the EMM server 850 is a gateway server 406 that provides access to enterprise resources and/or cloud resources.

The illustrated mobile device 810 also includes a shared data vault 842. The shared data vault 842 includes encrypted files and/or data objects accessible to each of the set 820 of managed applications. Encrypted data vault 842 may also be referred to herein as a secure persistent storage area.

Each application in the set 820 of managed applications is associated with a respective policy. For example, application 822 is associated with a policy 822a, application 824 is associated with a policy 824a, and application 826 is associated with a policy 826a. In some examples, the policies 822a, 824a, and 826a are provided in the form of files, such as XML or JSON files, in which the respective policy is expressed as a set of key/value pairs. In an example, each policy 822a, 824a, and 826a includes a record of all applications within the set 820 of managed applications, as discussed above.

In some examples, each application in the set 820 of managed applications is also associated with a respective private application vault. For example, application 822 is associated with a private application vault 822b, application 824 is associated with a private application vault 824b, and application 826 is associated with a private application vault 826b. Encryption keys for the private application vaults 822b, 824b, and 826b, as well as an encryption key for the shared vault 842 are obtained from the key server 856 on the EMM server 850 and can be held temporarily within the mobile device.

Each of the set 820 of managed applications is specially designed or adapted for use with the enterprise. Some of the set 820 of managed applications may be designed specifically for the enterprise. Others of the set 820 of managed applications are more widely used applications (e.g., available to the public) that have been specifically adapted for use with the enterprise. Each of the set 820 of applications includes injected code that enables the application to conform to a framework of the enterprise. The injected code can be compiled into the application using an SDK. Alternatively, the injected code can be applied as a wrapper around a general-use application, to adapt it for use with the enterprise. In the context of the improvements disclosed herein, the injected code serves to divert API calls for reading and writing from the application to its associated policy, such that the read or write requests are redirected to a designated secure vault in accordance with the settings of the policy.

In typical operation, a user of the mobile device 810 starts the EMM client 840, logs on to the EMM server 850 via the authentication server 852, and accesses the application store 854. The user can then peruse enterprise applications available from the application store 854, select desired applications, and download them to the mobile device 810, where the downloaded applications are included in the set 820 of managed applications. For each application downloaded, a corresponding policy is also downloaded to the mobile device, and the policies of all applications in the set 820 are updated to reflect all members of the set 820.

In an example, policies (e.g., 822a, 824a, and 826a) are refreshed periodically and/or in response to particular events, such as each time the respective application is started and/or each time the user logs onto the EMM server 850. Policies can thus be adapted over time and dynamically transferred to the mobile device 810 from the EMM server 850.

Depending on settings of the policies 822, 824, and 826, applications within the set 820 of managed applications can be constrained to exchange files and/or data only with other applications within the set 820. For example, API calls from the application 822 specifying file reads or writes are intercepted by the injected code of the application 922. The policy 822a is read, and the read or write operation specified is diverted to an encrypted vault (e.g., the private vault 822b or the shared vault 842), depending on the settings in the policy 822a.

In some examples, applications in the set 820 of managed applications on the mobile device 810 can be assigned to different groups. In such cases, policies (e.g., 822a, 924a, and 826a) are updated to include records of groups and group members. The flow of files and/or data between applications can thus be further restricted to members of particular groups. For example, each group may be provided with its own shared vault 942. Providing different groups of mobile applications within the managed set 820 can help to segregate applications handling highly sensitive data from those that handle less sensitive data.

The above-described process of intercepting an API call, consulting an application's policy, and allowing, blocking, or redirecting the operation specified by the API call based on the policy can be carried out in a number of contexts. In one example, the above process can be applied for selecting a set of applications on the mobile device 810 that can be used to open a file or data element identified by a link or icon (e.g., using Open In). In another example, the above process can be applied for copying data or data objects from one application and pasting the data or data objects in another application (e.g., via a hidden, encrypted paste buffer). In yet another example, the above process can be applied for moving files into and/or out of a protected file vault, as described herein. Essentially, any operation used to move data into and/or out of an application can make use of the above technique.

Figure 24:
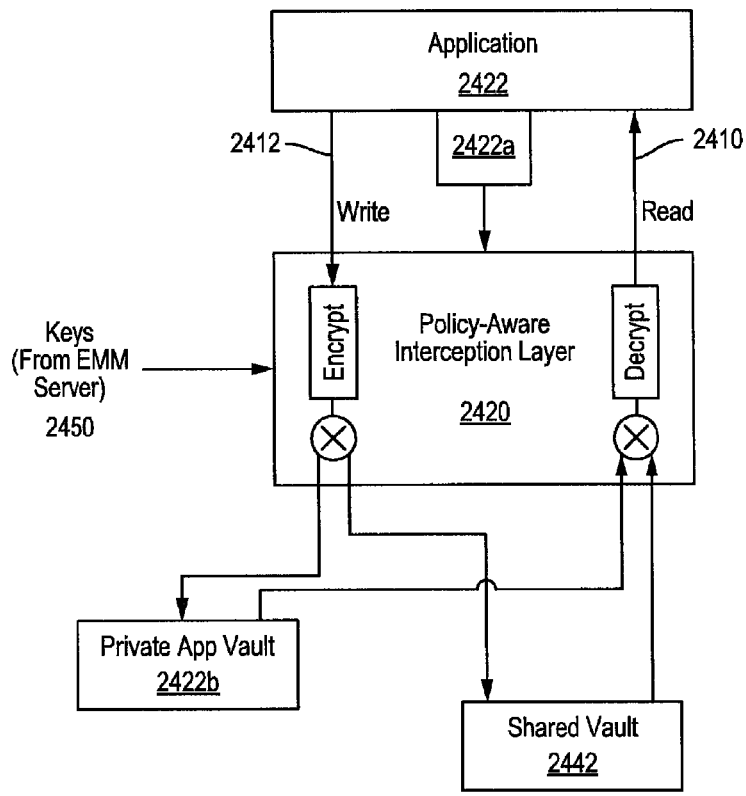
FIG. 24 depicts a device according to illustrative aspects described herein.

FIG. 24 shows various features of the mobile device 2410 in additional detail. Here, the application 2422 (representative of any of the applications of the managed set 820) issues read operations 2410 and write operations 2412 to persistent space on the mobile device 2410. In non-managed applications, such read and write operations would typically be directed to the application's sandbox. Here, however, read and write operations are intercepted by the policy-aware interception layer 2420 and directed to an appropriate encrypted vault. For read operations 2410, the policy-aware interception layer 2410 inspects the type of data to be read and consults the policy 2422a. If the policy 2422a specifies that the identified type of data is stored in the private application vault 2422b, the policy-aware interception layer 2420 obtains the data from the private application vault 2422b. However, if the policy 2422a specifies that the identified type of data is stored in the shared data vault 2442, the policy-aware interception layer 2420 obtains the data from the shared data vault 2442. The policy-aware interception layer 2420 then decrypts the data (using an encryption key from the EMM server 2450), and returns the data to the application 2422.

In the case of write operations 2412, the policy-aware interception layer 2420 inspects the type of data to be written and consults the policy 2422a. If the policy 2422a specifies that the identified type of data is to be stored in the private application vault 2422b, the policy-aware interception layer 2420 encrypts the data and stores the data in the private application vault 2422b. However, if the policy 2422a specifies that the identified type of data is to be stored in the shared data vault 2442, the policy-aware interception layer 2420 encrypts the data and stores the data in the shared data vault 2442.

Referring back to FIGS. 17-18, in some embodiments, a mobile device 1720 can include a secure document container or secure storage area 1736, which can be referred to as a "vault" or as a "container." As explained herein, container 1736 can help prevent the spread of enterprise information to different applications and components of the mobile device 1720, as well as to other devices. The enterprise system (which can be partially or entirely within the cloud) can transmit documents to the devices 1720, which can be stored (e.g., by the enterprise agent 1720) within the container 1736. The container 1736 can prevent unauthorized applications 1718 and other components of the device 1720 from accessing information within the container 1736. For enterprises that allow users to use their own mobile devices 1720 for accessing, storing, and using enterprise data, providing containers 1736 on the devices 1720 helps to secure the enterprise data. For instance, providing containers 1736 on the devices 1720 can centralize enterprise data in one location on each device 1720, and can facilitate selective or complete deletion of enterprise data from the device 1720.

As used in this context, a "document" can comprise any computer-readable file including text, audio, video, and/or other types of information or media. A document can comprise any single one or combination of these media types.

The secure document container 1736 can compose an application that implements a file system 1738 that stores documents and/or other types of files. The file system 1738 can comprise a portion of a computer-readable memory of the mobile device 1720. The file system 1738 can be logically separated from other portions of the computer-readable memory of the mobile device 1720. In this way, enterprise data can be stored in secure document container 1736 and private data can be stored in a separate portion of the computer-readable memory of the mobile device 1720. The container 1736 can allow the enterprise agent 1720, mobile device applications 1718 and/or other components of the device 1720 to read from, write to, and/or delete information from the file system 1738 (if authorized to do so). Deleting data from the container 1736 can include deleting actual data stored in the container 1736, deleting pointers to data stored in the container 1736, deleting encryption keys used to decrypt data stored in the container 1736, and the like. The container 1736 can be installed by, e.g., the agent 1720, IT administrators of the enterprise system, or the device 1720 manufacturer. The container 1736 can enable some or all of the enterprise data stored in the file system 1738 to be deleted without modifying private data stored on the mobile device 1720 outside of the container 1736. The file system 1738 can facilitate selective or complete deletion of data from the file system 1738. For example, a component of the enterprise system can delete data from the file system 1738 based on, e.g., encoded rules. In some embodiments, the agent 1720 deletes the data from the file system 1738, in response to receiving a deletion command from the enterprise EMM system. In other embodiments, the data is deleted without the assistance of the agent 1720, for example if an agent 1720 is not provided.

The secure document container 1736 can comprise an access manager 1740 that governs access to the file system by applications 1718 and other components of the mobile device 1720. Access to the file system 1738 can be governed based on document access policies (e.g., encoded rules) stored in the documents and/or the file system 1738. A document access policy can limit access to the file system 1738 based on (1) which application 1718 or other component of the device 1720 is requesting access, (2) which documents are being requested, (3) time or date, (4) geographical position of the device 1720, (5) whether the requesting application 1718 or other component provides a correct certificate or credentials, (6) whether the user of the device 1720 provides correct credentials, (7) other conditions, or any combination thereof. A user's credentials can comprise, for example, a password, one or more answers to security questions (e.g., What is the mascot of your high school?), biometric information (e.g., fingerprint scan, eye-scan, etc.), and the like. Hence, by using the access manager 1740, the container 1736 can be configured to be accessed only by applications 1718 that are authorized to access the container 1736. As one example, the access manager 1740 can enable enterprise applications installed on the mobile device 1720 to access data stored in the container 1736 and to prevent non-enterprise applications from accessing the data stored in the container 1736.

Temporal and geographic restrictions on document access may be useful. For example, an enterprise administrator may deploy a document access policy that restricts the availability of the documents (stored within the container 1736) to a specified time window and/or a geographic zone (e.g., as determined by a GPS chip 1716) within which the device 1720 must reside in order to access the documents. Further, the document access policy can instruct the container 1736 or agent 1720 to delete the documents from the container 1736 or otherwise make them unavailable when the specified time period expires or if the mobile device 1720 is taken outside of the defined geographic zone.

Some documents can have access policies that forbid the document from being saved within the secure document container 1736. In such embodiments, the document can be available for viewing on the mobile device 1720 only when the user is logged in to the enterprise system.

The access manager 1740 can also be configured to enforce certain modes of connectivity between remote devices (e.g., an enterprise resource or other enterprise server) and the container 1736. For example, the access manager 1740 can require that documents received by the container 1736 from a remote device and/or sent from the container 1736 to the remote device be transmitted through application tunnels, for example, as described above. Such application tunnels can use the tunneling mediator of the enterprise system. The access manager 1740 can require that all documents transmitted to and from the container 1736 be encrypted. The enterprise agent 1720 or access manager 1740 can be configured to encrypt documents sent from the container 1736 and decrypt documents sent to the container 1736. Documents in the container 1736 can also be stored in an encrypted form.

The secure document container 1736 can be configured to prevent documents or data included within documents from being used by unauthorized applications or components of the mobile device 1720 or other devices. For instance, a mobile device application 1718 having authorization to access documents from the container 1736 can be programmed to prevent a user from copying a document's data and pasting it into another file or application interface, or locally saving the document or document data as a new file outside of the container 1736. Similarly, the container 1736 can include a document viewer and/or editor that does not permit such copy/paste and local save operations. Moreover, the access manager 1740 can be configured to prevent such copy/past and local save operations. Further, the container 1736 and applications 1718 programmed and authorized to access documents from the container 1736 can be configured to prevent users from attaching such documents to emails or other forms of communication.

A mobile device application 1718 can be programmed to lookup and find the secure document container 1736 (or a secure web browser 1732, described below, that includes the container 1736) as a resource of the mobile device 1720. In certain embodiments, the application 1718 can run in a secure virtual machine separate from a virtual machine of an operating system of the mobile device 1720. According to some other embodiments, the application can run within the secure web browser 1732. An application 1718 can be programmed to write enterprise-related data only into the container 1736. For instance, the application's 1718 source code can be provided with the resource name of the container 1736. Similarly, a remote application (e.g., an enterprise resource 830) can be configured to send data or documents only to the containers 1736 of one or more mobile devices 1720 (as opposed to other components or memory locations of the devices 1720). Storing data to the container 1736 can occur automatically, for example, under control of the application 1718, the enterprise agent 1720, or the web browser 1732. An application 1718 can be programmed to encrypt or decrypt documents stored or to be stored within the container 1736. In certain embodiments, the container 1736 can only be used by applications (on the device 1720 or remote) that are programmed to look for and use the container 1736, and which have authorization to do so.

The secure document container 1736 can serve as a temporary repository for documents and other files sent to the mobile device 1720. Remote applications can be configured to send documents to the container 1736 (e.g., via application tunnels) on a onetime or periodic basis. For example, a sales-related enterprise resource 930 can be programmed to send sales-related documents (e.g., most recent price sheets) every morning to the containers 1736 of a team of users having sales-related roles (e.g., sales persons). The sales-related documents can have document access policies such that the documents will "self-destruct" (e.g., be automatically deleted from the container 1736—the deletion being performed by, e.g., the container 1736 itself or the enterprise agent 1720) at a certain time or at the expiration of a time period beginning at a defined event (e.g., the user's opening of a document). Document distribution policy file(s) (e.g., encoded rules, as described herein) can be provided (e.g., within the mobile device management system) to control when and how remote applications (e.g., enterprise resources) send documents to the containers 1736, to which users the documents are sent, what restrictions (e.g., temporal or geographic restrictions) are placed on the use and availability of the documents (e.g., in the form of document access policies as described above), etc.

Remote applications that send documents to one or more secure document containers 1736 of mobile devices 1720 can be configured to integrate with other repositories, for the purpose of sending documents from such repositories to the containers 1736. Such other repositories can be stored, for example, within the enterprise system (e.g., enterprise document repositories such as a Microsoft Sharepoint™ repository) or in a cloud computing system (e.g., a Box.net™ repository).

EMM solutions have traditionally taken the approach of managing entire mobile devices through mobile device management (MDM) servers. Increasingly EMM solutions are focusing on a mobile application management (MAM) solution that seeks only to manage the enterprise applications and their associated data which may be installed and running on an employee's mobile device. Such systems generally use role-based access to provision specially prepared enterprise apps that are specifically designed to protect corporate assets. Such applications often require employees to logon to corporate servers in order to access the managed applications. Additionally, such applications may be associated with policies established by an enterprise administrator to control application access while also seeking to protect and control information held by the application.

One of the biggest challenges in managing enterprise applications on an otherwise unmanaged mobile devices is ensuring that information used by the managed application cannot escape from the set of trusted enterprise applications that IT administrators make available to their enterprise users. Information can escape in any number of ways, and a robust EMM system will provide policies and enforcement mechanisms to prevent such information leakage where IT administrators deem it proper and to provide policy overrides, where appropriate. However, even with a robust set of information containment policies, there are other threats to the security of the information managed by applications on mobile devices.

One such threat is that applications may store some information persistently on the mobile device by writing files or other data into the flash memory or other persistent storage on the device. Most mobile platforms will segregate persistent data recorded by applications into private application sandboxes. However this sandboxing is trivially defeated with common tools capable of rooting or jail-breaking the device. Rooting and jail-breaking are techniques that seek to replace parts of the mobile device operating system platform often with goal of defeating app sandboxing, app integrity checks, and other OS provided security mechanisms. Rootkits and jail-breaking software for most popular mobile platforms are readily available on the public Internet and easy to use. Since rooting and jail-breaking are so easy to accomplish, most enterprises do not wish to rely on mobile device OS enforced sandbox as the only means of protecting data that an application may need to persist.

Some mobile device platforms additionally allow information to be encrypted in its persistent form and some applications do take advantage of these features. Invariably, such encryption mechanisms rely on the encryption keys being held on the device itself with the keys themselves protected by a user supplied PIN or passcode. The fact that the keys are held on the device and protected by weak cryptographic factors means that the data is not particularly well protected from hacking, particularly if a device is stolen and hacker has ample time to try to unlock the keys. Also, since the keys are in possession of the device holder, an enterprise is powerless to remove them or revoke access for a terminated employee unless they can recover the device.

Another issue with app sandboxing that occurs on mobile platforms is that it is problematic to have a single repository of documents that are available to all managed applications on the mobile device and potentially synced offline to cloud based storage. Mobile applications work around the sandbox limits in various ways, all of which have drawbacks. Often, they will exchange files of certain fixed types with other applications that have registered to accept certain those same types. The drawback here is that one ends up with multiple copies of a particular file in each app's sandbox. If one or more apps wish to edit the file content, keeping track of which app has latest versions is problematic for users.

One can overcome the issue highlighted above if users are trained to always send their modified documents back to a common sync agent application which might also be charged with syncing documents to/from cloud based storage. Cloud-based file sharing service mobile applications are an example of an application that permits this sort of data exchange with cloud-based sync. The drawback here is that these extra steps are easy to forget. Also, they are not required when using equivalent desktop applications that operate on the notion of shared documents folders for all applications. These two facts can lead to data file consistency issues and poor user experience if users are not properly trained.

Another approach to this problem is to save the files that one wishes to share into shared storage on those mobile platforms that support this concept. This has the downside that shared storage is world readable and therefore shared with all applications. Once information is placed into shared storage, containment of the information is lost since any application on mobile device can read it. Also the data can trivially be accessed by anyone who gains physical access to the device using standard file viewers and development tools.

The challenges of information containment and sharing of documents between trusted applications that are highlighted above are overcome by introducing the concept of an encrypted file vault. An encrypted file vault is a logical container into which all persistent data read/written by a mobile application (which would otherwise end up in a writeable file in the app sandbox) will be redirected. The contents of the vault are themselves written into file(s) held inside an app sandbox. But the contents of all files and the file metadata itself (name, size, access times, etc.) are all encrypted.

Strong encryption algorithms (e.g. FIPS 140-2 certified) are used to protect all information placed into the vault with keys that are managed by the enterprise rather than the users themselves. Keys would typically be assigned based on a tuple of user, device, and application or app group. That implies that distinct key sets are used each unique combination of user, device, and application/app group. The keys are maintained off device in an enterprise key management server. The keys may be downloaded temporarily to the mobile device to enable data access, but only after strongly authenticating the user, device, and application in question.

An application may be written in such a way that it is aware of the presence of file vault services. Applications written with this awareness can utilize any number of file vaults, which they can identify explicitly with vault name identifiers. However applications will not always be written with such awareness. Correspondingly, administrator defined policies can be used to configure a default file vault for each application. The default file vault of an application is used for the transparent redirection of all application file I/O that would otherwise end up in a writable portion of the application sandbox or shared storage.

The typical mechanism for assigning apps to a default file vault dictates that the administrator place each configured mobile application into a named security group by policy. Then all applications that share the same security group inherit the same default file vault. In this manner, applications not only gain the security of the encrypted container for their data, but apps configured with the same default file vault will see a single consistent view of their data shared with other similarly configured file applications.

It should be noted that not all writable areas in the app sandbox are appropriate for sharing with other applications, for example the application's /tmp directory. The implication here is that there is always an app private file vault that would be used to hold certain files and directories. If the app is not configured into a shared group, then all files are redirected to the app private vault. However if an app were configured into shared group, documents and other such files would be redirected to the common vault but files designated for special private directories like /tmp would continue to flow to the app's private vault.

It should also be noted that the notion of a shared file vault does imply the existence of a common broker that manages the shared files on behalf of all applications. Without such a broker, one would not be able to share files transparently. While such a broker could be a network-attached service that does not exist on the mobile device itself, such a design would preclude offline access to the encrypted file vault. For this reason, another application installed on the mobile device will generally serve this role. An EMM client agent like the Citrix client agent mobile application would be the typical host of this shared vault broker.

The above-described technique thus offers the unique combination of transparent file access, strong encryption with keys managed by the enterprise, and dynamic reconfiguration of the vaults by policy.

Enterprises may create (or adapt) their native mobile applications using tools and SDKs associated with the enterprise mobility management (EMM) solution they have chosen to deploy. In preparing their app for EMM deployment, they certainly have the freedom to (re)write specific application logic to utilize encrypted file vault services exposed by the EMM developer SDK as needed for their application. However, most often, an application will already be written to use standard file system APIs of the platform for which they were developed. As such, it is far more convenient for the application developer if the EMM SDK and tools can transparently redirect these native file access services to one or more file vaults dictated by administrative policy rather than rewriting their application. This approach also allows an administrator to reconfigure targeted file vaults without directly modifying and recompiling the application.

When taking this approach, the application developer need not worry about the specifics of how to interface with the native file vault services. Instead, by integrating the header files, libraries, and run-time support of the EMM system framework code with the application, all file system APIs called by the application will be redirected to a policy-aware interception layer. Assuming the encrypted file vault feature is configured, then based on the policies in force for the current user, device, and app, a set of default file vaults will be selected and the file system API interception layer will be configured to target them.

After preparing the application for the specific EMM system, the managed application is uploaded to the EMM server for the purpose of publishing the application for the enterprise users to consume. As part of this app publishing workflow, an IT administrator will choose policies and settings that apply to the application and associated user roles. Once uploaded and configured, the applications is made available to organization's employees to peruse and install based on their role within the organization. Alternatively, such applications can be pushed directly to mobile devices for employees who have enrolled their device with a corporate EMM server.

When a user executes a managed application on the mobile device, the user is typically challenged to authenticate their corporate identity along with passwords and other factors as dictated by corporate policy. After having strongly authenticated the user, device, and application, the access manager components of the system verifies that the user is entitled to the application and downloads the configured policies for this specific app and user.

Based on those policies, the EMM framework that is delivered with the managed app configures itself. It will select one or more default file vaults to use and configure the file system API interception layer to target the selected vaults. If a configured file vault does not already exist, a new empty vault is initialized. This ensures that a change in file vault policies that would select a not-previously-used vault will appear to the application as if it had been recently installed (e.g. empty writable directories).

As the application begins to utilize the file system APIs, the file system API interception layer looks for file accesses that intersect the writable portions of the app sandbox or shared storage. Such files are flagged and tracked by the file system interception layer such that all subsequent file I/O is passed through encryption/decryption before being placed into the real file container that holds the data.

In order to accomplish this encryption, the required keys first need to be recovered. These are retrieved from the key management server and cached locally. If this is the first access to the protected files in a long time, the user will be forced to do a strong authentication by logging on to the EMM server. Periodically these keys will need to be refreshed as dictated by the time to live policy setting for the keys. When refreshing, as long as user has maintains an active logon with EMM server, this refreshing of keys can occur without user interaction. If user logs off or their logon session expires, then the refreshing of keys will need to be strongly authenticated again.

When the file vault is private to the application, the file vault services layer directly uses the mobile platform's file I/O functions to read and write encrypted version of the data. Also, all file directory access functions are also similarly intercepted such that the real file names and sizes can be obscured.

To support random access to any range of bytes within an encrypted file, a scheme that uses encrypted blocks is may be used. For this to work, the keys used to encrypt/decrypt each of the file block are derived mathematically from base keys and the file/block offset. Similarly, different files will use initialization vectors for the cryptography as well. These techniques represent sound and reasonably standard practices for the encoding encrypted file volumes using a single set of cryptographic keys.

For efficiency, the system may read ahead or delay writing of data to encrypted data content as necessary to optimize application performance. Delayed write of encrypted data must be flushed prior to closing files or exiting the application.

When the file vault is to be shared with another application, the same processes described above are used, but they must occur in a common file system repository under the control of common file system broker application. The implication is that when the file system interception layer is operating on shared file vault, the file vault services will operate not by directly reading/writing encrypted data, but rather by redirected these services via remote procedure call mechanism to the brokering application. Within the brokering application, the same local file vault services used for private vault files are utilized for the shared vault content.

There are other possible designs for implementing shared vaults. For example, one can use shared storage coupled with inter-process synchronization mechanisms to coordinate access. But in any workable design, the key factor to be noted is that same underlying encrypted file vault services are used to encrypt the actual file data regardless of where the encrypted data will be retained or how concurrent access to it coordinated.

By providing strong and transparent file encryption services with keys managed by enterprise servers, security of information held and stored locally by managed mobile applications can be made secure without the need to rewrite applications to use new file access paradigms.

Adding the notion a policy directed file vault configuration that permits multiple applications to be bound to the same default file vaults further permits secure sharing of documents between properly configured managed applications.

The architecture described herein can be used by a corporation or other enterprise to flexibly implement a policy, such as a corporate owned device, BYOD (bring your own device) policy, for allowing enterprise users to use their mobile devices to securely access enterprise resources (documents, confidential data, corporate application and database servers, etc.). This is accomplished through various security features that, for example, enable the enterprise to specify and implement policies for controlling mobile device accesses to particular enterprise resources. The policies may, for example, control mobile device accesses to enterprise resources based on a variety of criteria, such as the role of the respective user (e.g., which department the user is in), the configuration of the mobile device (e.g., whether any blacklisted mobile applications are installed), the logged behaviors of the user, the location of the mobile device, and/or the time at which access to the enterprise resource is requested. The architecture further enhances security, in some embodiments, by creating application tunnels that enable enterprise mobile applications to securely communicate over a network with the enterprise system. The architecture may also enable IT staff to selectively (and remotely) wipe a user's mobile device of enterprise application(s) and corporate data when, for example, the user discontinues employment or violates a corporate policy (such as if they jailbreak their device or otherwise use it in a disallowed configuration).

The use of passcodes (or other types of authentication information) for enterprise applications reduces the likelihood that enterprise resources will be improperly accessed when, for example, the mobile device is lost or stolen, or when the mobile device is used by an employee's children to play games. In some embodiments, the secure launcher (or another component installed on the mobile device) further reduces this risk by performing a selective wipe of the mobile device when, for example, the user attempts but fails to enter a valid passcode a threshold number of consecutive times (e.g., 5 or 10). The selective wipe operation deletes some or all of the enterprise applications and associated data from the mobile device, without deleting any personal applications or data. In some embodiments, the enterprise's IT department can initiate a selective wipe of a particular mobile device by remotely issuing a wipe command to the device.

In some embodiments, when a selective wipe operation is performed, some or all of the documents and data stored in the secure container are deleted from the mobile device or are otherwise made inaccessible.

In another example, a meta-application can be configured to create gateway rules based at least partly on the time(s) at which a mobile device was "wiped" (e.g., deletion of some or all data stored on the device or removal of software application(s) from the device).

A system and process will now be described for enabling non-developers, such as members of a company's IT department, to add to or otherwise modify the behaviors of an existing mobile application, such as an Android, iOS, or Windows Mobile application. The system and process can be used, as one example, to create different versions of a mobile application (with different privileges, access rights, etc.) based on a user's role within the enterprise. For instance, different versions of the mobile application can be created for different job categories (e.g., executive, non-executive employee, intern, etc.) and/or different departments (sales, IT, human resources, etc.). The processes described in this section can be implemented in an application modification or "wrapping" tool or utility that is made available to enterprises that use the disclosed system. This utility may, for example, be hosted on a server (e.g., as a web service) that is accessible to enterprises, or may be provided to the enterprises (e.g., as a PC application).

In a typical use case scenario, the mobile application to be modified is a custom application developed for a particular enterprise. However, this need not be the case. For example, the disclosed system and process are also applicable to commercially available mobile applications available in app stores. The mobile applications can be modified without being specially written to support or enable such modifications. For example, the developer need not include any special code or functionality in the application to enable or facilitate the modifications, and need not be involved in the disclosed process of modifying the application.

The behaviors that are modified typically include or consist of behaviors that involve standard API calls or classes. The following are examples of some of the types of behaviors that can be added or modified via the disclosed process:

A mobile application can be modified to enable an enterprise to remotely initiate deletion of the application's data on a particular mobile device of a particular employee, without affecting other users of the application. As mentioned above, such selective wipe operations may also be executed when, for example, a user fails to enter a valid enterprise passcode a threshold number of times.

Additional code may be added, if applicable, to implement one or more features or behaviors that do not require the replacement of any existing API calls. As one example, code may be added for enabling an authorized administrator to remotely trigger the deletion, on a user-specific or mobile device specific basis, of the application's data stored on a particular mobile device. In this example, the code added would add functionality for receiving and processing a message containing a command to perform such a selective wipe or deletion operation.

FIG. 54 shows an illustrative method for managing access by a mobile device to enterprise storage, as described above. Initially, a managed application may be received and/or installed in step 5401 on a mobile electronic device, as described herein. In step 5403 the device may separately and/or distinctly receive one or more policy files defining one or more operational and/or behavioral limitations of the managed app, e.g., based on one or more features discussed above. While the policy file(s) may be optionally received as separate files, the policy files may be received as part of a same communication or installation process as the managed app.

In step 5405 the mobile device executes the managed app in accordance with the policy files. That is, the mobile device security manager (or equivalent process) restricts operations of the managed app as defined by the one or more policy files. In step 5407, during operation of the managed app and based on one or more of the policy files, the managed app may be restricted in accessing an enterprise data storage, that might otherwise have been allowed or disallowed had the policy file(s) not been enforced. Various examples of such policy files and features that may be restricted/enforced are discussed above.

8.C. Single Sign-on and Identity Management

According to some aspects of policy-based device management, an EMM controller may incorporate single sign-on (SSO) features based on enterprise-level authentication. Single sign-on generally refers to a property of access control of multiple related, but independent software systems. With SSO enabled a user logs in once and gains access to all systems without being prompted to log in again for each separate software system. Using authentication via network proxy, the EMM service may provide various forms of inline authentication challenges to provide seamless SSO, e.g., NTLM, Kerberos, digests, certificates, etc. For example, if an authentication challenge arrives via HTTP, a gateway may intercept the challenge and automatically respond on a user's behalf. However, if a certificate is required, the certificate typically originates with a client to respond to an authentication challenge.

In view of the above, one or more policy files may define the circumstances under which one or more applications operating under the control of or in accordance with those policy files can and cannot use an SSO service to bypass an authentication or security challenge.

Figure 25:
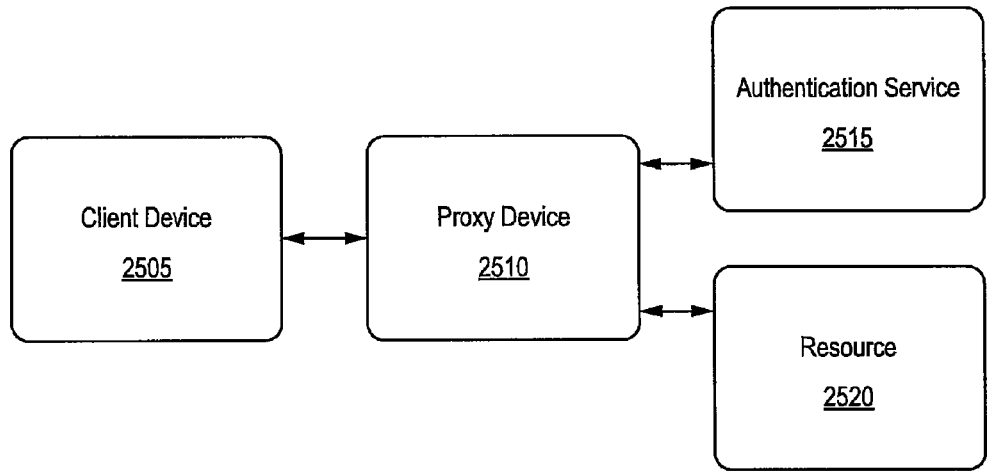
FIG. 25 depicts a system according to illustrative aspects described herein.
Figure 26:
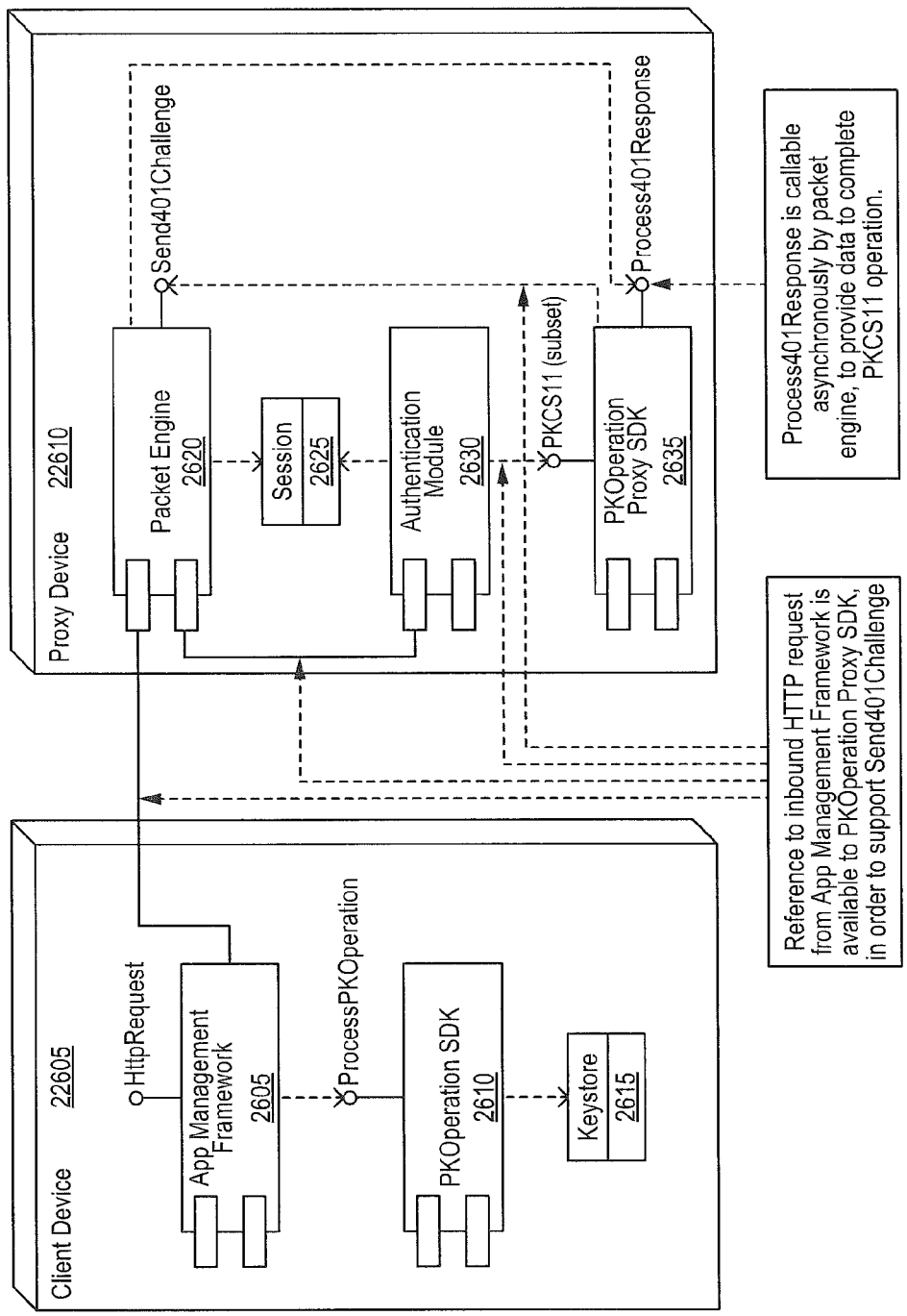
FIG. 26 depicts a system according to illustrative aspects described herein.

FIG. 25 depicts an illustrative system having a client device 2505, a proxy device 2510, resource(s) 2520, and/or authentication service(s) 2515, which may be configured to perform SSO and operate under the control of one or more policy files. FIG. 26 depicts an illustrative detailed view of the client device 2505 and proxy device 2510. These elements may implement one or more aspects described herein. A brief summary of these aspects will now be provided, with additional examples provided below. The client device 2505 may communicate with one or more resources 2520 and/or authentication services 2515 using a proxy device 2510. In some aspects, the client device 2505 might not be configured to communicate directly with the resources 2520 and/or authentication services 2515. For example, the client device 2505 and resources 2520 may use different authentication and/or communication protocols. The proxy device 2510 may translate between these different protocols. Additionally or alternatively, the proxy device 2510 may provide additional benefits, as will be described in the examples below.

The client device 2505 may send a request for resources 2520, such as documents, emails, services, files, and the like, to the proxy device 2510. The proxy device 2510 may forward the request to the resource 2520, and in response, authentication between the proxy device 2510 and resource 2520 may be initiated. At one or more points during the authentication, the resource 2520 may request a signature, such as from a client certificate. The proxy device 2510 might not directly have access to the client certificate, so the proxy device 2510 may involve the client device 2505 in the authentication process, such as if the client device 2505 controls access to the client certificate. For example, the proxy device 2510 may request that the client device 2505 sign or decrypt an authentication message using the client certificate (or a private key included therein), or return a list of available security certificates or a selection by the user of a particular security certificate.

The proxy device 2510 may provide the client device 2505 with context information that identifies the authentication session between the proxy device 2510 and the resource/authentication server. For example, the context information may identify a data structure of authentication information exchanged (or to be exchanged) between the proxy device 2510 and resource 2520 and/or the proxy device 2510 and the authentication service 2515. The client device 2505 may use the context information to verify or otherwise confirm the authentication session between the proxy device 2510 and the resource/authentication server. Once the context information is verified, the client device 2505 may provide the requested signature to the proxy device 2510, and the proxy device 2510 may complete authentication with the resource 2520 and/or the authentication service 2515. Then, the proxy device 2510 may retrieve the resource requested by the client device 2505 and provide it to the client device 2505.

The client device 2505 may comprise any of an end point device, client computers 107, 109, 211-214, mobile device 302, mobile device 402, or any other device. For example, the mobile device may comprise any of a smartphone, a tablet, and the like. One or more applications may be running on the client device 2505. An application may desire to access a protected resource, such as an enterprise resource, and a module included in the application (or other applications) may facilitate access to those protected resources. For example and with reference to FIG. 26, an application running on the client device 2505 may send a request for a resource (e.g., an HTTP request) to MAMP Framework 2605, which may facilitate communications with the proxy device 2510. In some aspects, the MAMP Framework 2605 may run as a privileged application on the client device 2505. The MAMP Framework 2605 may comprise all of or a portion of the functionalities provided by the MAMP framework 414, as previously described.

The client device 2505 may also have a PKOperation SDK module 2610 that facilitates access to a keystore 2615 that stores one or more client certificates that may be used to sign for authentication purposes. For example, the client device 2505 may authorize access to or have possession of client certificate(s) representing the user of the client device 2505. In some aspects, the certificate may be an enterprise-issued certificate. The certificate may be bound to a physical smart card having a cryptographic module. In other words, the cryptographic secret may be confined to the smart card. The user may authorize the client device 2505 to access the smart card protected certificate. Alternatively, the certificate may be bound to a virtual smart card, which may use hardware and/or software modules to protect the key. The client device 2505 and/or a removable hardware module of the client device 2505 may be authorized by a provisioning process to store the certificate and private key. The user may be required to enter a PIN code using the client device 2505 to authorize operations involving the client certificate private key. Another external device separate from the client device 2505 (e.g., another smartphone) may control the certificate, and the client device 2505 may utilize a custom reader interface to access the certificate controlled by the external device.

In some embodiments, the client certificate and/or private key might be confined to the client device 2505 or to a physical smart card. Accordingly, the client device 2505 may maintain control of the key. If authentication using the key is required, the client device 2505 may need to be involved in the authentication process. This allows the client device 2505 to have assurance that operations performed with the certificate private key are ones that the client device 2505 intended. Some organizations may use smart cards to achieve non-repudiation for certain operations, which may require users to have authority over all uses of a certificate issued by the organization. For example, document signing may require explicit user authority, whereas authentication to certain systems might not require explicit user authority. Suitable mechanism(s) for providing such assurance may depend on the nature of the resource being accessed, the proxy device involved, and how the client device 2505 operates.

The proxy device 2510 may comprise one or more of a server (e.g., servers 201, 206, 1701, 410), computing device, access gateway 360, gateway server 406, or any other device. The proxy device 2510 may facilitate communications between the client device 2510 and enterprise resources or other networks. For example, a user of the client device 2505 may wish to access enterprise resources that require authentication, and the proxy device 2510 may mediate access. The client device 2505 may use the proxy device 2510 to access resource if, for example, the client device 2505 is not able to directly access the resources. For example, the client device 2505 might not be configured for a protocol utilized by the enterprise resources. In some aspects, the enterprise resource may implement Kerberos with PKINIT for authentication, but the client device 2505 might not implement Kerberos with PKINIT. Similarly, the enterprise resource may implement SSL with client certificate authentication, but the client device 2505 might not implement SSL with client certificate authentication. Instead, the client device 2505 and proxy device 2510 may communicate using a protocol having standard components and fitting well-known authentication frameworks. The proxy device 2510 may translate between a first protocol to the resource (e.g., Kerberos or SSL) and a second, different protocol to the client device 2505 (e.g., HTTP or HTTPS). By utilizing the proxy device 2510, client devices might not need to understand and operate a complex or different protocol used by the enterprise resource. In these examples, the proxy device 2510 may play the client role. However, the proxy device 2510 might not have control of the client certificate private key.

The proxy device 2510 may be used to facilitate access to resources in other circumstances, such as if the client device 2505 is not permitted to directly access the resources, if access capabilities of the client device 2505 are limited, and/or if the proxy device 2510 enhances access by improving performance or offering a preferable interface. The proxy device 2510 may also facilitate enhanced security. For example, Kerberos resource authentication may require obtaining service tickets from Kerberos KDCs (e.g., Active Directory domain controllers). However, the KDCs themselves may comprise sensitive enterprise resources that should not be directly accessible to some client devices. For these cases, Kerberos authentication may require use of a trusted proxy device 2510. As another example, the proxy device 2510 may be a hardened communication gateway deployed in the DMZ network of an enterprise. To provide extra security benefits, the proxy device 2510 may be able to inspect communications being proxied to enterprise resources, rather than allowing a transparent end to end communication flow between the client device 2505 and the enterprise resources as if the proxy device 2510 were not present. That is, the proxy device 2510 may have knowledge of what resources the client device 2505 is using and the protocols the client device 2505 utilizes. As will be discussed in further detail in the examples below, the proxy device 2510 may also provide, to the client device 2505, context information that identifies one or more aspects of the authentication session between the proxy device 2510 and an authentication service 2515 and/or resource 2520. The client device 2505 may use this context information to determine whether or not to sign data provided by the proxy device 2510 that requires a signature.

The proxy device 2510 may include a packet engine 2620, which may be a hardware module and/or software module. The packet engine 2620 may facilitate communications with the client device 2505 and/or the resource. The proxy device 2510 may also include a session cache 2625. As will be described in further in the examples below, the session cache 2625 may store a session key and/or ticket (e.g., for Kerberos sessions) to enable communications between the proxy device 2510 and one or more resources or servers storing the resources. The proxy device 2510 may include a client-side authentication module 2630 configured to manage authentication with the client device 2505, such as obtaining a signature from the client device 2505. For Kerberos authentication, the client-side authentication module 2630 may comprise a PKINIT module (which may be referred to as a likewise daemon) that implements the client side of the public key form of the Kerberos authentication protocol (e.g., a PKINIT protocol). For example, this could be the kinit command line program that is available from open source implementations of Kerberos.

The proxy device 2510 may also include a library module 2635 (e.g., a PKOperation Proxy SDK 2635) used by the client-side authentication module 2635 to abstract details for accessing the client certificate private key.

The client device 2505 and the proxy device 2510 may communicate using a standard framework, such as an HTTP framework. In some aspects and as will be described in the examples below, the client device 2505 and proxy device 2510 may exchange one or more authentication messages. They may exchange HTTP status codes, such as HTTP 401 codes for requesting authentication, and/or challenge-response messages. In some embodiments, if the client device 2505 which receives a 401 authentication challenge does not support secured exchange of client private certificates, the client device 2505 may recognize the 401 message as an authentication challenge that the client device 2505 does not understand. The client device 2505 may react with the appropriate error handling behavior, such as displaying a message to the user that an operation could not be completed because the client device 2505 does not support secured exchange of client private certificates. The HTTP level encoding to support public key operation remoting may be relatively simple. The Packet Engine 2620 and the MAMP Framework 2605 may process the HTTP level encoding. Communications may be structure similar to the HTTP Negotiate authentication scheme described in RFC 4559, which is incorporated herein by reference in its entirety. Base64 encoded blobs may be exchanged back and forth between the client device and proxy device using WWW-Authenticate and/or Authorization headers. The blobs may be generated and processed at each device by the respective PKOperation SDKs (810, 2635).

In some embodiments, components in the communication path between the client device 2505 and the proxy device 2510 that are HTTP aware might not interface with the authentication process. For example, an HTTP proxy server between the client device 2505 and the proxy device 2510 may be aware that the connection to the proxy device 2510 should not be reused to send requests from other client devices and/or users. Furthermore, caching of any HTTP data returned from the proxy device 2510 should be correctly scoped so that the data is not sent to another client device.

In some aspects, authentication between the client device 2505 and proxy device 2510 may utilize a standard authentication framework, such as web authentication or Generic Security Services Application Program Interface (GSSAPI) with a custom mechanism. Objects may be transmitted from the proxy device 2510 to the client device 2505. The client device 2505 may process the objects and validate them by standard cryptographic mechanisms, such as certificate path validation with a name check.

A specialized communication channel between the client device 2505 and proxy device 2510 may be created. For example, the specialized communication channel may be used to relay certificate operation requests and results. Utilizing the specialized communication channel may provide extra cryptographic protection beyond that provided by a standard SSL channel between the client device 2505 and the proxy device 2510. This may be appropriate given the sensitivity of the inputs and outputs of the cryptographic operations being remoted. In some examples, a Diffie-Hellman key exchange (or other exchange) between the client device 2505 and the proxy device 2510 may occur. The exchange may provide mutual authentication between client device 2505 and proxy device 2510. In some embodiments, mutual authentication may already have been established prior to a resource access request by the client device 2505. Channel binding, as described in RFC5929, which is hereby incorporated by reference in its entirety, may be used to cryptographically link the specialized communication channel to an outer SSL session. With brief reference to FIG. 26, setting up the specialized communication channel for data, such as PK operation payloads, may utilize multiple exchanges between the client device 2505 and the Packet Engine 2620. This may be opaque to everything except the PKOperation SDK 2610 and PKOperation Proxy SDK 2635.

One reason for providing extra protection via the specialized communication channel is that SSL, in practice, may be terminated by a networking device, such as an offload device, in front of the proxy device 2510. Offload devices may be optimized for SSL connection processing, such as by using specialized hardware for accelerating CPU intensive operations involved in SSL connections. The hardware module may also be certified to meet commercially important cryptographic processing standards, such as the Federal Information Processing Standard (e.g., FIPS-140). Another reason for providing extra protection is that an inspection device may be given access to the SSL certificate key in order to decode communications. The inspection device may comprise a security device designed to monitor network traffic for compliance with security policies, such as by detecting attempts to send confidential information outside of a trusted network zone, or attempts to communicate with untrusted or unauthorized servers. Some of these inspection devices may be configured to impersonate other servers during SSL connection handshakes, in order to prevent the inspection process from being foiled by the use of encrypted communication channels. Using the specialized communication channel may prevent unnecessary and/or inappropriate exposure of sensitive data to the offload device and/or inspection device. Accordingly, non-repudiation properties expected from using smart card equivalent client certificates may be protected. For example, the specialized communication channel may prevent the data to be signed from being modified by external devices and/or leaks of decrypted data.

The specialized communication channel may be implemented in many ways. For example and as previously noted, a custom GSSAPI mechanism operating inside a standard HTTP authentication protocol may be utilized. This implementation provides several non-exclusive benefits. First, the proxy device 2510 may indicates to the client device 2505 in a standard way (e.g., HTTP) that authentication to a resource and/or authentication server is required to complete the requested resource access. Second, an arbitrary binary protocol may be conducted between the client device 2505 and the proxy device 2510, with multiple rounds if necessary. Third, the implementation allows for secure communication mechanisms to be negotiated and applied to transfer data in a standard way (e.g., at the GSSAPI level). In some implementations, the custom GSSAPI mechanism operating inside a standard HTTP authentication protocol can also allow for a platform implementation of GSSAPI to be used with a custom mechanism being added, such as the MICROSOFT NegoEx mechanism.

Referring to FIG. 25, one or more authentication service 2515 (or server running the authentication service 2515) may exist. Authentication service 2515 may implement one or more types of authentication, including Kerberos or SSL. The aspects described herein may be implemented for any authentication protocol that involves client certificate private key operations. For example, for Kerberos, the authentication server may be tasked with issuing tickets, including ticket granting tickets and/or session tickets. The authentication server may communicate with the proxy device 2510 over one or more channels. Furthermore, the one or more channels may use a communication protocol different from the communication protocol used by the client device 2505 to communicate with the proxy device 2510. In some aspects, the authentication services 2515 might remain unchanged, even with implementation of the aspects described herein. In other words, the authentication services 2515 may exist in a traditional infrastructure. The authentication services 2515 may include, for example, the authentication services 558 noted above.

One or more resources 2520 (or servers storing the resources 2520) may exist. The resource 2520 may communicate with the proxy device 2510 using one or more of the same or different protocols as the authentication server uses to communicate with the proxy device 2510. In some aspects, the resources might remain unchanged, even with implementation of the aspects described herein. In other words, the resources may exist in a traditional infrastructure. Non-limiting examples of resources may include, but are not limited to, file resources, web resources, mail resources, Sharepoint resources, and the like. These resources may include Structure Query Language (SQL) databases, remote procedure call (RPC) servers, Distributed Component Object Module (DCOM) servers, Simple Object Access Protocol (SOAP) web services, Representational State Transfer (REST) web services, and other proprietary resources that may use GSSAPI or a similar security framework for authentication. One or more of these resources may be directly accessed by internal devices, such as computers on the same network as the resources or in another protected network. The resources may comprise the enterprise resources 304, 308, 408, 409 or the like. Furthermore, the resources may be stored on one or more servers. The resources may be accessed through a multi-tier system. The proxy device 2510 may communicate with a front-end server that may in turn communicate (and authenticate as a requesting user) with a back-end server.

The above described implementation is merely one possible system architecture that may be used. Modifications may necessarily be made based on an organization's particular implementation. For example, a system as shown in FIG. 4 may alternatively be used, where authentication is part of the "logon" process. In such a system, a managed app, when launched by a user, consults policy file(s), and may determine that a network logon is required for that app to fully function. The managed app may request (e.g., through the client agent) to perform network login. If there is no logon session, the client agent may initiate the logon sequest where the user is challenged for credentials. The credentials may be passed securely to the authenticating server and, if approved, the server issues the logon token(s) which are then returned to the client agent. The client agent indicates logon success to the managed app, and therefore the managed app is able to continue.

In another example, the managed app may perform SSO for a network resource. The managed app may initiate network conversation with an enterprise network resource/server through a secure tunnel to the gateway which then forwards the network request to the enterprise server. Because the network resource requires authentication before granting access to the resource, the network resource may generate an authentication challenge (SSL cert challenge or HTTP 401 auth required challenge, etc.).

In some cases, an intermediate gateway may respond transparently to the auth challenge. The gateway monitors for authentication challenges in the traffic that flows through the gateway. When an authentication challenge is recognized to which the gateway can respond, rather than passing the response back to the client, the gateway responds transparently by retrying the request after adding the appropriate authorization header or certificate derived from the gateway's notion of who the user is. For some HTTP auth protocols, this may include multiple challenges and responses, all of which are handled transparently until the final authorization token is derived. In the end, the gateway supplies the appropriate certificate or HTTP auth challenge response and retries the operation. If successful, subsequent network traffic will continue to use the certificate or authorization response header implying the user never sees an authentication challenge.

In some cases, the gateway can generate the responses to the auth challenges independently (e.g. password replay). In other cases, it may need to interact with the client agent to derive the appropriate credential and generate the response (e.g., Kerberos via PKINIT).

In other cases, the network challenge might not be visible because traffic being passed through the gateway has been encrypted, e.g., by SSL. Such challenges will pass back to the client app on the mobile device uninterrupted. Similarly, if the gateway encounters a challenge that it is not prepared to handle, the gateway allows the challenge to flow back to the client application on the mobile device.

In some cases, the managed app framework code may respond to an auth challenge transparently. If the gateway is unable see, intercept, and respond to an auth challenge, then the challenge will flow back to the client application on the mobile device. In this case, the managed application framework code includes its own authentication challenge awareness and that may allow the authentication challenge to respond transparently without involving the application. The process is similar to the transparent gateway process above except that the auth challenge responses originate in the managed application framework that sits between the mobile OS provided network functions and the application specific code that employs these services. When an SSL client certificate challenge is encountered, software in the managed app framework can recognize the callback and supply an appropriate certificate. Similarly, if an HTTP status code 401 (Authentication Required) is encountered, the managed app network framework code may generate the appropriate authentication response and retry the request. If successful, the authorization token or certificate are provided on all subsequent network requests and the end user never sees an authentication challenge.

If the managed app framework encounters a challenge that the framework does not understand or is not prepared to handle, the framework allows the challenge to flow back to the client application and the app will behave accordingly normally. In many cases, this will result in the user being challenged to authenticate him or herself (i.e., no SSO).

In some cases, the managed app may initiate a network conversation with a network resource/server that is reachable without the gateway acting as proxy (e.g., a general network resource not protected by the gateway, or where the mobile device is already directly on the internal corporate network). In this case only the managed app framework might have an opportunity to see and respond to the authentication challenges from the server, and the flow is similar as above.

For all of the above, application policy may serve to permit or limit such responses, or the location that intercepts a challenge, or the location from which a response is sent. Policies may also define available certificates, etc.

When a second managed app subsequently requests authentication, the first authentication may be used to bypass a second logon. For example, when he second managed app is launched, the second manages app may consult policies and determine that network logon is required for this app. The second managed app signals the client agent to perform logon. However, because there is already a valid logon session being maintained by the client agent (based on the first managed app), the client agent may signal logon success to the second managed app, allowing the second managed app to continue as an authorized app without interrupting the user.

Similarly, regarding network resource single-sign-on (SSO) for second managed app, the second managed app will have access to the same network level SSO facilities as the first managed app described above. However, the policies of the second managed app may be configured differently from the first managed app with respect to allowing or blocking various forms of SSO. It may also have access to different certificates.

Thus, as indicated above, and using any or all of the above described system architecture, one or more policy files may define the circumstances under which one or more applications operating under the control of or in accordance with those policy files can and cannot use an SSO service to bypass an authentication or security challenge.

Figure 30:
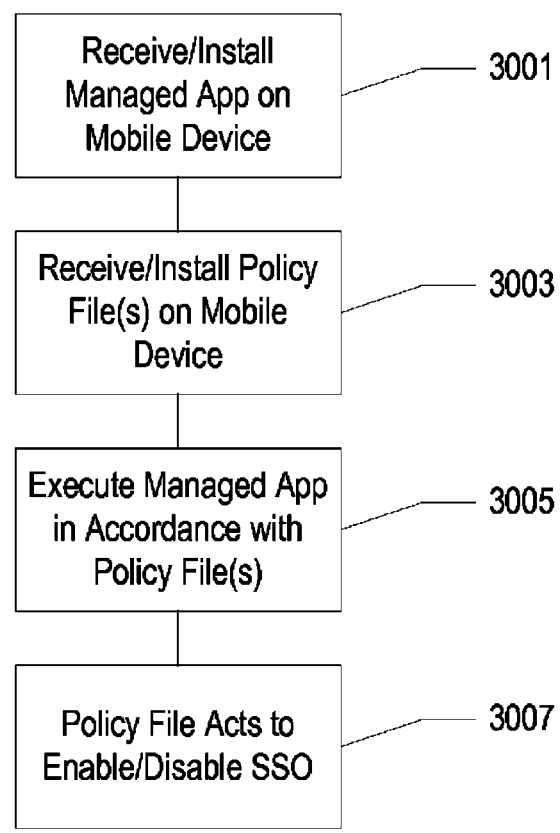
FIG. 30 depicts an illustrative method for performing policy based app management according to illustrative aspects described herein.

FIG. 30 shows an illustrative method for managing single sign on access by a mobile device, as described above. Initially, a managed application may be received and/or installed in step 3001 on a mobile electronic device, as described herein. In step 3003 the device may separately and/or distinctly receive one or more policy files defining one or more operational and/or behavioral limitations of the managed app, e.g., based on one or more features discussed above. While the policy file(s) may be optionally received as separate files, the policy files may be received as part of a same communication or installation process as the managed app.

In step 3005 the mobile device executes the managed app in accordance with the policy files. That is, the mobile device security manager (or equivalent process) restricts operations of the managed app as defined by the one or more policy files. In step 3007, during operation of the managed app and based on one or more of the policy files, the managed app may restrict or enable a single sign-on process, as discussed above. Alternative, the managed app may employ a single sign on credential in accordance with the policy file(s). There are many examples of policy files and single sign on features and processes that may be restricted/enforced.

According to an aspect, one or more policy files may define what type, level, and/or location of SSO is allowed. For example, SSO may be allowed for users at a first level or role (e.g., management), but not at a second level (e.g., supervisors). As another example, SSO may be allowed by a first app (e.g., email), but not by a second app (e.g., a web browser). As yet another example, SSO may be allowed based on basic or digest challenges, but not based on certificate challenges (or vice versa). Still further, complex combinations of requirements may be defined in the policy files. For example, a managed web browser being used by a user signed in as a manager might be allowed able to perform any type of SSO, whereas the managed web browser might only be allowed to use SSO to respond to certificate challenges when in use by a user signed in as a supervisor.

As another example, policy files may define permissible use of SSO based on the resource being accessed, rather than the app doing the accessing. Resources may include documents, emails, files, services, and the like. Policy files may further define where SSO may be permitted to occur, e.g., on the device, at an intermediate gateway, etc. Still further, policy may define the types of permissible SSO challenges, e.g., basic, digest, OAuth, Kerberos, NTML, certificate, PKI, etc. According to another aspect, a policy file may define an SSO policy based on permissible authentication and/or communication protocol. Using any one or more of the above policy-based features, an administrator can define a policy as simple or complex as needed by an organization.

9. Dynamic Device Cloud

Aspects described herein allow a collection of devices owned by individuals or groups to be used in a coordinated, collective way, beyond simple screen sharing. This collective coordination of devices can be done on either a memorized (for your own personal devices), or an ad hoc basis (such as when two people use their devices collectively).

For example, consider online meeting software (e.g., the GOTOMEETING software application by Citrix Systems, Inc.). It exists on laptops, smart phones and tablets. However, each platform does essentially the same thing and the devices do not work in harmony when used by the same user. According to one aspect, a smart phone may take on the role of microphone for a meeting; a tablet may take on the role of displaying video for the meeting, and a laptop may display a screen sharing element of the meeting.

Other examples of cross device coordination include: assigning web links that get clicked on by a laptop to appear on a tablet device, and transferring an already opened PowerPoint presentation from one device to another.

In addition to the ability to assign specific roles to devices while interacting with devices, aspects allow for the persistent assignment of device roles, to allow efficient usage of multiple devices, without extra interaction on the part of the user. For example, online meeting software may involve making the smartphone the microphone, the tablet display video, and the laptop display screen sharing immediately when a meeting starts.

In order to address the above problems, and other problems that will become apparent to the reader, aspects described herein harness and orchestrate devices together to allow complex multi device behaviors that make the internet of things come alive to make a big impact on people's daily lives. One problem solved by aspects described herein is to allow user level customization of behaviors that result when many different devices interact with each other. One problem today is that while many devices can interact with each other, the way they interact with each other is hard wired, and not configurable by the users of the system. The range of behaviors is limited, and often limited to devices from similar vendors, who have already established how devices will interact with each other, based on specific, closed use cases.

Using aspects described herein, a user can configure flexible interactions between different devices to allow orchestration of different devices to work together in harmony. This allows devices which are typically unrelated to work together to trigger different behaviors. For example, if a user has a smartphone, a laptop and a tablet, aspects described herein provide the following illustrative use-case solution:

a. If the user is driving in a car and a meeting starts, then they do not want to have to enter meeting join information—they just want the meeting to call them on the telephone using the PSTN, which allows simple integration with the in car steering wheel phone controls.

b. However, if the user is in the office, then they want to use the device they are currently interacting with.

Aspects described herein give the user the choice to customize these actions according to their preferences, utilizing triggers that are provided by devices. Users can customize these actions either by explicitly specifying them, or they can rely on the system observing user behavior and following their preferences.

One known solution to the above recited problems is to manually carry out the orchestration steps between devices to achieve some of the features the software described herein provides, such as manually connecting to a meeting by dialing the PSTN bridge information while in the car, despite the dangers of doing so.

Other features of the software described herein, such as triggers that invoke when a user is not physically present, cannot be achieved at the moment, and the user lives without such features. Limited known previous attempts at this problem involve solutions such as web mashups, including technologies like OnX and IFTTT. However, these technologies are focused on bringing together different web sites and some features of mobile devices. They are not broader technologies that cover the wider range of devices that are part of "the internet of things". Still other known technologies include standards such as X10, DMX and ZWave. However, these are home automation technologies focused on devices and sensors such as light, motion sensors, and motorized control of items in the home.

One known solution to the multi-device problem is to manually dedicate specific devices to specific roles, through manual manipulation of software on devices. For example, in the context of online meeting software, this can mean making the laptop screen minimize the video part of the meeting, to allow screen sharing to take up the screen, and minoring this to the room display. It also means manually muting all speakers other than that of the smartphone, which is acting as the microphone. It also means making the tablet maximize the video display of the online meeting software. Once after this is done, a single user appears to be connected multiple times in the list of users in a meeting, which provides a sub optimal user experience. For other situations, such as launching an application from one device onto another, there are no existing solutions in place. Thus, existing solutions, to the extent they exist, are laborious, manually driven and error prone.

Figure 27:
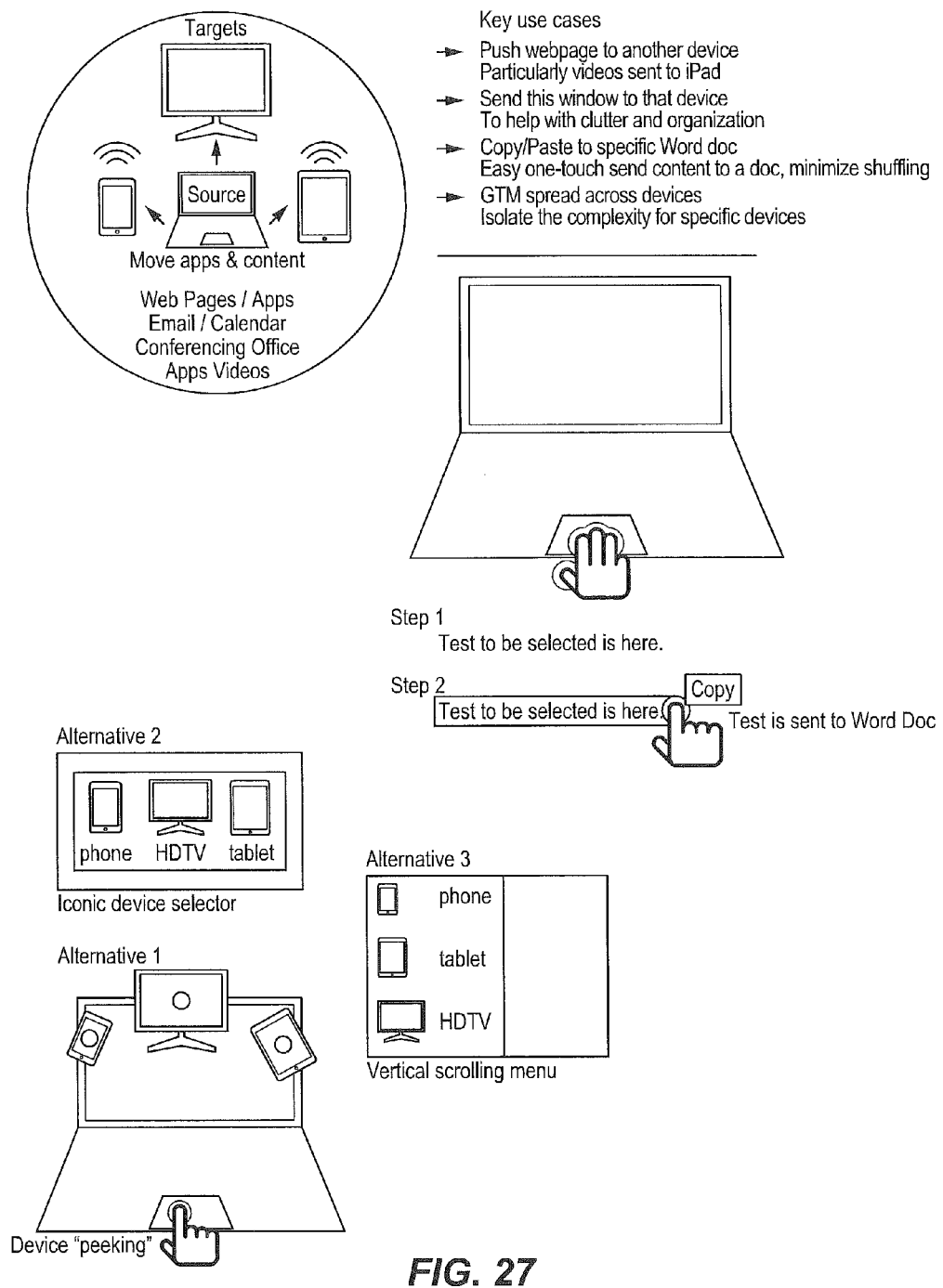
FIG. 27 depicts a process flow according to illustrative aspects described herein.

FIG. 27 shows multi-device use according to illustrative aspects described herein. The system of FIG. 27 outlines the way that items are spread across devices, as well as ways that users may trigger cross device interactions. As shown by way of example in FIG. 27, a user may select content at one computing device to share with another computing device. The user may select the content to share and then select one of the other computing devices connected via the orchestration framework. Upon selection of the selected computing device (the destination computing device), the selected content may be transferred to the selected computing device. As seen in FIG. 27, various approaches may be selectively employed to present or display a set of computing devices available for selection as the device to receive the selected content. In one approach, the computing devices available for selection may "peek" in from the edges of the interface as selectable targets of a drag-and-drop action. In another approach the computing devices available for selection may be presented as a set of selectable icons. In a further approach, the computing devices available for selection may be presented as selectable entries in a list of computing devices. Similar approaches may be employed in order to request that a computing device perform at least a portion of a computing activity initiated at another computing device. Moreover, the set of computing devices presented as available for selection may be dynamically generated or configured based on, e.g., the computing devices associated with the computing device, the computing devices associated with a user of the computing device, the computing devices co-located with the computing device, operation modes of the computing device, operation modes of applications at the computing devices, whether the computing devices are capable of presenting the content or performing the computing activity, based on whether the computing devices are permitted to present the content or perform the computing activity, and additional or alternative criteria that will be appreciated with the benefit of this disclosure.

Figure 28:
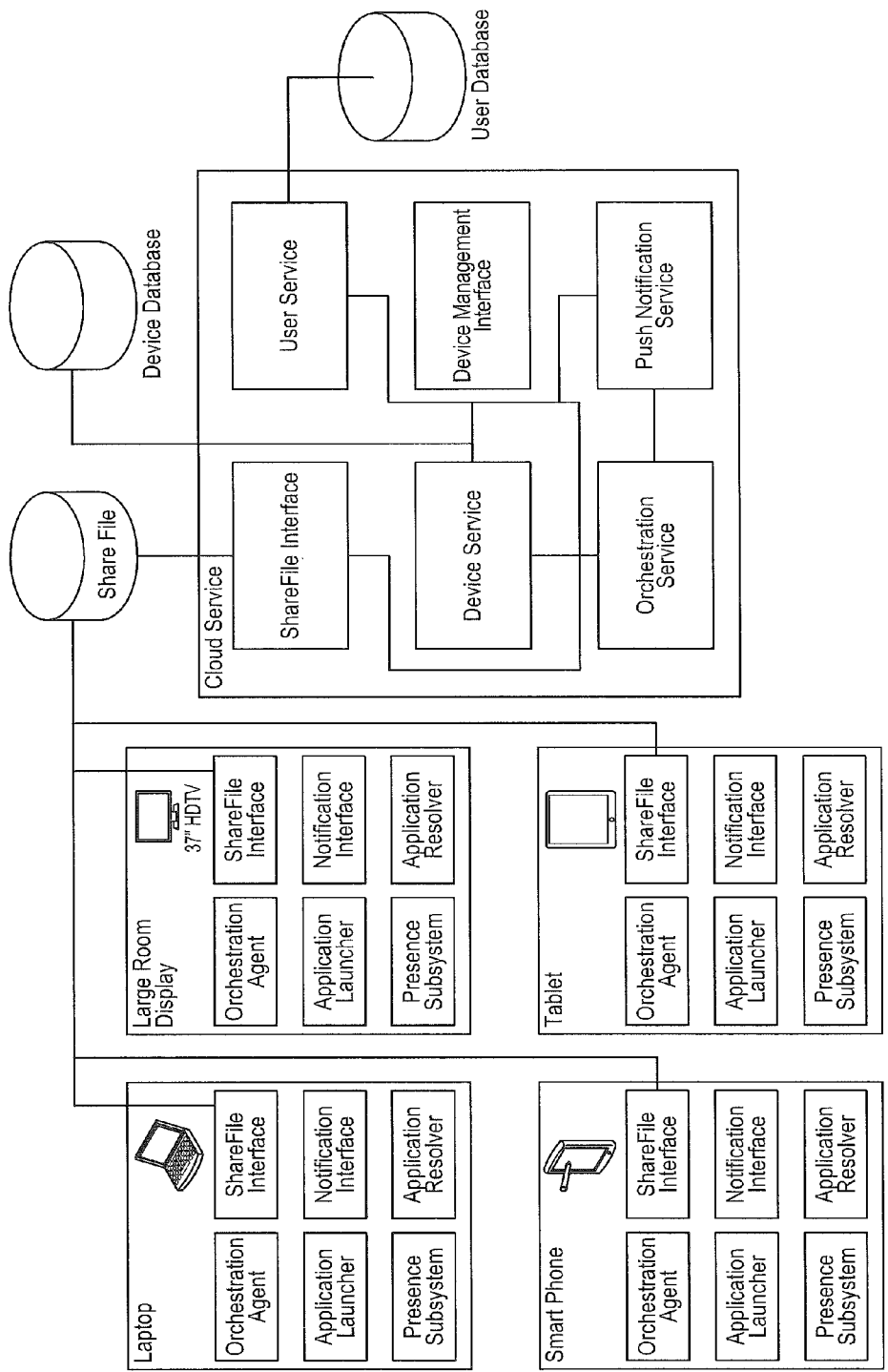
FIG. 28 depicts a system according to illustrative aspects described herein.

FIG. 28 shows a system architecture according to one or more illustrative aspects described herein. The system in FIG. 28 shows a cloud service responsible for the server side facilities, and multi-device (MD) software running on client devices responsible for cross device interaction. The MD software on each different kind of client device may be adapted based on the capabilities of that client device. The system of FIG. 27 may include the following: 1) a cloud service, which provides server and the back end services (this can be implemented, e.g., using ASP.NET MVC running in Windows Azure); and 2) different client devices, each representing a different form factor of device. A laptop, smartphone, tablet and large room display are shown in the diagram, but other devices may also be used.

The cloud server components of the system may include:
a. Cloud file interface. This is responsible for communicating with the underlying data cloud storage provider. In one example, CITRIX SHAREFILE may be used. Other services may be used (e.g., DropBox, Box, etc.)
b. Cloud file service. Cloud-based file storage service, which acts as an external data provider.
c. Device Service. This is responsible for maintaining knowledge of all the devices that a user has, and the capabilities of each device, such as what kind of device it is, what applications it is capable of running, and what kind of peripherals (such as cameras), that it has available.
d. Device Database. This database maintains the information used by the Device Service.
e. User Service. This is responsible for maintaining knowledge of all the users available in the system. It is also used for identity management.
f. User Database. This is the database maintaining the information in the User Service.
g. Device Management Interface. This is an interface that allows users of the system to define what specific roles or actions occur on what specific devices. It allows the user to customize how their devices behave for specific situations, such as online meeting software, or what device will display web content. It defers the work of actually sequencing what goes to what device to the Orchestration Service.
h. Push Notification Service. This is responsible for leveraging push notification frameworks that are used by iOS, Android, Windows, and other services to notify devices that they need to take action.
i. Orchestration Service. This is responsible for coordinating the different actions related to making devices display certain content. It is a central point within the system and issues instructions to all the other components Client components of the system may be the same, regardless of the kind of device. However, implementation details may vary according to the underlying platform. Client components may include:
a. Cloud file Interface. This is responsible for communicating with the underlying data cloud storage provider.
b. Application Resolver. This is responsible for determining how to act upon a request to engage in a cross device request. For example, if the user wants to make use of a tablet as an online meeting application video renderer, then the resolver determines that the request involves launching the online meeting software in video output mode only.
c. Notification Interface. Handles notifications that are received from the server to engage in cross device behavior.
d. Application Launcher. Launches an appropriate application on the device, after any data that needs to be brought to a device is on the device.
e. Presence Subsystem. Ensures that the cloud service is aware that a device is online and available. It may also transfer location information or NFC related information, which may be used by the server to determine if devices are co-located.
f. Orchestration Agent. This is responsible for orchestrating work items related to a cross device activity so that a user can accomplish their goals with minimal intervention. For example, if a power point presentation is being transferred to this device from another device, the orchestration agent ensures that the presentation is available on the device, and downloads it to the device if needed. The orchestration agent then makes use of the application resolver to determine the appropriate way to launch the application, and then using the application launcher to launch the application.

As an illustrative example of how these components work together to address the above problems, the following describes the flow of execution during a use-case scenario where a user wants to launch a multi device online meeting application, and then display web links on another device to that which the link was clicked upon.

Initially, prior to the meeting, the user has MD software client running on his/her laptop. The presence subsystem of the client on the laptop communicates to the device service of the cloud service, to indicate that the device is available. The presence subsystem of the client on the user's smart phone and tablet indicate that the devices are available. At the time of the meeting, the Orchestration Service decides that it is time to start a meeting. The Orchestration Service consults with the Device Service to determine what devices are available for the user. The Device Service makes use of the Device Database to determine what devices a user has and what their status is. The Orchestration Service uses the Push Notification Service to send messages to the active devices that the user has registered with the MD software. The Notification Interface on the clients receive the notification that a meeting is to be launched and passes this onto the Orchestration Agent, which ensures that the user is asked if they want to join the meeting. The Orchestration Agent uses the Application Resolver to determine what application and what parameters are needed to launch the meeting with the given role. This information may be different for each device. For example, the laptop may be given information indicating that just screen sharing is to be used, whereas the tablet may be given information indicating that just the video is to be used. The Orchestration Agent uses the Application Launcher to start the online meeting software with the appropriate information. This sequence may occur for each of the user's active devices.

At the end of the meeting, the user then decides to make use of his/her tablet to display web content for links that are clicked on the laptop. The user clicks on a link in a web browser. The web link used is intercepted by the MD software. The MD software sends the link to the Orchestration Service at the cloud service. The Orchestration Service uses the Device Service to determine if the tablet is available. The Orchestration Service sends a request to the Push Notification Service to send a push notification to the tablet device. The Notification Interface on the client receives the request from the cloud service and passes it onto the Orchestration Agent. The Orchestration Agent uses the Application Resolver to determine which application and what parameters are needed to launch the particular web link. In this example, the information passed back is that the internal web browser needs to be used, and the information to pass to the browser. The Orchestration Agent uses the Application Launcher to launch the web browser with the information passed from the other machine.

Using aspect described herein, the MD software overcomes the difficulties involved in effectively using multiple devices together in a complementary fashion. Without the MD software, multiple devices are not able to work together in harmony, in a complementary fashion. Each device can display applications and content, but there is no coherence or ability to orchestrate across multiple devices.

Using the MD software, for example, provides a user/enterprise the ability to associate a person's devices with their identity in a collaboration system. Collaboration systems such as CITRIX GOTOMEETING do not currently have any particular association for a user's devices, and consequently cannot take advantage of pre-assigned roles for different devices. The MD software also provides for associating devices with a space or group of people. Examples include conference room devices such as smart displays and speakerphones being associated with a space. These assets can then be shared by a group occupying that space (temporary assignment) or be permanently assigned to a logical group of people. The MD software also provides for the ability to move/assign interactions across devices in the form of applications (native, virtual, web, etc.) with associated content and preferences in such a way that it is seamless to spread work across devices. The MD software also provides the ability to scaffold context/state across devices to afford better user experiences. For example, upon launch of a collaboration, the automatic launch of a meeting onto all a user's devices, with each device launching into its specific role. The MD software also provides the context of one device (such as Using the MD software, for example, provides a user/enterprise the ability to associate a person's devices with their identity in a collaboration system. Collaboration systems also do not currently have any particular association for a user's devices, and consequently cannot take advantage of pre-assigned roles for different devices. The MD software also provides for associating devices with a space or group of people. Examples include conference room devices such as smart displays and speakerphones being associated with a space. These assets can then be shared by a group occupying that space (temporary assignment) or be permanently assigned to a logical group of people. The MD software also provides for the ability to move/assign interactions across devices in the form of applications (native, virtual, web, etc.) with associated content and preferences in such a way that it is seamless to spread work across devices. The MD software also provides the ability to scaffold context/state across devices to afford better user experiences. For example, upon launch of a collaboration, the automatic launch of a meeting onto all a user's devices, with each device launching into its specific role. The MD software also provides the context of one device (such as location of the phone) to be used as information for another device (such as a tablet). The MD Software also provides the ability to use device assignment/movement to afford device specific roles in a collaboration system. Examples include a smartphone acting as a speakerphone, a tablet acting as an avatar, or any device acting as a camera. The MD software also provides targeted paste, e.g., allowing an application to be a paste target on one of the devices, subsequent copies on any of the associated devices get pasted automatically into the paste target. This cuts the typical copy and paste operation overhead in half. The MD software provides methods and systems to make a natural user interaction (voice, touch, gesture, keyboard, etc.) action on one device that allows all devices to respond. An example is to bring the focus of an app (such as email) to the front on any of the devices.

Use the aspects described herein simplify the use of multiple devices by reducing manual configuration and coordination. Other aspects provide the ability to share world knowledge/state between devices to enhance the user experience. This reduces redundant entry of information. Some aspects provide the ability to quickly spread activities across devices by reducing the friction caused by applications, data, and context being locked into devices. Other aspects reduce copy/paste efforts in half. Some aspects provide cross device Natural User Interaction (NUI) that allows less capable devices to participate in natural interaction. Other aspects provide the ability to quickly bring an app to the front on any device, no matter what devices the app was on previously. This allows faster movement between applications, e.g., "show email on my tablet".

According to another aspect, additional applications may benefit from use of MD software, e.g., client agent software in virtualization environments. The MD software may enable migrating client agent applications from one device to another device. This may be performed using push driven Smooth Roaming. Other aspects of MD software may provide for the ability to share the state of web browser sessions across devices. Still other aspects of MD software may provide ad hoc device discovery using technologies such as NFC and using the Orchestration Service and Orchestration Agent to assign roles for the devices.

Figure 29A:
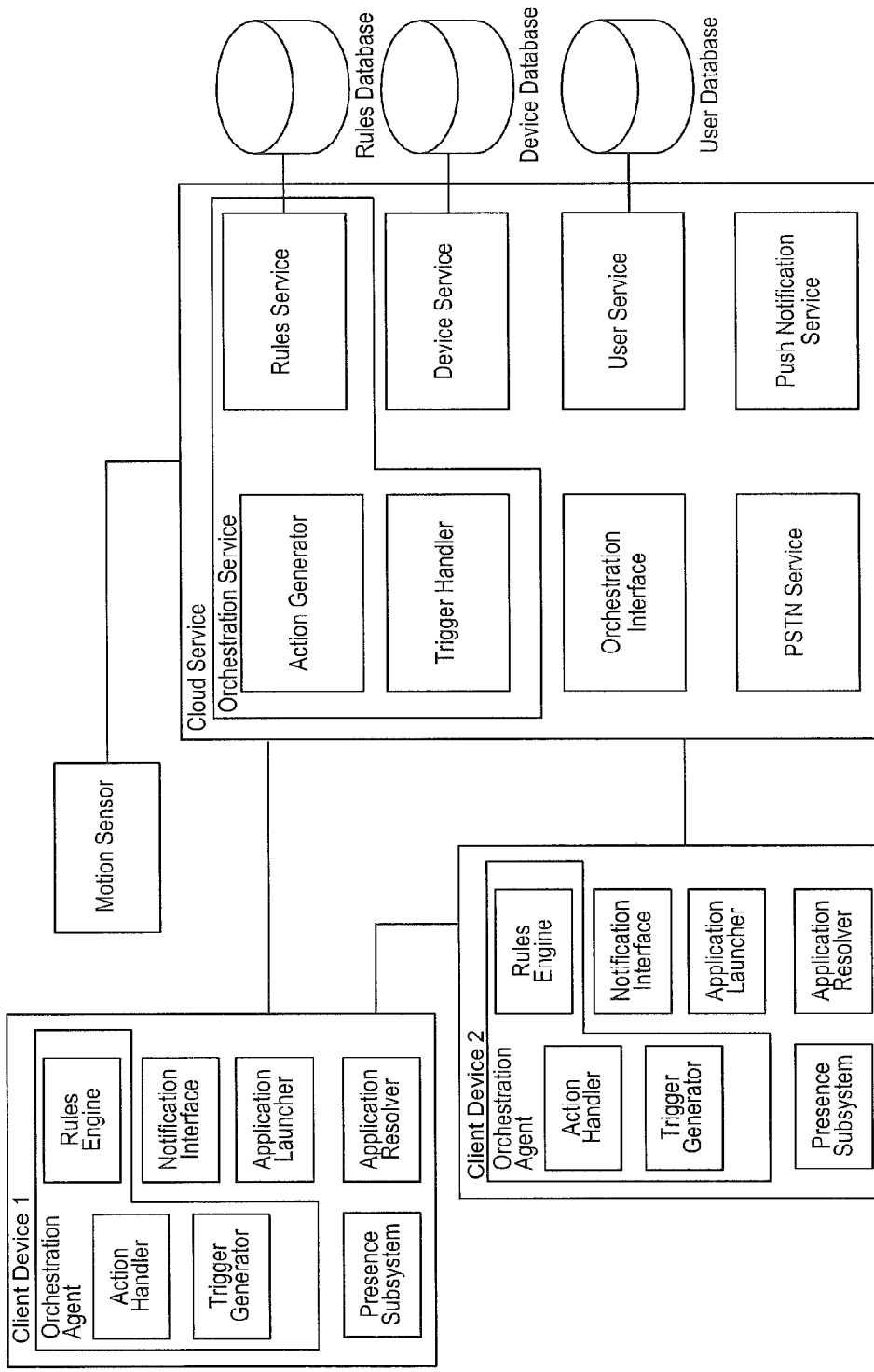
FIGS. 29A and 29B depict systems according to illustrative aspects described herein.

FIG. 29A illustrates a system architecture according to one or more illustrative aspects. FIG. 29A outlines a general structure that may be used. It shows a cloud service responsible for server side facilities and new, dynamic software running on client devices.

The system architecture may include at least three discrete subsystems: 1) a cloud service, which provides the back end services (This may be implemented using ASP.NET MVC running in Windows Azure, as one example); 2) client devices, which run the software the user interacts with for collaboration, deferred work, applications and other software. This software can be running on platforms such as Windows, iOS, Android, Mac or a Smart TV, among others; and 3) internet enabled sensors, such as motion sensors, light sensors, temperature sensors. Client devices may be connected directly, each executing peer software as described herein, or may be connected through the cloud service (e.g., the cloud service may be optional, where the functionality is built into software on each device).

Cloud service components of the system include:
a. Device Service. maintains knowledge of all the devices that a user has, and the capabilities of each device, such as what kind of device it is, what applications it is capable of running, and what kind of peripherals (such as cameras), that it has available.
b. Device Database. maintains the information used by the Device Service.
c. User Service. maintains knowledge of all the users available in the system. It is needed for identity management.
d. User Database. maintains all the information in the User Service.
e. PSTN Interface. interface that proactively contacts users via the public switched telephone network (PSTN).

f. Push Notification Service. leverages push notification frameworks that are used by iOS, Android and Windows (among others) to notify devices that they need to take action.

g. Orchestration Service. coordinates different actions based on different events, or triggers that happen. The Orchestration Service may include the following components:

1. Trigger Handler. receives input from different external sources, such as sensors and clients about when specific events occur that can act as a trigger for different actions to occur.
   2. Rules Service. determines what actions to carry out when a particular event, or trigger, occurs. The Rules Service is the core of the system that determines what to do when something occurs.
   3. Action Generator. translates the sequence of actions that need to occur based on what the resultant actions generated from the Rules Service are for a given trigger.

h. Rules Database. Maintains information used by the Orchestration Service and Rules Service which determines how the software behaves based on different triggers.

i. Orchestration Interface. Provides an interface for users of the system to customize the behavior of the system for different devices, events and triggers. It is through this interface that the users customize the system.

The client components of the system may be the same, regardless of the kind of device. However, the implementation details may vary according to the underlying platform. Client components may include:

a. Application Resolver. This is responsible for determining how to act upon a request that involves launching an application. For example, if the user wants to launch Google maps on their tablet when they enter a car, the Application Resolver determines how to launch Google Maps—be it a web application, native application, or client agent published application.

b. Notification Interface. Handles notifications that are received from the server based on information from the server side.

c. Application Launcher. Launches an appropriate application on the device.

d. Presence Subsystem. Ensures that the cloud service is aware that a device is online and available.

e. Orchestration Agent. Orchestrates the work items related to making deferred and distributed work possible. This includes tasks such as starting meetings in response to events from the server, triggering authentication and general coordination of the client. The Orchestration Agent may include the following components:

1. Trigger Handler. Receives input from different external sources, such as sensors and clients about when specific events occur that can act as a trigger for different actions to occur.
   2. Rules Engine. Determines what actions to carry out when a particular event, or trigger, occurs. The Rules Service is the core of the system that determines what to do when something occurs.
   3. Action Generator. Translates the sequence of actions that need to occur based on what the resultant actions generated from the Rules Engine are for a given trigger.

To illustrate how these components work together to address the problems the software addresses, the following example use-case scenario shows how a user would set rules to ensure that if they are driving in a car when a meeting starts, that the system should call the user on the PSTN to let them join the meeting.

Initially, the user points their web browser to the Orchestration Interface. The user enters a rule with the following definition:

a. A trigger set to "If a meeting starts".
   b. Contextual conditions set to "The motion sensor or GPS in my smart phone indicates that I am moving at a speed greater than 5 km/h".
   c. An action set to "Call a specified telephone number and patch me into the meeting automatically."

The rule entered into the Orchestration Interface is sent to the Rules Service, which writes the information to the Rules Database. At this point, the rules are all set up on the server. The Rules Service instructs the Device Service to send each device a message with the new rules. The Presence Subsystem on the client device communicates with the Device Service to indicate that the device is present. The client receives a response back indicating that it needs to update its rules. The Rules Engine on the client requests the latest set of rules that apply to the device from the Rules Service. The Rules Service provides the information back to the client, which stores the information in its internal Rules Engine configuration. Now that the client knows about the rules specified by the user, it can send information about the state of this rule to the server. So, in this case:

a. The Trigger Generator on the client receives a message each time the Presence Subsystem intends to notify the server about its status.
   b. The Rules Engine on the client determines that information about the device's motion/speed needs to be sent back to the server.
   c. The Rules Engine uses the Action Handler on the client to append information to the data sent back to the server by the Presence Subsystem.

The Device Service on the server side receives the message about the device's presence, and the rule information from the client, which it passes on to the Trigger Handler, which passes it onto the Rules Service. The Rules Service updates its information about the state of the device, relative to the rule relating to meeting starting and motion sensor speed. When a meeting is due to start, the Trigger Handler receives a message from an external service monitoring the user's calendar. The Trigger Handler passes the message about the start of the meeting to the Rules Service. The Rules Service consults the rules database and determines that there is a rule triggered by the start of a meeting. The Rules Service consults the rules database for further information about how the contextual condition for the rule relates to the state of the client device. The status received last from the client indicates that the device is moving and the contextual condition for the rule evaluates to true, namely, carry out the action of the rule.

The Rules Service passes on the result of the rule evaluation to the Action Generator. In this case, it passes on an action of calling the user on a specified telephone number. The Action Generator creates the sequence of instructions needed to call the telephone. The Action Generator issues a request to the PSTN Service to make a telephone call to the specified telephone number. The PSTN Service calls the requested telephone number, and connects to the user's telephone. The Action Generator issues a request to the PSTN Service to dial the appropriate instructions to patch the user into the meeting they are due to attend. At this point, the user is connected into the meeting while they are driving, without having to take their eyes off the road, or enter complex sequences into their smart phone.

The software and systems described herein overcome the difficulties that arise when users have several devices that can work together to automate tasks, yet are not configured out of the box to allow such orchestration, or do not allow flexibility of orchestration. Aspects described herein thus provide the ability to define inferred contextual (temporal, geospatial, situational) and explicit (from all forms of natural interaction across devices) triggers from a variety of devices. Aspects also provide the ability to define actions for devices to perform based upon triggers determined from device context, and for the definition of rules that can be fired based on an inference engine to enable complex automation behaviors across devices. Aspects also provide a question and answer interface to refine desired behaviors, as well as the ability to learn how device behavior triggers based on learning or observing user behavior across devices, instead of only relying on users explicitly scripting the behavior. For example, learning what a user does when they respond to something like a meeting notification, and replicating this behavior the next time, such as automatically muting their microphone, or setting it to a particular volume. Aspects also provide the ability to learn device behavior based upon a question and answer or if/then/else style interface.

While there are existing rules engines and automation frameworks available, they are typically related to one particular application or device. The dynamic device cloud described herein spans across multiple devices and applications that a user has. This provides several advantages, including providing the ability to provide future proof behaviors of devices working together collectively, even if they are not explicitly designed to cooperate with each other. Aspects described herein also provide the ability to define simple triggers, actions, and behavior rules to give a level of flexibility not available out of the box in other solutions. Aspects also provide the ability to learn system behaviors based upon question and answer style interfaces, and/or by observing how a user uses the system can make customization accessible to users without any programming background.

Other aspects described herein provide the ability for users to customize orchestration by providing a learning facility, a question and answer style interface and a traditional scripting approach. The orchestration software may adapt to how users interact with the system, and adjust rules based on user behavior. Thus, the system may learn new interactions and rules, based upon the observed behavior of a user of the system.

As noted above, the cloud service may be utilized for sharing various types of content at a computing device, e.g., for cross-device file sharing, URL sharing, and copy-and-paste functionality. The back-end cloud service advantageously allows cross-device sharing across different operating environments using only a multi-device client installed at the various devices. The content shared across devices may be anything residing at a device including, e.g., document files, image files, audio files, video files, archive files, software applications, URLs, text-based content, presentation meetings, and the like. Moreover, users may share content with devices they are associated with (e.g., a personal mobile telephone, a personal laptop computer, a personal tablet computer, etc.) and may share content with devices associated with other individuals.

In some example implementations, a user may select the particular device selected content it is shared with. In other example implementations, the cloud service may automatically determine which device to share the content with. The cloud service may make the determination based on, e.g., the type of content shared, the devices presently connected to the cloud service, and so forth. This context-based decision-making of the cloud service advantageously provides a seamless and unobtrusive workflow for the users. Allowing users to select which devices content is shared with, however, advantageously gives the users more control over the destination of their shared content. It will thus be appreciated that the cloud service may be selectively configured to share content between devices according to the selections of the users, according to the present context, according to file sharing rule sets, or a combination of such.

Figure 29B:
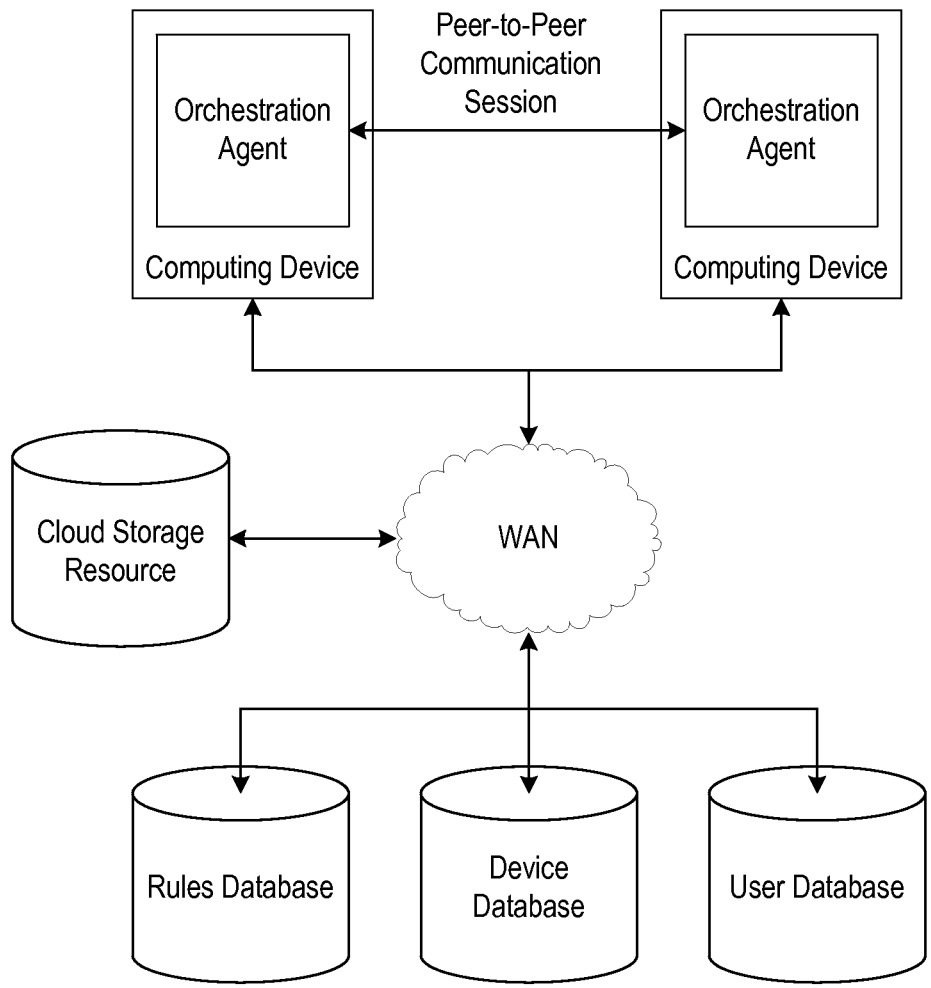

As noted above, the orchestration framework may also interconnect computing devices to operate as a coordinated whole via a peer-to-peer communication session. FIG. 29B illustrates an example implementation in which the orchestration agents are interconnected via a peer-to-peer communication session. The orchestration agents may still allow the computing devices to access, e.g., a cloud storage resource, a rules database, a device database, and a user database as described above. It will be appreciated that aspects of the orchestration framework are applicable in the peer-to-peer context as well as the client-server context.

A word processing application (e.g., Microsoft Word) is one example of an application where the orchestration framework may distribute operation of the application across multiple interconnected devices. In this example, a desktop computing device may initiate the word processing application and request that a television display device present the output from the application, e.g., a document being edited. The orchestration framework may distribute the application across other interconnected computing devices such that input for the word processing application may be received from the other computing devices interconnected with the desktop application. For example, a user at a laptop device may provide input at the laptop keyboard in order to edit the document, and another user at a tablet device may provide input at the touchscreen keyboard in order to edit the document. In this way, a user may share a document with other devices while accessing the document at a first device.

In another example, interconnected devices may coordinate with each other if one of the devices does not have the hardware or software needed to carry out a computing activity. Online meetings are provided in this disclosure as one example in which computing devices may be interconnected via an orchestration framework that coordinates operation of a computing activity across the computing devices. In one particular example, a user may only have access to a cellular telephone and a television display device when joining the meeting. In this example, the television display device may not have an audio input device, and the cellular telephone may not have an adequate video output device. Accordingly, the orchestration framework may coordinate the operation of the cellular telephone and the television display device to enable the user to join the online meeting. Respective orchestration agents at the cellular telephone device and the television display device may connect the devices via the orchestration framework as shown by way of example in FIG. 29B. During the online meeting, the orchestration framework may thus cause video of the online meeting to be presented at the television display device and cause audio from the user to be received for the online meeting from the microphone of the cellular telephone device. Additional and alternative examples will be appreciated.

Figure 31:
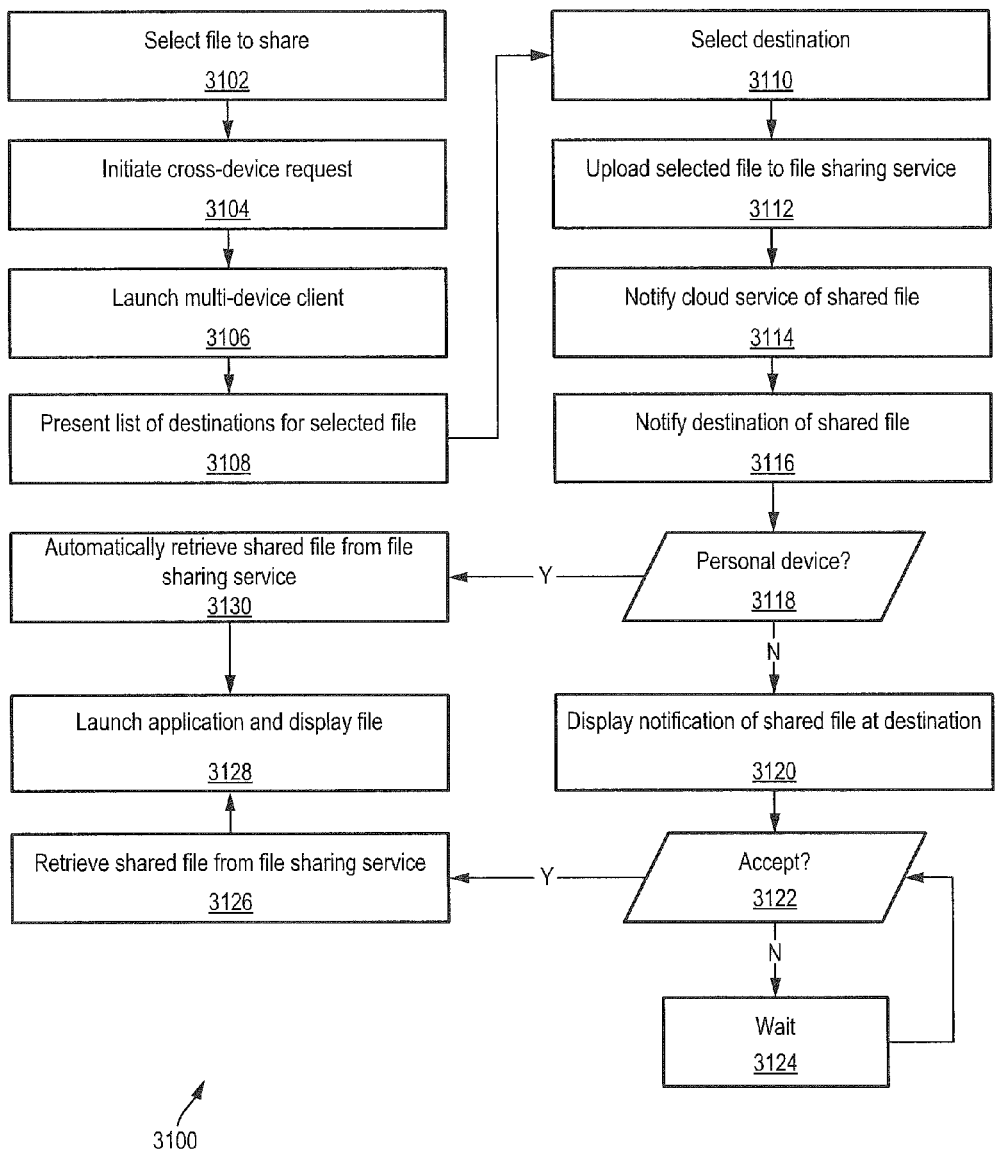
FIG. 31 depicts a process flow according to illustrative aspects described herein.

FIG. 31 is a flowchart 3100 of example method steps for cross-device file sharing. A user may operate a computing device at which various computer files reside. The user may select one of the files to share with another device (block 3102). With the file selected, the user may initiate a cross-device share request (block 3104). The user may initiate the cross-device share request via, e.g., a keyboard shortcut, menu selection, and the like. Upon initiation of the cross-device share request, the multi-device client may launch or activate at the device (block 3106).

The multi-device client may present a list of destinations the user may transmit the selected file to (block 3108). The list of destinations may include line items corresponding to computing devices associated with the user as well as line items corresponding to individuals. As noted above, the user may select a personal device associated with that user or an individual to transmit the selected file to. As also noted above, the list of line items may include the devices associated with the listed individuals, and the user may select which device associated with an individual to transmit the selected file to. If the user selects an individual rather than a device, the cloud service may automatically determine which device associated with the selected individual to transmit the selected file to. It will be appreciated that the list of individuals may also include the user, and selection of the user may transmit the selected file to a different device associated with the user.

As noted above, the determination of which device to transmit the selected file to may be based on user selection, context, or rule sets. The user may manually select which device or individual to transmit the selected file to. Additionally or alternatively, the cloud service may determine which devices are presently connected to the cloud service, and automatically select one of those devices to receive the selected file. The cloud service may also automatically select a device based on the type of file selected. As an example, the cloud service may select an audio device to receive the selected file when the file is an audio file. As another example, the cloud service may automatically select a large display device to receive the selected file when the file is a video file. The cloud service may also employ one or more rule sets to determine which device should receive the selected file. Users may modify the rule sets according to their preferences, and the rules may consider various characteristics associated with the users (e.g., user role, location, etc.), the devices (e.g., device type, etc.), the selected file, and combinations of such. This rule-based approach to file sharing may advantageously provide greater flexibility in customizing how the cloud service automatically shares files across devices.

Moreover, the list of destinations may be context-sensitive such that the destinations included in the list depend on various factors. In one example implementation, the multi-device client may dynamically filter the list of destinations based on the capabilities of the potential device destinations. In this regard, the multi-device client may be aware of the capabilities of the various devices. The cloud service may maintain capability information corresponding to each device connected to the cloud service and provide this capability information to the multi-device client. In turn, the multi-device client may utilize the capability information when constructing the list of destinations. If a potential device destination is not capable of opening the selected file, then the multi-device client may exclude that device destination from the list of destinations. In this way, the multi-device client may tailor the list of destinations to include only those devices having the capability to open the selected file. The multi-device client may tailor the list of destinations based on additional or alternative criteria. For example, the individuals included in the list of destinations may be the attendees of an ongoing meeting that the user is attending. It will be appreciated that the multi-device client may employ combinations of criteria to construct the list of destinations.

Referring back to FIG. 31, the user may select from the list of destinations a destination to transmit the selected file to (block 3110). Having selected the destination, the multi-device client may upload the selected file to a remote file sharing service that stores the selected file (block 3112). The multi-device client may then notify the cloud service that the selected file is available at the file sharing service (block 3114). The notification to the cloud service may include, for example, the selected destination for the file, the location of the file at the file sharing service (e.g., a URL corresponding to the file), and the like. The cloud service may then notify the destination device that the file is available at the file sharing service (block 3116). The notification to the destination device may likewise include the location of the file at the file sharing service.

The multi-device client at the destination device may respond differently depending on whether the user shared the file with a device associated with that user (e.g., another personal device) or a device associated with another individual. In particular, the multi-device client may present an unobtrusive notification at the mobile device when another user shares a file. In this way, the multi-device client may avoid interrupting users while engaging in other computing activities. As seen in FIG. 31, if the destination device is not a personal device of the user that shared the file (block 3118:N), then the multi-device client at the destination device may display a notification that a new filed has been shared with the destination device (block 3120). Upon receipt of the notification of the shared file, the multi-device client may provide the recipient with the option to accept or reject the shared file. If the recipient does not accept the shared file (block 3122:N), then the multi-device client may wait (block 3124) until the recipient accepts the shared file, e.g., by providing input requesting receipt of the shared file. When the recipient accepts the shared file (block 3122:Y), the multi-device client may retrieve the file from the file sharing service (block 3126). The file sharing service may be located remotely relative to the device the multi-device client resides at, and may be accessible, e.g., via the Internet. Accordingly, the multi-device client may submit a request to the file sharing service using the URL corresponding to the location of the shared file at the file sharing service. The multi-device client may download the file from the file sharing service and launch the appropriate application at the destination device to open the file (block 3128).

In some example implementations, the multi-device client may be configured to automatically respond to a file share. Accordingly, if the destination device is a personal device of the user that shared the file (block 3118:Y), then the multi-device client may automatically retrieve the shared file from the file sharing service (block 3130) upon notification of the shared file. When the multi-device client receives the shared file from the file sharing service, the multi-device client may also automatically launch the appropriate application at the destination device to open the shared file.

It will be appreciated that the example approach described above provides a quick and efficient way to share, e.g., email attachments. Instead of forwarding or creating new emails to share email attachments, users may share email attachments using the cloud service which streamlines the sharing process. The example approach described above also provides a quick and efficient way to share online presentations or meetings with other devices or individuals. Instead of having users launch and log on to join an existing meeting, a user may share the meeting information and details with another individual using the cloud service, and that meeting may automatically launch at a device utilized by the individual. Similarly, the cloud service allows an attendee to transfer an ongoing meeting presented at one device to another device associated with the attendee. As an example, an individual may attended an online meeting using a desktop computing device. If the individual needs to leave the desktop device for any reason, the individual may use the cloud service to transfer the meeting to a mobile device such as a tablet computing device or mobile phone device. In this way, users are not tied to any particular device when attending an online meeting and may advantageously jump between devices while attending the meeting.

Figure 32:
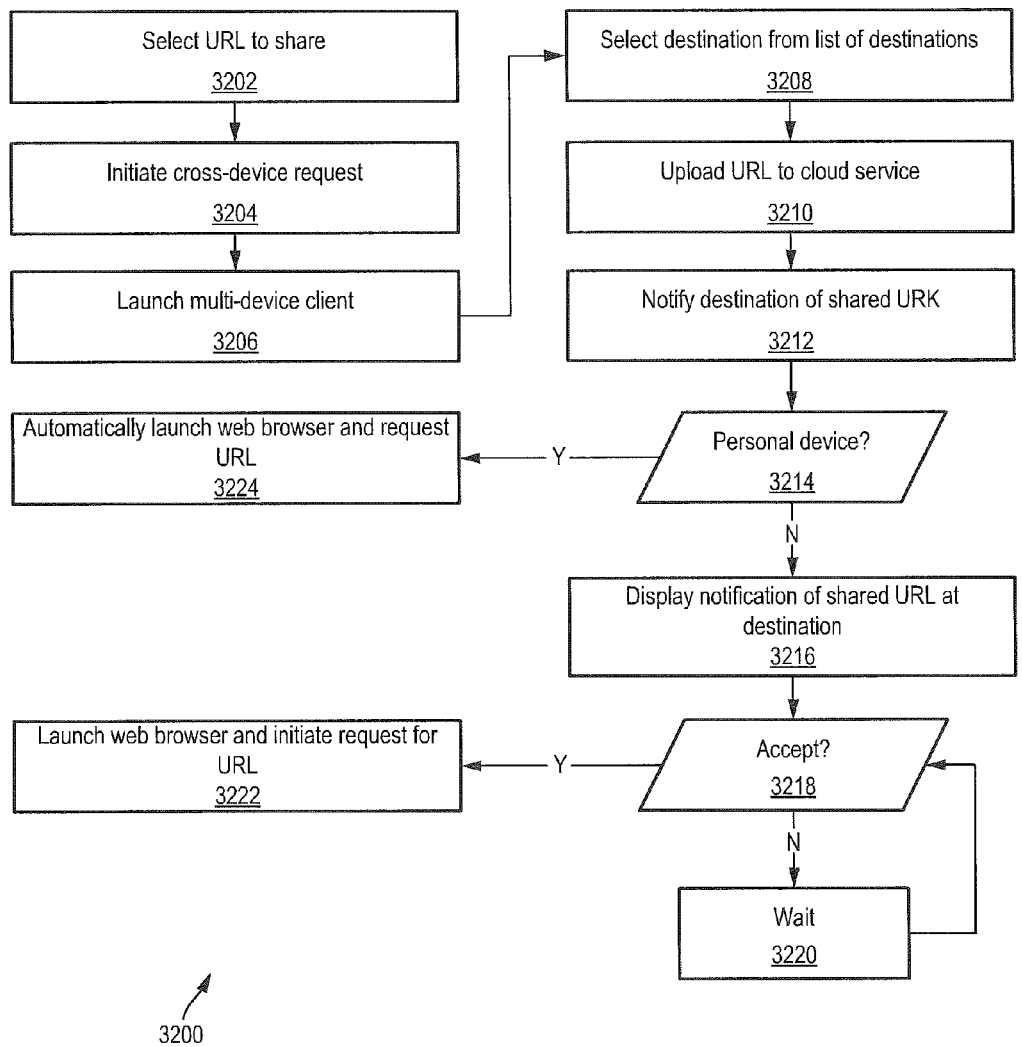
FIG. 32 depicts a process flow according to illustrative aspects described herein.

FIG. 32 is a flowchart 3200 of example method steps for cross-device URL sharing. Similar to selecting a file to share, a user may select a URL to share (block 3202), e.g., by highlighting the URL. The user may then initiate a cross-device request as described above (block 3204) and launch the multi-device client (block 3206). The user may select a destination from a list of destinations (block 3208), e.g., another device or an individual. With the destination selected, the multi-device client may upload the URL to the cloud service (block 3210). The cloud service may similarly notify the destination device of the shared URL (block 3212). The notification may include the shared URL.

As with sharing files, the multi-device client at the destination device may respond differently depending on whether the destination device is associated with the user that shared the URL or another individual. As noted above, if the destination device is not a personal device of the user that shared the URL (block 3214:N), then the multi-device client may display a notification indicating the shared URL (block 3216) so as to avoid any interruptions of other computing activities occurring at the destination device. If the individual does not accept the shared URL (block 3218:N), then the multi-device client may wait (block 3220) until input is received indicating acceptance of the shared URL. When the recipient accepts the shared URL (block 3218:Y), the multi-device client may initiate launching of a web browser at the destination device as well as a request for the shared URL (block 3222). If the user shares the URL another personal device (block 3214:Y), then the multi-device client at the destination device may automatically initiate launching of a web browser and request the shared URL (block 3224).

The cloud service may be configured to share URLs in a context-sensitive manner. In particular, the cloud service may recognize URLs for different types of online resources, e.g., a text-based webpage and a video sharing webpage. Accordingly, the cloud service may automatically select a destination device based on the URL type. As an example, the cloud service may recognize that the URL addresses a video sharing website and, in response, select a large display device to share the URL with. In this way, the cloud service may advantageously share the URL with the device suitable for presenting the content addressed by the URL. As another example, the cloud service may recognize that the URL addresses a text-based website and, in response, select a tablet device or desktop device to share the URL with. The cloud service may also employ rule sets to determine which device to share the URL with. For example, a URL sharing rule set may list various websites and the devices or types of devices the cloud service should select when sharing URLs associated with those websites. Users may configure the rule sets according to their preferences in order to customize the behavior of the cloud sharing service when sharing URLs. The rule sets may be associated with individual users for use when those users share the URL, and additionally or alternatively, the cloud service may maintain a global rule set applicable to all users.

FIG. 33 is a flowchart 3300 of example method steps for cross-device copy-and-paste functionality. Stated generally, a user may select content at one device and copy the content to a clipboard at the cloud service from which other users may paste the content at their own devices. A user may first select the content to share (block 3302), e.g., by highlighting text or otherwise selecting the content. The user may then initiate a cross-device request as described above (block 3304), and the multi-device client may launch or otherwise activate (block 3306). The multi-device client may then upload the content to a global clipboard of the cloud service (block 3308). The global clipboard corresponds to a storage location at the cloud service accessible to at least some of the devices connected to the cloud service.

When a user copies content to the global clipboard, the cloud service notifies one or more of the devices connected to the cloud service that new clipboard content is available (block 3310). Users may utilize the multi-device client to paste the global clipboard content at their respective devices. The multi-device client may transmit a request to the cloud service for the global clipboard content. When the cloud service receives the request (block 3312), the cloud service may download the global clipboard content to the device (block 3314). Having received the global clipboard content from the cloud service, the user may paste the content into an application at the device (block 3316).

As set forth above, a device may not have the capability to open a file shared with that device. For example, the application used to open the shared file may not be installed at the destination device. Nevertheless, the cloud service and multi-device client may be configured handle situations where a destination device does not have the capability to open a shared file. As described in more detail below, the cloud service may automatically launch a virtual environment that has the capability to open the shared file, and the multi-device client may launch a virtualization client to connect to the virtual environment when a destination device is not capable of opening a shared file.

FIG. 34 is a flowchart 3400 of example method steps for launching a shared file at a destination device. The cloud service may receive notification of a shared file (block 3402) as discussed above. The cloud service may then determine whether the destination device is capable of opening the shared file (block 3404). As noted above, the cloud service may store device capability information and may thus be aware of the capabilities of the devices connected to the cloud service. Devices may provide the cloud service with their respective capability information during the negotiation process when connecting to the cloud service. If the destination device is capable of opening the shared file (block 3406:Y), then the device may launch the appropriate application to open the shared file, e.g., automatically or in response to receipt of input accepting the shared file as discussed above.

If the destination device is not capable of opening the shared file (block 3406:N), then the cloud service may initiate creation of a virtual environment (block 3410). The cloud service itself may create and maintain the virtual environment locally or, additionally or alternatively, a virtualization server that is located remotely relative to the cloud service may create and maintain the virtual environment. The virtual environment may be configured with the capability to open the shared file (block 3412). As an example, the virtual environment may be configured to include the application used to open the shared file. The virtual environment may also be provided with the shared file (block 3414). As an example, the cloud service may provide the virtual environment with the location of the shared file at the file sharing service, and a multi-device client at the virtual environment may retrieve the file from the file sharing service. In this regard, the virtual environment may also be considered as a destination for the shared file.

Once the virtual environment retrieves the shared file from the file sharing service, the virtual environment may launch a virtualized application to open the shared file (block 3416). The multi-device client at the destination device may launch a virtualization client (block 3418), and the virtualization client may connect to the virtual environment (block 3420). In this way, users may advantageously share files across devices that may not be equipped to open those files. A more particular example may include a 3D formatted computer file that can only be opened using 3D modeling software. A mobile phone may not be equipped with the necessary software to open the 3D file. Using the cloud service and the virtualization approach described above, a virtual environment may launch a virtualized instance of the 3D modeling software, and the virtualization client at the mobile phone may connect to the virtual environment to access 3D files shared with the mobile phone device. Other practical uses will be appreciated with the benefit of this disclosure.

FIG. 56 shows an illustrative method for managing process transfers and device integration using a mobile device and based on one or more policy files, as described above. Initially, a managed application may be received and/or installed in step 5601 on a mobile electronic device, as described herein. In step 5603 the device may separately and/or distinctly receive one or more policy files defining one or more operational and/or behavioral limitations of the managed app, e.g., based on one or more features discussed above. While the policy file(s) may be optionally received as separate files, the policy files may be received as part of a same communication or installation process as the managed app.

In step 5605 the mobile device executes the managed app in accordance with the policy files. That is, the mobile device security manager (or equivalent process) restricts operations of the managed app as defined by the one or more policy files. In step 5607, during operation of the managed app and based on one or more of the policy files, the managed app may restrict or enable the ability of a device to transfer a process or integrate with one or more other devices and/or resources, as discussed above. Various examples of such policy files and device integration features and processes that may be restricted/enforced are discussed above.

10. Multiple Operation Modes

An improved technique for managing enterprise applications on mobile devices allows users to access enterprise applications from their own mobile devices, where the enterprise applications securely coexist with the users' own personal applications and data. Enterprise mobile applications are specially created or adapted in such a way that they are forced to interact with other applications and services on a mobile device through respective application policies. Each enterprise mobile application running on the mobile device has an associated policy through which it interacts with its environment. The policy selectively blocks or allows activities involving the enterprise application in accordance with rules established by the enterprise. Together, the enterprise applications running on the mobile device form a set of managed applications. The policy associated with each of the managed applications includes a record of each of the other managed applications. Typically, policy settings for interacting with managed applications are different from policy settings for interacting with other applications, i.e., applications which are not part of the managed set, such as a user's personal mobile applications. Managed applications are typically allowed to exchange data with other managed applications, but are blocked from exchanging data with other applications, such as the user's own personal applications. In some examples, application policies of managed applications are configured to allow links and/or icons presented in one managed application to be followed or opened in another application only if the other application is also a managed application.

For example, a managed email application can be configured, through its policy, to allow an attachment to be opened in a managed PDF annotator. But the same managed email application can be configured to prevent the same attachment from being opened in a PDF annotator that is not part of the managed set.

By constraining managed applications to interact on a mobile device through enterprise-administered policies, the managed set of applications can thus be made to operate with other applications in the managed set of applications, but can be prevented from operating with applications that are not part of the managed set. Leakage of enterprise information out of the managed set of applications can thus be prevented, as can be receipt of personal information into the managed set of applications. Certain embodiments are directed to a method of managing applications of an enterprise on a mobile device. The method includes installing a set of managed applications of the enterprise on the mobile device, wherein other applications are installed on the mobile device that are not part of the set of managed applications. The method further includes receiving a set of application policies, wherein each of the set of managed applications is associated with a respective policy of the set of application policies. The method still further includes selectively allowing a first application of the set of managed applications to provide data to a second application installed on the mobile device, responsive to accessing a policy of the first application and reading an indication from the policy of the first application that the second application is a member of the set of managed applications, and selectively blocking the first application from providing data to a third application installed on the mobile device, responsive to accessing the policy of the first application and failing to read an indication from the policy of the first application that the third application is a member of the set of managed applications.

An improved technique for managing enterprise applications on mobile devices allows users to access enterprise applications from their own mobile devices, where the enterprise applications securely coexist with the users' own personal applications and data.

Figure 35:
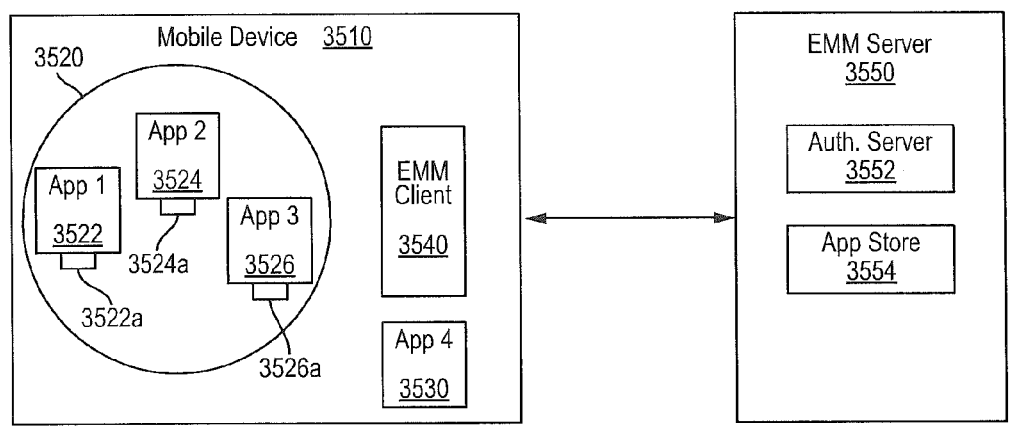
FIG. 35 depicts a system according to illustrative aspects described herein.

Secure data sharing is accomplished by creating a managed set of applications that can share files and/or data with one another, but are selectively prohibited from sharing files and/or data with applications that are not part of the managed set. Thus, two objectives are achieved: (1) data are prevented from leaking out of the managed set and (2) data are allowed to be shared among the applications within the managed set. FIG. 35 shows an example environment in which embodiments hereof can be practiced. Here, a mobile device 3510, such as a smartphone, tablet, PDA, and the like, has installed upon it various mobile applications. The mobile applications include a set 3520 of managed applications 3522, 3524, and 3526, and a personal application 3530. In some examples, an enterprise mobility management (EMM) client 3540 is also installed on the mobile device 3510. The EMM client 3540 is configured to connect, e.g., via a network such as the Internet, with an EMM server 3550, which typically includes an authentication server 3552 and an application store 3554. An example of the EMM client 3540 is a client agent available from Citrix. An example of the EMM server 3550 is a gateway server that provides access to enterprise resources and/or cloud resources. Each application in the set 3520 of managed applications is associated with a respective policy. For example, application 3522 is associated with a policy 3522a, application 3524 is associated with a policy 3524a, and application 3526 is associated with a policy 3526a. In some examples, the policies 3522a, 3524a, and 3526a are provided in the form of files, such as XML or JSON files, in which the respective policy is expressed as a set of key/value pairs. In an example, each policy 3522a, 3524a, and 3526a includes a record of all applications within the set 3520 of managed applications, e.g., as discussed above. Each of the set 3520 of managed applications is specially designed or adapted for use with the enterprise. Some of the set 3520 of managed applications may be designed specifically for the enterprise. Others of the set 3520 of managed applications are more widely used applications (e.g., available to the public) that have been specifically adapted for use with the enterprise. Each of the set 3520 of applications includes injected code that enables the application to conform to a framework of the enterprise. The injected code can be compiled into the application using an SDK. Alternatively, the injected code can be applied as a wrapper around a general-use application, to adapt it for use with the enterprise. In general, the injected code serves to divert API calls from the application to its associated policy, such that the policy can selectively allow or block activities specified by the API calls.

In typical operation, a user of the mobile device 3510 starts the EMM client 3540, logs on to the EMM server 3550 via the authentication server 3552, and accesses the application store 3554. The user can then peruse enterprise applications available from the application store 3554, select desired applications, and download them to the mobile device 3510, where the downloaded applications are included in the set 3520 of managed applications. For each application downloaded, a corresponding policy is also downloaded to the mobile device, and the policies of all applications in the set 3520 are updated to reflect all members of the set 3520. In an example, policies (e.g., 3522a, 3524a, and 3526a) are refreshed periodically and/or in response to particular events, such as each time the respective application is started and/or each time the user logs onto the EMM server 3550. Policies can thus be adapted over time and dynamically transferred to the mobile device 3510 from the EMM server 3550.

Depending on settings of the policies 3522, 3524, and 3526, applications within the set 3520 of managed applications can be constrained to exchange files and/or data only with other applications within the set 3520. For example, API calls from the application 3522 are intercepted by the injected code of the application 3522. The policy 3522a is read, and the operation specified by the API call is either blocked or allowed depending on the settings in the policy 3522a. Because the policy 3522a has a record of all applications in the set 3520 of managed applications, the application 3522, by reading the policy 3522a, can test whether the requested operation of the API call involves an application inside or outside the set 3520, and allow or block activity accordingly. Thus, based on policy settings, movement of data can be restricted such that data within the set 3520 of managed applications is not comingled with data outside the managed set (e.g., with application 3530).

In some examples, applications in the set 3520 of managed applications on the mobile device 3510 can be assigned to different groups. In such cases, policies (e.g., 3522a, 3524a, and 3526a) are updated to include records of groups and group members. The flow of files and/or data between applications can thus be further restricted to members of particular groups. Providing different groups of mobile applications within the managed set 3520 can help to segregate applications handling highly sensitive data from those that handle less sensitive data.

It is understood that the above-described process of intercepting an API call, consulting an application's policy, and allowing or blocking the operation specified by the API call based on the policy can be carried out in a number of contexts. In one example, the above process can be applied for selecting a set of applications on the mobile device 3510 that can be used to open a file or data element identified by a link or icon (e.g., using Open In). In another example, the above process can be applied for copying data or data objects from one application and pasting the data or data objects in another application (e.g., via a hidden, encrypted paste buffer). In yet another example, the above process can be applied for moving files into and/or out of a protected file vault. Essentially, any operation used to move data into and/or out of an application can make use of the above technique.

It is further understood that this techniques can apply not only to movement of data to other applications, but also to recording, pictures, printing, playback of audio, and other functions.

Operating system extensions may be obtained for the mobile device 3510. One such operating system extension responds to a user pointing to a link or icon representing a data object, such as a file, by displaying a list of applications on the mobile device 3510 that are capable of opening that data object. An example of such an operating system extension is "Open In," which is available on iOS devices. Similar extensions are available for Android and Windows 8 devices.

In an example, applications within the set 3520 of managed applications support the use of Open In, but the list of applications displayed for opening a selected data object is limited based on the policies of the respective applications. For example, the list of applications displayed when Open In is invoked from the application 3522 can be limited, in accordance with the policy 3522a, only to other applications in the managed set 3520. Thus, in this example, Open In lists only applications that are both (1) within the managed set 3520 and (2) compatible with the data object. On mobile operating systems, such as iOS, Android, and Windows 8, each application runs in its own sandbox. These apps use a very high level content sharing mechanism like Open In in iOS, Intents/activities in Android and Charms in Windows 8. On a BYOD (bring your own device) mobile device, it will have a mix of managed and un-managed/personal applications running on the device. Here, we focus on how to enable data sharing among the managed set of applications.

On modern mobile operating systems like iOS, the file system is not really exposed to the end user by design to hide complexity. The focus is rather on the applications and the data they handle.

There are many ways data can move in and out of the device. Primary examples include email, cloud based data/file sharing services, browser etc. Then the data needs to be moved among the managed applications to get actual work done.

A method and system for operating an application with multiple modes are described. A plurality of applications may be presented to a user on a mobile device and one of the displayed applications may be selected. The selected application may have one or more contexts that are determined. For example, a context for the selected application may be that the application is configured to access an enterprise account. Based on the context, the selected application may be run on the mobile device in one of a plurality of operations modes. The operation modes may comprise unmanaged and one or more managed modes, among others. Multiple managed modes may be used to provide different levels of security, access to different resources, and the like.

In an embodiment, the context for the selected application may comprise an account to be accessed by the selected application, a location for the mobile device that will be running the selected application, a determination as to whether a predetermined application is running on the mobile device, one or more network connections for the mobile device, and one or more settings for the mobile device. One or more of these contexts may be compared to policies to determine an operation mode for the selected application.

In another embodiment, an operation mode may be switched for a selected application. One or more contexts may be monitored for the selected application while running and a change in operation mode may be detected based on the monitoring. For example, one or more contexts may change for the selected application and a policy may define that an operation mode for the selected application is to be changed. Accordingly, the operation mode may be switched to the updated operation mode.

In an embodiment, an application that is capable of running in multiple modes, e.g., managed mode and/or unmanaged mode among others, may be controlled by partition, by policy, by one or more sandboxes, or any other suitable configuration. For example, a managed operation mode may include running the application as a part of a managed partition of a mobile device. In an embodiment, an application running in managed mode may access data stored in a secure data container in the managed partition of the mobile device. The data stored in the secure data container may include data restricted to a specific secure application, shared among other secure applications, and the like. Data restricted to a secure application may include secure general data and highly secure data. Secure general data may use a strong form of encryption such as AES 128-bit encryption or the like, while highly secure data may use a very strong form of encryption such as AES 256-bit encryption. In an embodiment, an application running in managed mode may save, modify, or delete data in secure data container. The data saved or modified may be encrypted similar to other data stored in secure data container. In this example, an unmanaged operation mode may include running the application as part of unmanaged partition, as described above.

In an embodiment, an application running in managed mode or unmanaged mode may be controlled by policies. As such, one or more policies may define that the application running in managed mode may access secured data (e.g., data in secure data container, encrypted data, such as data encrypted with a particular key, or any other suitable secured data), may communicate with a secure server (e.g., gateway server), may be managed by a device manager (e.g., device manager), or any other suitable policy. One or more policies may also define that the application running in unmanaged mode may not access secure data (e.g., data in secure data container, encrypted data, such as data encrypted with a particular key, or any other suitable secured data), may not communicate with a secure server (e.g., gateway server), may access unsecured data (e.g., unsecured data container, unencrypted data, or any other unsecured data), or any other suitable policy. In this example, an application running in managed mode and an application running in unmanaged mode may either include partitions (e.g., managed partition and unmanaged partition) or may not include partitions.

In an embodiment, an application running in managed mode or unmanaged mode may be controlled by one or more sandboxes. A sandbox may comprise a physical or virtualized portion of a device where applications running in the sandbox may include access policies that are different from access policies for applications that are not running in the sandbox. For example, an application running in managed mode may run in a sandbox that includes policies for the managed mode, such as the policies described herein. In another example, an application running in unmanaged mode may run in a sandbox that includes policies for the unmanaged mode, such as the policies described herein. In this example, an application running in managed mode and an application running in unmanaged mode may either include partitions (e.g., managed partition and unmanaged partition) or may not include partitions.

Figure 36:
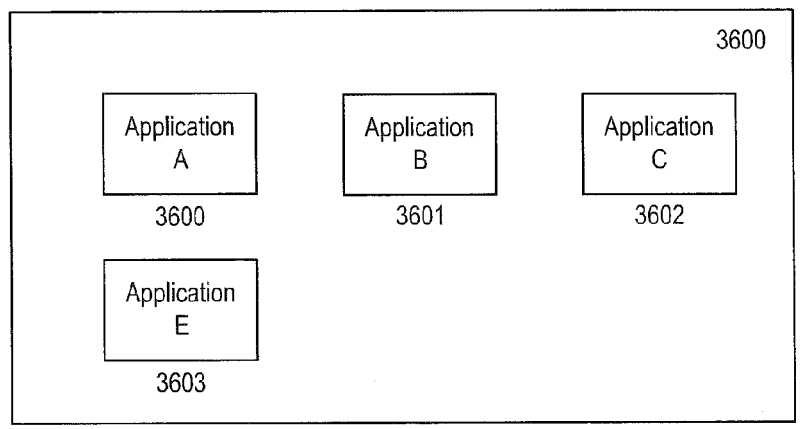
FIG. 36 depicts a device according to illustrative aspects described herein.

FIG. 36 illustrates a sample interface of a mobile device, and FIGS. 37-43 illustrate sample embodiments of methods for determining an operation mode for an application. The methods depicted in FIGS. 37-43 may be combined in any suitable manner in various embodiments. The sample interface depictured in FIG. 36 may be displayed on a mobile device, such as device 107, 109, 240, 502, and/or 602, and the methods depicted in FIGS. 37-43 may be implemented by such a mobile device.

In FIG. 37, a flowchart of example method steps for determining an application mode for an application is shown. The method of FIG. 37 may begin at step 3702, where a plurality of applications are presented. For example, a plurality of applications may be presented to a user on a mobile device. FIG. 35 illustrates an embodiment where user interface 700 displayed on a mobile device (e.g., tablet, smart phone, or the like) presents Applications A 700, B 701, C 702, and E 703 to a user. This is merely an example, and the plurality of applications may be presented in any suitable manner. In an embodiment, the plurality of applications may comprise email applications, web browsing applications, software-as-a-service (SaaS) access applications, and the like.

The method of FIG. 37 may proceed from step 3702 to step 3704, where a selection for one of the plurality of applications is received. With reference to an embodiment depicted in FIG. 35, a user of a mobile device may select one of the presented applications by, for example, pressing a display of the mobile device to select the application. This is merely an example, and the application may be selected in any suitable manner.

The method of FIG. 37 may proceed from step 3704 to step 3706, where a context for the selected applications is determined based on one or more operational parameters of the device executing the selected application. For example, a context may be based on an account to be accessed by the application, a location of the mobile device or a network connectivity status of the mobile device executing the application, or based on any other operational parameter. The methods of FIGS. 38-42, further described below, illustrate various embodiments where example contexts are described.

The method of FIG. 37 may proceed from step 3704 to step 3706, where an operation mode for the selected application is determined based on the context. In an embodiment, the operations modes may comprise managed and unmanaged modes. There may be multiple different managed modes, e.g., based on different security levels of various users or sets of credentials provided by a user, different user roles identified by a set of credentials (e.g., manager versus staff employees), geographic locations from which the device is operated, network locations, operational environment (e.g., a healthcare-related managed mode versus a financial industry managed mode), or based on any other contextual determination.

In an embodiment, the determined context may be compared to a stored policy in order to determine an operation mode. A mobile device, such as mobile device 302, may store one or more policies used to determine an operation mode for an application. In an embodiment, the policies may be stored remotely, such as at policy manager 370, described above with reference to FIG. 3, or may be stored locally on the device. In an example, a context may comprise a selected application configured to access a secure account, such as an email application configured to access a secure email account. This context may be compared to a stored policy. For instance, the stored policy may define that an email application that is configured to access a secure email account is to be run as a managed application. The stored policy may further indicate that the email application, when configured to access a personal account of the device user, may operate in an unmanaged mode. Additional contexts and policies will be described with respect to FIGS. 38-42.

The method of FIG. 37 may proceed from step 3706 to step 3708, where the selected application is run in the determined operation mode. For example, the operation mode may be determined as unmanaged, or as one of multiple managed modes, and the selected application may be run in the determined mode.

In an embodiment, a managed operation mode may include running the application as a part of the managed partition 310 of mobile device 302, as described above with reference to FIG. 3. As such, the managed application may be run as secure native applications 314, secure remote applications 322 executed by a secure application launcher 318, virtualization applications 326 executed by a secure application launcher 318, and the like.

In an embodiment, an application running in managed mode may access data stored in a secure data container 328 in the managed partition 310 (physical, logical, or virtual) of the mobile device. The data stored in the secure data container 328 may include data restricted to a specific secure/managed application 330, shared among other secure applications, and the like. Data restricted to a secure application may include secure general data 334 and highly secure data 338. Different levels and types of security features may be used to differentiate levels of secure data. In an embodiment, an application running in managed mode may save, modify, or delete data in secure data container 328. The data saved or modified may be encrypted similar to other data stored in secure data container 328.

In an embodiment, an application running in managed mode may connect to enterprise resources 304 and enterprise services 308 through virtual private network connections, as described about with reference to FIG. 3. The virtual private network connections may be microVPNs, which are specific to particular application, such as the selected application, particular devices, particular secured areas on the mobile device, and the like. For example, wrapped applications in a secured area of the phone may access enterprise resources through an application specific VPN such that access to the VPN would be granted based on attributes associated with the application, possibly in conjunction with user or device attribute information, and policy information.

In an embodiment, an application running in managed mode may encrypt data transmitted from the application. For example, an application running in managed mode may be communicating with a computing device over a network, and the data transmitted from the application to the device may be encrypted. In addition, the data communicated from the computing device to the application may also be encrypted, and the application running in managed mode may be configured to decrypt the received data.

In an embodiment, an application running in managed mode my access a secure portal. For example, an application may connect to a computing device over a network, for example, a microVPN, and may access a secure portal that might not be access by unsecured applications, such as applications running in unmanaged mode.

In an embodiment, an unmanaged operation mode may include running the application as a part of the unmanaged partition 312 of mobile device 302, as described above with reference to FIG. 3. In an unmanaged mode, the application may access data stored in an unsecured data container 342 on the unmanaged partition 312 of the mobile device 302. The data stored in an unsecured data container may be personal data 344.

In an embodiment, where more than one managed mode is possible, an application running in a less secure managed mode may be run similar to an application running in the more secure managed mode, but might not include all aspects of the latter. For example, an application running in a less secure managed mode may have the information transmitted from the application over a network encrypted, but the application might not have access to secure data container 328, as described with reference to FIG. 3. In another example, an application running in the less secure managed mode may have access to secure data container 328, but might not be able to connect to enterprise resources 304 and enterprise services 308 through virtual private network connections. Accordingly, depending on the determined context, an application running in a less secure managed mode may include aspects of an application running in the more secure managed mode and aspects of an application running in unmanaged mode.

In FIGS. 38-42, flowcharts of example method steps for determining a context and operation mode for an application are shown. In an embodiment, steps 3706 and 1608 of FIG. 37 may comprise the method steps of any one or more of FIGS. 38-42. The method of FIG. 38 may begin at step 3802, where an account to be accessed by a selected application is detected. For example, a selected application may comprise an email application and an email account that the email application is configured to access may be detected. In this example, the email application may be able to access multiple email accounts, such as an enterprise email account and a personal email account, and the account that the email application is configured to access at the time of running may be determined as the context account to be accessed.

The method of FIG. 38 may proceed from step 3802 to step 3804, where an account type of the account to be accessed may be determined. The account type may comprise a context for the selected application. For example, a selected application may comprise an email application and the email application may be configured to access an enterprise account. In another example, the email application may be configured to access a personal account.

The method of FIG. 38 may proceed from step 3804 to step 3806, where an account type may be compared with an account type policy. For example, a policy may define that an email application that is to access an enterprise account should run in managed mode and an email application that is to access a personal account should run in unmanaged mode. The method of FIG. 38 may proceed from step 3806 to step 3808, where an operation mode is determined based on the comparison.

The method of FIG. 39 may begin at step 3902, where a location for a mobile device is determined. For example, a mobile device, such as mobile device 302, may implement the method of FIG. 39, and a location for the mobile device may be determined. The location may be determined by GPS, signal triangulation, or any other suitable or otherwise known manner. The location may comprise a context for the selected application.

The method of FIG. 39 may proceed from step 3902 to step 3904, where a determined location may be compared with a location policy. For example, a policy may define that a selected application run in managed mode when in a certain location, for example, on company premises. In an embodiment, a policy may define that a selected application run in a less secure managed mode when in a certain location, for example, when the determined location is inside the United States but off company premises. For example, the less secure managed mode may encrypt communication to and from the selected application, but might not allow access to enterprise resources, such as resources 304. In another embodiment, a policy may define that a selected application run in unmanaged mode when in a certain location, for example, when the determined location is outside the United States. The method of FIG. 39 may proceed from step 3904 to step 3906, where an operation mode is determined based on the comparison.

Alternatively or in addition to physical location, a network location may also or instead be used to determine whether access is permitted. For example, network location may refer to whether a user is either internal to a data center (or pre-approved Wifi access point), or is external to it. Appropriate access modes may be based on such a determination.

The method of FIG. 40 may begin at step 4002, where it is monitored whether a predetermined application is running on a device. For example, a mobile device, such as mobile device 302, may implement the method of FIG. 40, and the mobile device may be monitored to determine whether a predetermined application is running. The predetermined application may comprise any application capable of running on the mobile device, such a client agent 404 as described with reference to FIG. 4. The monitored predetermined application may comprise a context for the selected application.

The method of FIG. 40 may proceed from step 4002 to step 4004, where a monitored application is compared against a policy. For example, a policy may define that a selected application run in managed mode when a predetermined application, such as client agent 404, is running and that the selected application run in unmanaged mode when the predetermined application is not running. The method of FIG. 40 may proceed from step 4004 to step 4006, where an operation mode is determined based on the comparison.

Figure 41:
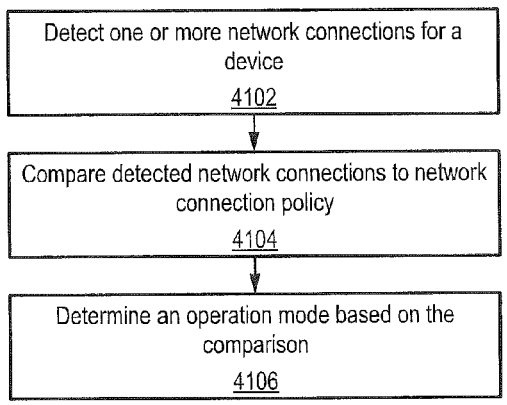
FIG. 41 depicts a process flow according to illustrative aspects described herein.

The method of FIG. 41 may begin at step 4102, one or more network connections are detected. For example, a mobile device, such as mobile device 302, may implement the method of FIG. 41, and the network connections that the mobile device makes may be detected. In an example, network connections may comprise a connection to a cellular network, a connection to a WIFI network, or a connection to a Wireless Local Area Network (WLAN), or the like. The one or more network connections may comprise a context for the selected application.

The method of FIG. 41 may proceed from step 4102 to step 4104, where detected network connections are compared against a network connection policy. For example, a policy may define that a selected application run in managed mode when a mobile device is connected to an internal network, such as a WLAN internal to a company, and that the selected application run in unmanaged mode when the mobile device is only connected to a wireless network, such as cellular network or WIFI network. The method of FIG. 41 may proceed from step 4104 to step 4106, where an operation mode is determined based on the comparison.

Figure 42:
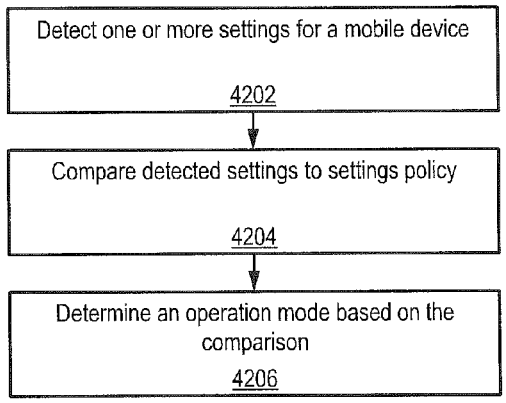
FIG. 42 depicts a process flow according to illustrative aspects described herein.

The method of FIG. 42 may begin at step 4202, where one or more settings for a mobile device are detected. For example, a mobile device, such as mobile device 302, may implement the method of FIG. 42, and one or more settings for the mobile device may be detected. In an example, it may be detected whether the mobile device has a lock screen, such as a PIN required for using the mobile device, or it may be detected whether the mobile device is jailbroken/rooted, e.g., has received after-market modifications. The one or more settings may comprise a context for the selected application.

The method of FIG. 42 may proceed from step 4202 to step 4202, where detected settings are compared against a settings policy. For example, a policy may define that a selected application might not run in managed mode if the mobile device does not have a lock screen or if the mobile device is jailbroken/rooted. The method of FIG. 42 may proceed from step 4206 to step 4206, where an operation mode is determined based on the comparison. In an embodiment, when running the selected application in the determined mode, an indicator may be displayed on the mobile device that informs a user of certain policies, such as a requirement for a mobile device to have a lock screen before the mobile device is allowed to run the selected application in managed mode. FIGS. 38-42 describe a plurality of contexts, and any other suitable context and corresponding policy may be implemented.

In an embodiment, one or more of the contexts described in FIGS. 38-42 may be combined and these contexts may be compared against a policy for the selected application. For example, contexts for a selected application may comprise an account type to be accessed as an enterprise email account and a detected network connection as a cellular network. In this example, the policy may define that when an enterprise account is attempted to be accessed over a cellular network, the selected application should be run in managed mode. The policy may be defined in this way because the selected application may encrypt the communication with the enterprise email account, and therefore the risk of sending secure traffic over a cellular network may be mitigated.

In another example, contexts for a selected application may comprise a determined location outside of the United States and a network connection with a WLAN internal to a company. A policy may define that a selected application is to run in managed mode when a determined location is outside the United States and a network connection is with a WLAN internal to a company. The policy may be defined in this way because a network connection with a WLAN internal to a company mitigates the risk associated with secure communications outside of the United States.

In an embodiment, the one or more contexts as described in FIGS. 38-42 may include a priority. For example, a context for a selected application may comprise a mobile device setting as jailbroken or rooted and a policy may define that a selected application is to run only in unmanaged mode when a context indicates a jailbroken/rooted mobile device, regardless of what other contexts indicate. Accordingly, a jailbroken/rooted mobile device will have a selected application run in unmanaged mode even when the mobile device is connected to a WLAN internal to a company or if the selected application is attempting to access an enterprise account.

In an embodiment, a policy may indicate that a selected application is to be run in a less secure managed mode based on a plurality of contexts as described in FIGS. 38-42. For example, contexts for a selected application may comprise an account type to be accessed as an enterprise email account and a detected network connection as a cellular network. In this example, the policy may define that when an enterprise account is attempted to be accessed over a cellular network, the selected application should be run in the less secure managed mode. The less secure managed mode may encrypt communication to and from the selected application, but might not allow access to enterprise resources, such as resources 304. The policy may be defined in this way because the encrypted communication with the enterprise email account may be a low risk communication, and allowing access to enterprise resources may be a high risk communication.

Figure 43:
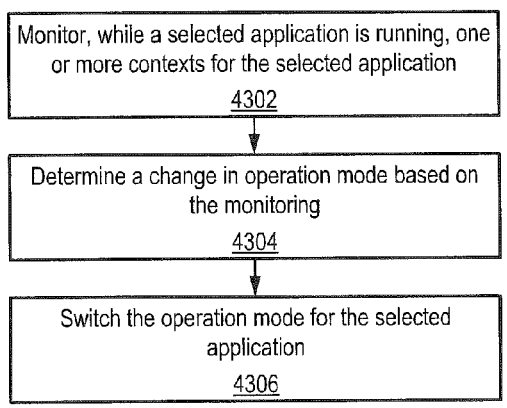
FIG. 43 depicts a process flow according to illustrative aspects described herein.

In FIG. 43, a flowchart of example method steps for switching an operation mode for an application is shown. For example, the method steps of FIG. 43 may follow the method steps of FIG. 37. The method of FIG. 43 may begin at step 4302, where one or more contexts may be monitored while a selected application is running. In an embodiment, one or more of the contexts described with reference to FIGS. 38-42 may be monitored. For example, a mobile device running a selected application may be connected to a cellular network and while the selected application is running, the mobile device may make a new network connection with a WLAN internal to a company.

The method of FIG. 43 may proceed from step 4302 to step 4304, where a change in an operation mode for a selected application is detected based on the monitoring. Stated differently, the mobile device may detect a change in information that formed the basis for selecting a particular operational mode. For example, a selected application may be running in unmanaged mode, and once a mobile application running the selected application connects to a WLAN internal to a company, a policy may define that the operation mode for the selected application should switch to managed mode. The method of FIG. 43 may proceed from step 4304 to step 4306, where the operation mode for the selected application is switched.

FIG. 55 shows an illustrative method for choosing policy file(s) based on the operating mode of an app on a mobile device. Initially, a managed application may be received and/or installed in step 5501 on a mobile electronic device, as described herein, where the managed app is capable of executing in at least two different operating modes. In step 5503 the device may separately and/or distinctly receive one or more policy files defining one or more operational and/or behavioral limitations of the managed app, e.g., based on one or more features discussed above. While the policy file(s) may be optionally received as separate files, the policy files may be received as part of a same communication or installation process as the managed app. The device may receive different policy files for each operating mode, or may receive policy files only for one operating mode. That is, an unmanaged mode might not be associated with any policy files.

In step 5505 the mobile device determines an operating mode of the managed app, e.g., whether the managed app is executing in managed or unmanaged mode. In step 5507 the device may select one or more policy files (or zero policy files, e.g., in an unmanaged mode) to apply to the current operating mode of the managed app. Various examples of such policy files and multi-mode features and processes that may be restricted/enforced are discussed above.

11. Enterprise Application App Store

As discussed above, with reference back to FIG. 3, an enterprise mobility technical architecture 300 may include an application store 378. The application store 378 may include unwrapped applications 380, pre-wrapped applications 382, and the like. Applications may be populated in the application store 378 from the application controller 374. The application store 378 may be accessed by the mobile device 302 through the access gateway 360, through the public Internet 348, or the like. The application store may be provided with an intuitive and easy to use user interface. The application store 378 may provide access to a software development kit 384. The software development kit 384 may provide a user the capability to secure applications selected by the user by wrapping the application as described previously in this description. An application that has been wrapped using the software development kit 384 may then be made available to the mobile device 302 by populating it in the application store 378 using the application controller 374.

The enterprise mobility technical architecture 300 may include a management and analytics capability. The management and analytics capability may provide information related to how applications are downloaded and/or used, how often applications are downloaded and/or used, and the like. How applications are used may include which devices download which applications, which applications access which data, and the like. How often applications are used may include how often an application has been downloaded, how many times a specific set of data has been accessed by an application, how often the application is launched, shared, interfaced, referenced, called, and the like.

In some embodiments, the one or more controls that are included in the mobile service management interface (e.g., the mobile service management interface provided in step 620) may be further configured to allow the administrative user to define different policies for different users of the one or more applications. For example, the one or more controls that are included in the mobile service management interface may be configured to allow the administrative user to define a first policy for a first user or group of users with respect to a particular application, and further configured to allow the administrative user to define a second policy for a second user or group of users with respect to the same application, where the second policy is different from the first policy and the second user or group of users is different from the first user or group of users.

In one or more arrangements, the one or more controls that are included in the EMM or enterprise app store interface may be further configured to allow an administrative user to define different policies for different user roles and/or applications on the application store. For example, using such controls, the administrative user may define, with respect to a particular application that may be available in the enterprise application store, a first policy for a first user or group of users having a first role within an enterprise (e.g., information security) and a second policy for a second user or group of users having a second role within the enterprise (e.g., sales), where the second policy is different from the first policy (e.g., in terms of the functions that are enabled and/or disabled in the application, the functions that are enabled and/or disabled on the device while the application is running, the enterprise resources and/or other resources that can and/or cannot be accessed by the application and/or while the application is running, etc.).

In some embodiments, the EMM or store interface may be provided in response to receiving one or more applications at the enterprise application store. For example, after an administrative user uploads and/or otherwise provides a particular application to the enterprise application store, the enterprise application store may provide the mobile service management interface (which may, e.g., be configured to allow the administrative user to define one or more policies for the application that has just been uploaded) responsive to receiving the application. Using these features, an administrative user of the enterprise application store may, for instance, configure an application that he or she is uploading into and/or otherwise making available in the enterprise application store for various non-administrative users of the enterprise application store. For instance, the administrative user may be able to use the mobile service management interface to initially define policies for an application that has just been uploaded to and/or otherwise added to the enterprise application store.

In some instances, after providing the application store interface, a policy change for an application may be received via the application store interface. For example, in some instances, the enterprise application store may receive a policy change for a particular application. Such a policy change may, for instance, be received as user input provided by the administrative user via the application store interface.

Based on receiving such a policy change, information associated with the policy change may automatically be provided to one or more mobile devices that have already downloaded the application from the application store. For example the enterprise application store may provide information specifying details of the policy change to one or more applications and/or devices that may be affected by the policy change. In some instances, before providing this information to affected applications and/or devices, the enterprise application store may identify what applications and/or devices are affected by the policy change based on download history information for various applications and users, update and/or version history information for various applications and users, on-device monitoring information for various applications and users, and policy information for various applications and users (which may, e.g., specify for particular applications and/or particular users what policies are currently in place, what policies have been previously applied, etc.).

In some embodiments, after validating the authentication credentials of the administrative user, a new application may be received at the application store from the administrative user. For example, after validating the authentication credentials of the administrative user, the enterprise application store may receive a new application that is being uploaded to (and/or has just been uploaded to) the enterprise application store by the administrative user (and/or by one or more computing devices being used by the administrative user).

After receiving such a new application from the administrative user (and/or responsive to receiving the new application from the administrative user), the application store may prompt the administrative user to define one or more policies to be applied to the new application. For example, in prompting the administrative user to define such policies, the enterprise application store may identify one or more relevant policies for the new application. The relevant policies may, for instance, include policies that can be and/or should be applied to the new application (e.g., based on the nature of the policies, based on the nature of the application, based on one or more default policies used by the enterprise and/or other organization that is deploying and/or otherwise providing the enterprise application store, based on recommendation information provided by other administrative users, etc.). Then, after identifying one or more relevant policies for the new application, the enterprise application store may, for instance, update the application store interface to include at least one control configured to allow the administrative user to manage the one or more identified policies. For example, the enterprise application store may update the application store interface to include one or more controls that enable the administrative user to enable and/or disable the one or more policies that were identified as being relevant, as well as set and/or modify various properties and/or settings that may be used in defining and/or enforcing these policies on various devices.

After prompting the administrative user to define one or more policies to be applied to the new application (and/or based on receiving input and/or other information from the administrative user in response to the prompt), the application store may receive at least one policy to be applied to the new application from the administrative user. For example, the enterprise application store may receive one or more selections and/or other input provided by the administrative user via the updated application store interface discussed in the example above. In this way, the administrative user may, for example, be able to define one or more policies that are to be applied to a new application that the administrative user has added to the application store. In addition, the one or more policies that are defined by the administrative user may, for example, be applied to the new application if and/or when the application is provided to and/or executed by one or more recipient devices (e.g., one or more mobile devices used by non-administrative users).

Figure 47:
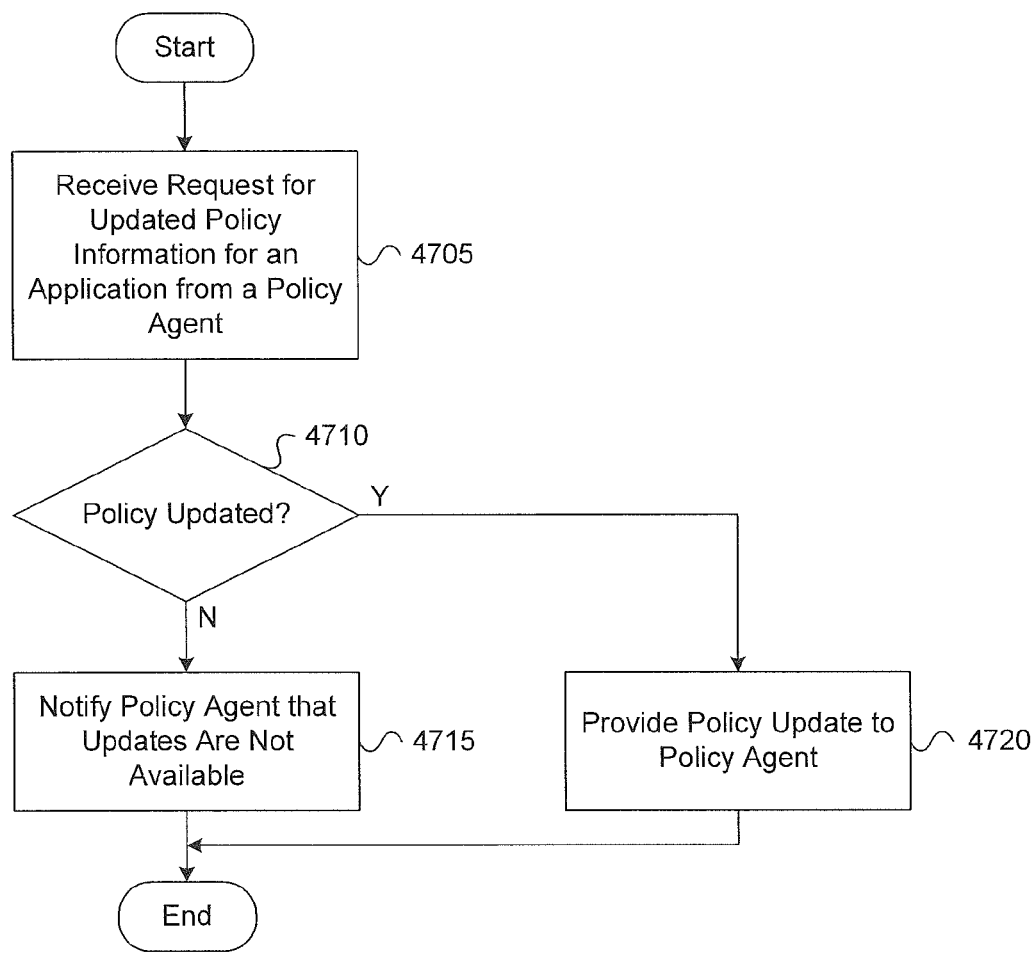
FIG. 47 depicts a process flow according to illustrative aspects described herein.

FIG. 47 depicts a flowchart that illustrates a method of providing policy updates to managed applications using an enterprise application store in accordance with one or more illustrative aspects discussed herein. In one or more embodiments, the method illustrated in FIG. 47 and/or one or more steps thereof may be performed by a computing device (e.g., any device described herein). In other embodiments, the method illustrated in FIG. 47 and/or one or more steps thereof may be embodied in computer-executable instructions that are stored in a computer-readable medium, such as a non-transitory computer-readable memory.

As seen in FIG. 47, the method may begin at step 4705 in which a request for updated policy information for at least one application may be received at an enterprise application store from a policy agent. For example, in step 4705, an enterprise application store, similar to the enterprise application store discussed in the examples above, may receive a request for updated policy information. The request may be made in connection with policies that may be applied to (or may be configured to be applied to) a particular application and may, for instance, be received from a policy agent that is resident on, being executed on, and/or is otherwise provided by a user computing device (e.g., a mobile device, such as a smart phone, a tablet computer, etc.).

In some instances, the request for updated policy information may be received (e.g., by the enterprise application store in step 805) upon execution of a wrapped application. For example, the enterprise application store may receive the request for updated policy information after a user computing device begins executing a wrapped application. Such a wrapped application may, for instance, include an enterprise application, as well as an application wrapper, that may be configured to enforce one or more policies with respect to the enterprise application and/or the device upon which the wrapped application is being executed. In addition, such an application wrapper may, for instance, implement one or more aspects of the application management framework 414 discussed above.

In some instances, the policy agent (e.g., from which the request for updated policy information is received in step 4705) may be a EMM policy enforcement agent (e.g., on a user computing device). Such a mobile device management policy enforcement agent may, for instance, be a separate program, process, or service that is executed on (or configured to be executed on) a user computing device and is further configured to monitor and enforce various policies with respect to various applications and the device itself.

In other instances, the policy agent (e.g., from which the request for updated policy information is received in step 4705) may be an application wrapper for a particular application. For example, the policy agent may be an application wrapper for the particular application for which the request for updated policy information is received in step 4705. As discussed above, such an application wrapper may be configured to enforce one or more policies with respect to the application and, in some instances, may implement one or more aspects of the application management framework 414 discussed above.

Based on receiving the request for updated policy information (e.g., in step 4705), it may be determined, in step 4710, whether one or more policies for the at least one application have been updated. For example, in step 4710, the enterprise application store may determine one or more policies for the one or more applications (e.g., the one or more applications that are the subject of the request received in step 4705) have been updated. The one or more policies for a particular application may, for instance, be updated although the application itself has not been updated (e.g., the policies can be modified independently of the application itself and/or an application wrapper that may be used to wrap the application). In one or more arrangements, the enterprise application store may determine whether policies for an application have been updated based on policy information that is stored by, maintained by, and/or accessible to the enterprise application store. In some instances, such policy information may be created, accessed, modified, and/or stored by the enterprise application store based on user input and/or other information received from an administrative user of the enterprise application store, such as information received from an administrative user of the enterprise application store via a application store interface, as discussed above.

Continuing to refer to FIG. 47, if it is determined, in step 4710, that one or more policies for the at least one application have not been updated, then in step 4715, the policy agent may be notified that updates are not available. For example, in step 4715, the enterprise application store may notify the policy agent that updates are not available. For instance, in step 4715, the enterprise application store may send one or more messages to the user computing device (which may, e.g., have sent the request received in step 4705) to inform the user computing device and/or the policy agent being executed thereon that policy updates are not available and/or that the user computing device should continue to use and/or enforce one or more policies that the policy agent has previously obtained from the enterprise application store.

Alternatively, if it is determined, in step 4710, that one or more policies for the at least one application have been updated, then in step 4720, at least one policy update may be provided to the policy agent. For example, in step 4720, the enterprise application store may send one or more messages to the user computing device (which may, e.g., have sent the request received in step 4705) to inform the user computing device and/or the policy agent being executed thereon that one or more policy updates and/or available. In addition, the one or more messages sent by the enterprise application store to the policy agent may, for instance, include information about the new and/or modified policies, where such information is configured to cause the policy agent to implement and/or enforce the new and/or modified policies (e.g., with respect to the particular applications for which policy changes have occurred and/or with respect to the device itself). As in the examples discussed above, the one or more policies may be configured to enable and/or disable certain features of the one or more applications, enable and/or disable certain features of the device, enable and/or disable access to certain resources, and/or provide other functionalities and/or limitations, and the information provided (e.g., as a policy update to the policy agent in step 4720) may reflect any and/or all changes made to these and/or other types of policies.

Figure 48:
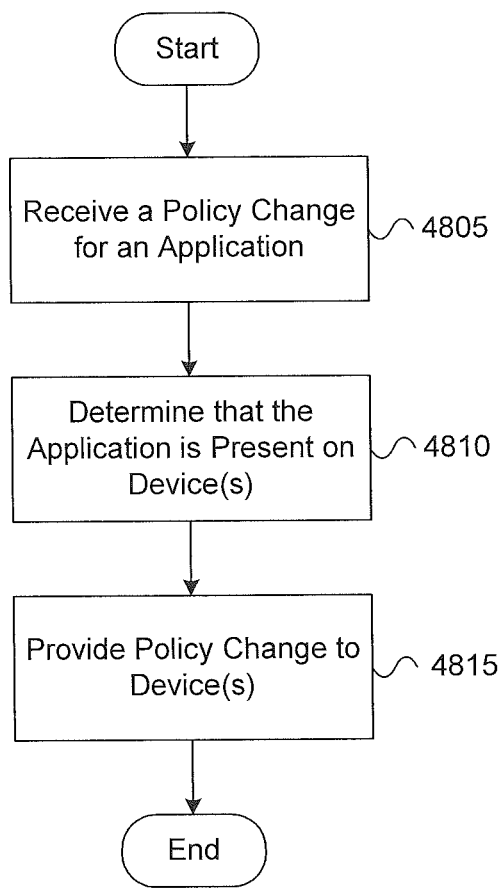
FIG. 48 depicts a process flow according to illustrative aspects described herein.

FIG. 48 depicts another flowchart that illustrates a method of providing policy updates to managed applications using an enterprise application store in accordance with one or more illustrative aspects discussed herein. In one or more embodiments, the method illustrated in FIG. 48 and/or one or more steps thereof may be performed by a computing device as described herein. In other embodiments, the method illustrated in FIG. 48 and/or one or more steps thereof may be embodied in computer-executable instructions that are stored in a computer-readable medium, such as a non-transitory computer-readable memory. Additionally or alternatively, the method illustrated in FIG. 48 may, in some instances, be combined with the method illustrated in FIG. 47. For example, the method illustrated in FIG. 48 may be performed by an enterprise application store before and/or after performing the method illustrated in FIG. 47.

As seen in FIG. 48, the method may begin in step 4805, in which a policy change for an application may be received at the enterprise application store. For example, in step 4805, the enterprise application store may receive a policy change for a particular application from an administrative user of the enterprise application store. Such a policy change may, for instance, be received via a application store interface, as discussed above.

Continuing to refer to FIG. 48, in instances in which a policy change for an application is received by the enterprise application store, but a request for updated policy information has not yet been received, at least with respect to the particular application from certain devices, the enterprise application store may determine to proactively provide the policy update to the affected devices. Thus, based on receiving a policy change (e.g., in step 4805), it may be determined, in step 4810, that the application (i.e., the application for which a policy change was received in step 4805) is present on one or more devices. For example, in step 4810, the enterprise application store may determine that the application has been installed on, has been downloaded by, and/or is otherwise present on one or more particular devices. In some instances, the application store may determine that the application has been installed on, has been downloaded by, and/or is otherwise present on one or more particular devices based on download history information for various applications and users, update and/or version history information for various applications and users, and/or on-device monitoring information for various applications and users. In one or more arrangements, the download history information for various applications and users may include user-keyed application download records that indicate, for each user, the versions and names of any and/or all applications that have been downloaded by the particular user from the enterprise application store, as well as identifying information for the particular devices onto which such applications were downloaded.

Based on determining that the application is present on one or more devices (e.g., in step 4810), information associated with the policy change may be provided to the one or more devices in step 4815. For example, in step 4815, the enterprise application store may provide information about the policy change to one or more affected devices (e.g., the one or more devices on which the application was determined to be present in step 4810). For instance, in step 4815, the enterprise application store may formulate and send one or more messages to the devices identified in step 4810, where the one or more messages include information about the new and/or modified policies, similar to how a policy update may be provided in step 4720.

Using one or more of the above enterprise application store features, a system may be configured to provide an enterprise application app store information about a mobile client device and usable by the enterprise application app store to present one or more applications downloadable by the mobile client device, or permissible for download by that device based on the policy information. For example, the policy files might identify the mobile client device as capable of executing managed applications according to corresponding policy files. In response, the app store might expose for download a list of available policy-manageable applications. The client device can then download an application, as needed.

In another example, the set of policy files might identify the electronic mobile device as being capable of executing applications executable in multiple execution modes (e.g., unmanaged, managed mode 1, managed mode 2, etc.). In response the app store might expose for download a list of available managed applications each executable in multiple execution modes. The mobile client can then download any of those applications, as needed.

In yet another example, the set of policy files might identify the electronic mobile device as being enrolled in an enterprise mobility management (EMM) infrastructure. In response, the app store might expose for download a list of available enterprise applications. The mobile client can then download any of those applications, as needed.

12. Mobile Feature Interoperability

Any of the above features, whether described alone or as part of another feature, may be used with any one or more of the other features described herein.

For example, policy managed applications can be adapted to provide a secure cut & paste data sharing feature, restricted data sharing features, and/or policy based data sharing features. Similarly, policy managed applications are usable with EMM and MRM services and infrastructures, either with our without any one or more of the aforementioned data sharing features. In one illustrative example, a policy managed app may restrict access to a secure clipboard based on whether or not the managed app is enrolled in a MRM system. If the managed app is enrolled in the MRM system, the managed app may have access to a first secure clipboard. However, if the managed app is not enrolled in the MRM system, then the managed app may have access to a different second secure clipboard, or only to a general clipboard.

Similarly, policy managed applications are usable with application specific policies, e.g., secure Internet applications, secure PIM applications, secure client agent applications, etc., either with or without any one or more of the aforementioned data sharing and/or EMM/MRM services. In one illustrative example, a policy managed secure browser app may restrict execution of HTML5 or other browser-based execution environments based on whether or not the device is enrolled in the MRM, based on a geographic location of the device, a time of day, or the like. In another example, the policy managed secure browser app may be restricted from accessing a secure clipboard while executing another program in HTML5, FLASH, or other execution environment.

Similarly, policy managed applications are usable with any one or more network and data access features such as micro VPNs, tunnels, secure containers, single-sign on techniques, and/or identity management techniques, either with or without any one or more of the aforementioned data sharing features, EMM/MRM features, and/or application specific policy features. In one illustrative example, a policy managed app may be restricted from accessing an enterprise secure storage area except through a secure micro VPN or tunnel. In another example, a policy managed app may be restricted from using single-sign on except when the mobile device on which the managed app is executing is enrolled in the MRM system, and when the managed app is a predefined specific type of app.

Similarly, policy managed applications are usable with any one or more dynamic device cloud features, either with or without any one or more of the aforementioned data sharing features, EMM/MRM features, application specific policy features, and/or network and data access features. In one illustrative example, a policy managed app may be restricted from transferring a process to another device unless both devices are enrolled in the MRM system, and both devices are communicating through a secure channel, e.g., micro VPN, tunnel, etc.

Similarly, policy managed applications are usable with one or more features operable with applications capable of execution in multiple operation modes, either with or without any one or more of the aforementioned data sharing features, EMM/MRM features, application specific policy features, network and data access features, and/or dynamic device cloud features. In one illustrative example, a policy managed app may be restricted from accessing an enterprise secure storage area except through a secure micro VPN or tunnel, and only when the managed app is operating in a predefined operating mode from multiple possible operating modes (e.g., in a managed mode). In another example, a policy managed app may be restricted from using single-sign on except when the mobile device on which the managed app is executing is enrolled in the MRM system and when the managed app is operating in a predefined mode.

Similarly, policy managed applications are usable with one or more enterprise application app store features, either with or without any one or more of the aforementioned data sharing features, EMM/MRM features, application specific policy features, network and data access features, dynamic device cloud features, and/or multiple operation mode features.

It is intended that any feature described herein may be combined and/or used with any other feature described herein. The above recited combinations are not meant to be limiting, but rather are illustrative of what can be accomplished using the individual tools recited above. Any combination of features will inherently provide one or more specific advantages not otherwise capable, whether two, three, four, five, or more features are combined together. The above features should therefore be regarded as individual tools that may be selectively combined in any desired manner to complete a desired task or operational design, where one or more tools in and of themselves are unique, yet combinations of tools yield even further unexpected results and advantages.

13. Conclusion

Although the subject matter has been described in language specific to structural features and/or methodological acts, it is to be understood that the subject matter herein is not necessarily limited to the specific features or acts described above. Rather, the specific features and acts described above are described as illustrative implementations, embodiments, and aspects of the appended claims.

What is claimed is:

1. A method comprising:
   receiving, by a processor of an electronic mobile device, a managed application from an application server during a first communication, the managed application being constructed to operate in accordance with a set of one or more policy files defined independent of the managed application, wherein each policy file defines one or more access controls enforced by a mobile device management system on the electronic mobile device when the managed application is executing on the electronic mobile device;

receiving, by the processor, the set of one or more policy files from the application server during a second communication which is different than the first communication, the set of one or more policy files being stored on the electronic mobile device separately from the managed application; and running, by the processor, the managed application on the mobile device, the managed application limited by the access controls defined in the set of policy files and enforced by the mobile device management system, wherein the set of one or more policy files, when applied to the managed application, cause the managed application to restrict a data sharing feature available to one or more unmanaged applications executing on the electronic mobile device.

2. The method of claim 1, wherein the data sharing feature comprises an unrestricted cut and paste feature exposed by an operating system of the electronic mobile device.

3. The method of claim 1, wherein the data sharing feature comprises a URL dispatch feature, and wherein the set of one or more policy files act to prevent the managed application from performing a URL dispatch.

4. The method of claim 1, wherein the data sharing feature comprises a dictation feature, and wherein the set of one or more policy files act to prevent the managed application from permitting a user to use the dictation feature from within the managed application.

5. The method of claim 1, wherein the data sharing feature comprises a content provider API, and wherein the set of one or more policy files act to prevent the managed application from calling the content provider API.

6. The method of claim 1, wherein the data sharing feature comprises a remote procedure call, and wherein the set of one or more policy files act to prevent the managed application from calling the remote procedure call.

7. The method of claim 1, wherein the data sharing feature comprises a memory sharing feature, and wherein the set of one or more policy files act to prevent the managed application from writing data to memory shared with an unmanaged application.

8. Non-transitory computer readable media storing instructions that, when executed, cause a system to perform:

receiving, by a processor of an electronic mobile device, a managed application from an application server during a first communication, the managed application being constructed to operate in accordance with a set of one or more policy files defined independent of the managed application, wherein each policy file defines one or more access controls enforced by a mobile device management system on the electronic mobile device when the managed application is executing on the electronic mobile device;

receiving, by the processor, the set of one or more policy files from the application server during a second communication which is different than the first communication, the set of one or more policy files being stored on the electronic mobile device separately from the managed application; and running, by the processor, the managed application on the mobile device, the managed application limited by the access controls defined in the set of policy files and enforced by the mobile device management system, wherein the set of one or more policy files, when applied to the managed application, cause the managed application to restrict a data sharing feature available to one or more unmanaged applications executing on the electronic mobile device.

9. The computer readable media of claim 8, wherein the data sharing feature comprises an unrestricted cut and paste feature exposed by an operating system of the electronic mobile device.

10. The computer readable media of claim 8, wherein the data sharing feature comprises a URL dispatch feature, and wherein the set of one or more policy files act to prevent the managed application from performing a URL dispatch.

11. The computer readable media of claim 8, wherein the data sharing feature comprises a dictation feature, and wherein the set of one or more policy files act to prevent the managed application from permitting a user to use the dictation feature from within the managed application.

12. The computer readable media of claim 8, wherein the data sharing feature comprises a content provider API, and wherein the set of one or more policy files act to prevent the managed application from calling the content provider API.

13. The computer readable media of claim 8, wherein the data sharing feature comprises a remote procedure call, and wherein the set of one or more policy files act to prevent the managed application from calling the remote procedure call.

14. The computer readable media of claim 8, wherein the data sharing feature comprises a memory sharing feature, and wherein the set of one or more policy files act to prevent the managed application from writing data to memory shared with an unmanaged application.

15. An apparatus comprising:
a processor; and
memory storing computer readable instructions that, when executed by the processor, cause the apparatus to perform:

receiving, by a processor of an electronic mobile device, a managed application from an application server during a first communication, the managed application being constructed to operate in accordance with a set of one or more policy files defined independent of the managed application, wherein each policy file defines one or more access controls enforced by a mobile device management system on the electronic mobile device when the managed application is executing on the electronic mobile device;

receiving, by the processor, the set of one or more policy files from the application server during a second communication which is different than the first communication, the set of one or more policy files being stored on the electronic mobile device separately from the managed application; and running, by the processor, the managed application on the mobile device, the managed application limited by the access controls defined in the set of policy files and enforced by the mobile device management system, wherein the set of one or more policy files, when applied to the managed application, cause the managed application to restrict a data sharing feature available to one or more unmanaged applications executing on the electronic mobile device.

16. The apparatus of claim 15, wherein the data sharing feature comprises an unrestricted cut and paste feature exposed by an operating system of the electronic mobile device.

17. The apparatus of claim 15, wherein the data sharing feature comprises a URL dispatch feature, and wherein the set of one or more policy files act to prevent the managed application from performing a URL dispatch.

18. The apparatus of claim 15, wherein the data sharing feature comprises a dictation feature, and wherein the set of one or more policy files act to prevent the managed application from permitting a user to use the dictation feature from within the managed application.

19. The apparatus of claim 15, wherein the data sharing feature comprises a content provider API, and wherein the set of one or more policy files act to prevent the managed application from calling the content provider API.

20. The apparatus of claim 15, wherein the data sharing feature comprises a remote procedure call, and wherein the set of one or more policy files act to prevent the managed application from calling the remote procedure call.

* * * * *